US010261535B2

(12) United States Patent
Boardman et al.

(10) Patent No.: US 10,261,535 B2
(45) Date of Patent: Apr. 16, 2019

(54) LOAD PHASE BALANCING AT MULTIPLE TIERS OF A MULTI-TIER HIERARCHICAL INTELLIGENT POWER DISTRIBUTION GRID

(71) Applicant: General Electric Technology GmbH, Baden (CH)

(72) Inventors: Ethan Clair Boardman, Seattle, WA (US); Subrahmanyam Saraswati Venkata, Oro Valley, AZ (US)

(73) Assignee: General Electric Technology GmbH, Baden (CH)

( * ) Notice: Subject to any disclaimer, the term of this patent is extended or adjusted under 35 U.S.C. 154(b) by 426 days.

(21) Appl. No.: 15/059,291

(22) Filed: Mar. 2, 2016

(65) Prior Publication Data

US 2016/0179120 A1   Jun. 23, 2016

Related U.S. Application Data

(63) Continuation of application No. 13/155,751, filed on Jun. 8, 2011, now Pat. No. 9,281,689.

(51) Int. Cl.
*G05F 1/66* (2006.01)
*H02J 3/26* (2006.01)
(Continued)

(52) U.S. Cl.
CPC .............. *G05F 1/66* (2013.01); *G05B 15/02* (2013.01); *H02J 3/26* (2013.01); *H02J 13/0079* (2013.01);
(Continued)

(58) Field of Classification Search
CPC .......... H02J 3/26; H02J 13/0079; Y02E 40/50
See application file for complete search history.

(56) References Cited

U.S. PATENT DOCUMENTS 3,944,723 A   3/1976   Fong
4,689,735 A   8/1987   Young
(Continued)

FOREIGN PATENT DOCUMENTS

CN   101404414   4/2009
EP   2019467   1/2009

OTHER PUBLICATIONS

Office Action dated Jun. 24, 2016 for U.S. Appl. No. 14/593,988, 36 pages.
(Continued)

*Primary Examiner* — Amar Movva
(74) *Attorney, Agent, or Firm* — Amin, Turocy & Watson, LLP

(57) ABSTRACT

The subject specification comprises enhanced power system balance control for a multi-tier hierarchical electrical distribution network (EDN). The EDN comprises a specified number of distribution network node controller (DNNC) components employed to desirably control power system balance, data communications, and power distribution between respective tiers of the EDN to facilitate efficient power distribution. In each tier, a power system balance component (PSBC), associated with a DNNC component, can monitor power system balance, such as load phase balance, associated with multi-phase power distribution for its tier, and detect power system imbalances in that tier. A power balance correction action can be identified and executed (e.g., automatically) in response to the detected power system imbalance to rectify the imbalance, wherein the correction action can include dynamic switching of loads between phases and/or filtering of the power signal.

22 Claims, 20 Drawing Sheets

(51) Int. Cl.
*G05B 15/02* (2006.01)
*H02J 13/00* (2006.01)

(52) U.S. Cl.
CPC .............. *Y02E 40/50* (2013.01); *Y02E 40/76* (2013.01); *Y04S 10/545* (2013.01)

(56) References Cited

U.S. PATENT DOCUMENTS

| | | |
|---|---|---|
| 6,347,027 B1 | 2/2002 | Nelson et al. |
| 6,434,512 B1 | 8/2002 | Discenzo |
| 6,697,240 B2 | 2/2004 | Nelson et al. |
| 6,697,951 B1 | 2/2004 | Sinha et al. |
| 7,289,887 B2 | 10/2007 | Rodgers |
| 7,398,194 B2 | 7/2008 | Evans et al. |
| 7,724,778 B2 | 5/2010 | Ying |
| 7,747,739 B2 | 6/2010 | Bridges et al. |
| 7,844,370 B2 | 11/2010 | Pollack et al. |
| 7,898,104 B1 | 3/2011 | Verges |
| 8,335,595 B2 | 12/2012 | Tolnar et al. |
| 8,350,412 B2 | 1/2013 | Massie et al. |
| 8,401,709 B2 | 3/2013 | Cherian et al. |
| 8,417,391 B1 | 4/2013 | Rombouts et al. |
| 8,447,434 B1 | 5/2013 | Harris et al. |
| 8,525,522 B2 | 9/2013 | Gong et al. |
| 8,558,551 B2 | 10/2013 | Mynam et al. |
| 8,588,991 B1 | 11/2013 | Forbes, Jr. |
| 8,730,837 B2 | 5/2014 | Popescu et al. |
| 8,781,640 B1 | 7/2014 | Miller |
| 8,924,033 B2 | 12/2014 | Goutard et al. |
| 9,881,033 B2 | 1/2018 | Boardman et al. |
| 2002/0064010 A1 | 5/2002 | Nelson et al. |
| 2003/0055677 A1 | 3/2003 | Brown et al. |
| 2004/0030457 A1 | 2/2004 | Bayoumi et al. |
| 2004/0081193 A1 | 4/2004 | Forest et al. |
| 2004/0083066 A1 | 4/2004 | Hayes et al. |
| 2004/0125753 A1 | 7/2004 | Mahany et al. |
| 2005/0005093 A1 | 1/2005 | Bartels et al. |
| 2005/0039040 A1 | 2/2005 | Ransom et al. |
| 2005/0125104 A1 | 6/2005 | Wilson et al. |
| 2006/0195229 A1 | 8/2006 | Bell et al. |
| 2007/0005315 A1 | 1/2007 | Evans et al. |
| 2007/0018334 A1 | 1/2007 | Peytavy et al. |
| 2007/0087756 A1 | 4/2007 | Hofberg |
| 2007/0124026 A1 | 5/2007 | Troxell et al. |
| 2007/0206644 A1 | 9/2007 | Bertsch et al. |
| 2007/0239373 A1 | 10/2007 | Nasle |
| 2007/0285079 A1 | 12/2007 | Nasle |
| 2008/0052145 A1 | 2/2008 | Kaplan et al. |
| 2008/0109205 A1 | 5/2008 | Nasle |
| 2008/0272934 A1 | 11/2008 | Wang et al. |
| 2008/0281663 A1 | 11/2008 | Hakim et al. |
| 2009/0066317 A1 | 3/2009 | de Buda |
| 2009/0129376 A1 | 5/2009 | Johnson |
| 2009/0228324 A1 | 9/2009 | Ambrosio et al. |
| 2009/0254655 A1 | 10/2009 | Kidwell et al. |
| 2009/0281673 A1 | 11/2009 | Taft |
| 2009/0281674 A1 | 11/2009 | Taft |
| 2009/0281679 A1 | 11/2009 | Taft |
| 2009/0299542 A1 | 12/2009 | Nuqui et al. |
| 2009/0319093 A1 | 12/2009 | Joos et al. |
| 2010/0017214 A1 | 1/2010 | Ambrosio et al. |
| 2010/0070089 A1 | 3/2010 | Harrod et al. |
| 2010/0138363 A1 | 6/2010 | Batterberry et al. |
| 2010/0152910 A1 | 6/2010 | Taft |
| 2010/0177450 A1 | 7/2010 | Holcomb et al. |
| 2010/0179704 A1 | 7/2010 | Ozog |
| 2010/0241560 A1 | 9/2010 | Landau-Holdsworth et al. |
| 2010/0286840 A1 | 11/2010 | Powell et al. |
| 2010/0317420 A1 | 12/2010 | Hoffberg |
| 2010/0324844 A1 | 12/2010 | Marti |
| 2011/0004446 A1 | 1/2011 | Dorn et al. |
| 2011/0004513 A1 | 1/2011 | Hoffberg |
| 2011/0035073 A1 | 2/2011 | Ozog |
| 2011/0063126 A1 | 3/2011 | Kennedy et al. |
| 2011/0071695 A1 | 3/2011 | Kouroussis et al. |
| 2011/0074436 A1 | 3/2011 | Nowicki et al. |
| 2011/0093127 A1 | 4/2011 | Kaplan |
| 2011/0106321 A1 | 5/2011 | Cherian et al. |
| 2011/0109266 A1 | 5/2011 | Rossi |
| 2011/0172838 A1 | 7/2011 | Pai et al. |
| 2011/0208366 A1 | 8/2011 | Taft |
| 2011/0221393 A1 | 9/2011 | Billmaier |
| 2011/0231028 A1 | 9/2011 | Ozog |
| 2011/0282508 A1 | 11/2011 | Goutard et al. |
| 2011/0288692 A1 | 11/2011 | Scott |
| 2011/0313581 A1 | 12/2011 | Genc et al. |
| 2011/0313586 A1 | 12/2011 | Popescu et al. |
| 2012/0029710 A1 | 2/2012 | Dodderi et al. |
| 2012/0029720 A1 | 2/2012 | Cherian et al. |
| 2012/0126994 A1 | 5/2012 | Sobotka et al. |
| 2012/0175951 A1 | 7/2012 | Pamulaparthy et al. |
| 2012/0179301 A1 | 7/2012 | Aivaliotis et al. |
| 2012/0181869 A1 | 7/2012 | Chapel et al. |
| 2012/0229082 A1 | 9/2012 | Vukojevic et al. |
| 2012/0253540 A1 | 10/2012 | Coyne et al. |
| 2012/0277926 A1 | 11/2012 | Nielsen et al. |
| 2012/0310423 A1 | 12/2012 | Taft |
| 2012/0310434 A1 | 12/2012 | Taft |
| 2012/0316689 A1 | 12/2012 | Boardman et al. |
| 2012/0316691 A1 | 12/2012 | Boardman et al. |
| 2012/0316696 A1 | 12/2012 | Boardman et al. |
| 2012/0316697 A1 | 12/2012 | Boardman et al. |
| 2013/0035802 A1 | 2/2013 | Khaitan et al. |
| 2013/0036311 A1 | 2/2013 | Akyol et al. |
| 2013/0099565 A1 | 4/2013 | Sachs et al. |
| 2013/0113291 A1 | 5/2013 | Recker et al. |
| 2014/0091622 A1 | 4/2014 | Lucas et al. |
| 2015/0002186 A1 | 1/2015 | Taft |

OTHER PUBLICATIONS

European Search Report dated Jun. 21, 2017 for European Patent Application No. 12170376.3, 7 pages.
European Search Report dated Jul. 21, 2017 for European Patent Application No. 12170379.7, 7 pages.
European Search Report dated Aug. 17, 2017 for European Patent Application No. 12170377.1, 7 pages.
European Office Action dated Aug. 28, 2017 for European Patent Application No. 12170379.7, 2 pages.
European Office Action dated Jul. 24, 2017 for European Patent Application No. 12170376.3, 2 pages.
European Search Report dated Jul. 19, 2017 for European Patent Application No. 12170378.9, 8 pages.
European Office Action dated Aug. 21, 2017 for European Patent Application No. 12170378.9, 2 pages.
SCADA (Supervisory Control and Data Acquisition). http://en.wikipedia.org/wiki/SCADA. Last accessed on Jan. 11, 2011, 9 pages.
IEC 61850. http://en.wikipedia.org/wiki/IEC_61850. Last accessed on Aug. 11, 2011, 4 pages.
"Electric Power Transmission". http://en.wikipedia.org/wiki/Electricity_transmission. Last accessed Dec. 30, 2010, 16 pages.
"Electric Power Distribution". http://en.wikipedia.org/wiki/Electric_power_distribution. Last accessed Dec. 30, 2010, 6 pages.
"Power System Automation". http://en.wikipedia.org/wiki/Power_system_automation. Last accessed Dec. 30, 2010, 4 pages.
"Smart Grid". http://en.wikipedia.org/wiki/Smart_power_grid. Last accessed Dec. 30, 2010, 16 pages.
"Transformer" http://en.wikipedia.org/wik/Transformer. Last accessed Dec. 30, 2010, 23 pages.
"Demand Response". http://en.wikipedia.org/wiki/Demand_response. Last accessed Dec. 30, 2010, 10 pages.
"Distributed Generation" . http://en.wikipedia.org/wiki/Distributed_generation. Last accessed Dec. 30, 2010, 5 pages.
Office Action dated Apr. 9, 2013 for U.S. Appl. No. 13/155,707, 41 pages.
Zimmer, et al. "Fault Tolerant Network Routing through Software Overlays for Intelligent Power Grids", 2010, Proceedings of the 2010 I EEE 16th international Conference on Parallel and Distributed Systems, ICPADS '10. 2010, 3 pages.

(56) References Cited

OTHER PUBLICATIONS

Motorola "Bringing Self-Awareness to the Grid, SCADA Systems Enhance Electric Utility Operations", 2009, Retrieved from the Internet on Jun. 12, 2013 at "www.motorola.com/ace3600", 4 pages.
Spack, et al. "Intelligent Transformer Substations in Modern Medium Voltage Networks as Part of Smart Grid", Nov. 2011, IEEE Sccion El Salvador, 7 pages.
Zhabelova, et al. "Multi-Agent Smart Grid Automation Architecture Based on IEC 61850/61499 Intelligent Logical Nodes", 2011, IEEE Transactions on Industrial Electronics, 10 pages.
Office Action dated Sep. 30, 2013 for U.S. Appl. No. 13/155,707, 56 pages.
Anjan Bose, "Smart Transmission Grid Applications and their supporting Infrastructure" IEEE Transactions on Smart Grid vol. 1, No. 1 Jun. 2010, pp. 11-19.
Budka et al, "Communication Network Architecture and Design Principles for Smart Grids", Journal Bell Labs Technical Journal—Green Information and Communications Technology (ICT) for Eco-Sustainability archive vol. 15 Issue 2, Aug. 2010, pp. 205-227.
Li et al., "Smart Transmission Grid: Vision and Framework" IEEE Transactions on Smart Grid, vol. 1 Issue 2, Sep. 2010, pp. 168-177.
Office Action dated Jan. 16, 2014 for U.S. Appl. No. 13/155,594, 38 pages.
Office Action dated Jan. 10, 2014 for U.S. Appl. No. 13/155,601, 24 pages.
Office Action dated Mar. 14, 2014 for U.S. Appl. No. 13/155,707, 43 pages.
Office Action dated Apr. 10, 2014 for U.S. Appl. No. 13/155,751, 47 pages.
Office Action dated Apr. 21, 2014 for U.S. Appl. No. 13/105,393, 46 pages.
Office Action dated May 8, 2014 for U.S. Appl. No. 13/155,594, 40 pages.
Office Action dated Jun. 9, 2014 for U.S. Appl. No. 13/155,615, 30 pages.
Higgins et al. "Distributed Power System Automation With IEC 61850, IEC 61499, and Intelligent Control", IEEE Transactions on Systems, Man, and Cybernetics—Part C: Applications and Reviews, vol. 41, No. 1, Jan. 2011, pp. 81-92.
Office Action dated Jun. 19, 2014 for U.S. Appl. No. 13/155,601, 30 pages.
Goldsman, et al. "Smart Dust: U Large-Scale, Low-Power, Flexible Sensor Networks", Feb. 2004, Dept of Electrical and Computer Engineering, University of Maryland, 40 pages.
Nlikravesh, et al. "Control of Nonlinear Systems via Dynamic Neural Network Control (DNNC): Adaptive Control, constraint Handling and Extension to MIMO Case", Mar. 1995, University of South Carolina and University of California, Berkeley, 5 pages.
Office Action dated Aug. 13, 2014 for U.S. Appl. No. 13/155,707, 62 pages.
Kempton et al., "Vehicle-to-grid power fundamentals: Calculating capacity and net revenue" Journal of Power Sources vol. 144 (Apr. 2005), pp. 268-279.
Brown et al., "Electric vehicles: The role and importance of standards in an emerging market" Energy Policy vol. 38, Mar. 2010, pp. 3797-3806.
Office Action dated Aug. 28, 2014 for U.S. Appl. No. 13/155,594, 49 pages.
Office Action dated Oct. 3, 2014 for U.S. Appl. No. 13/155,751, 57 pages.
European Search Report dated Oct. 16, 2014 for European Patent Application No. 12170004.1-1806 / 2533396, 5 pages.
Office Action dated Apr. 7, 2015 for U.S. Appl. No. 13/155,751, 60 pages.
Office Action dated Apr. 7, 2015 for U.S. Appl. No. 13/155,594, 52 pages.
Pong et al., "A laboratory setup of a power transmission line system scaled model for testing and validation of sensor network applications," Technical Report TR-2010-002, Department of Electrical and Electronic Engineering, The University of Hong Kong, Apr. 2010. [Online]. Available: http://www.eee.hku.hk/research/technical reports.html, retrieved on Apr. 7, 2015, 9 pages.
Office Action dated Jan. 15, 2015 for U.S. Appl. No. 13/155,601, 44 pages.
U.S. Department of Energy,"Reliability Improvements from the Application of Distribution Automation Technologies—Initial Results". American Recovery and Reinvestment Act of 2009, Smart Grid Investment Grant Program, Dec. 2012. Retrieved on Jan. 15, 2015, 45 pages.
Office Action dated Apr. 10, 2015 for U.S. Appl. No. 13/155,707, 73 pages.
Hauser, et al., "A Failure to Communicate: Next-Generation Communication Requirements, Technologies, and Architecture for the Electric Power Grid" IEEE Power & Energy Magazine. Mar./Apr. 2005. Retrieved on Apr. 10, 2015, 9 pages.
Non-Final Office Action dated Jun. 18, 2015 for U.S. Appl. No. 13/155,601, 30 pages.
European Office Action dated Jul. 10, 2015 for European Application No. 12170004.1, 3 pages.
Johnson, "Smart Grid Demonstration Project—Dynamic Line Rating (DLR)," ERCOT Reliability Operations Subcommittee Meeting, Jun. 25, 2010, 20 Pgs.
Huang et al., "New Type of Fiber Optic Sensor Network for Smart Grid Interface of Transmission System" 2010 IEEE Power and Energy Society General Meeting, Jul. 25-29, 2010, pp. 1-5.
Non-Final Office Action dated Oct. 2, 2015 for U.S. Appl. No. 13/155,594, 72 pages.
Final Office Action dated Oct. 19, 2015 for U.S. Appl. No. 13/155,707, 71 pages.
European Office Action dated Dec. 8, 2015 for European Application No. 12170004.1, 4 pages.
Office Action dated Jan. 13, 2016 for U.S. Appl. No. 13/155,601, 32 pages.
European Office Action dated Nov. 23, 2016 for European Application No. 12170004.1, 8 pages.
Baalbergen, et al.: "Outline of a New Hierarchical Agent-Based Voltage Instability Protection System", Proceedings of the 2010 IEEE Transmission and Distribution Conference and Exhibition, Jun. 14, 2010 (Jun. 14, 2010),XP031689278, DOI.' 10. 1109fTDC. 2010.5484647, 8 pages.
Guping Zheng, et al.: "Multi-Agent Based Control System for Multi-Microgrids", Proceedings of the 2010 International Conference on Computational Intelligence and Software Engineering, Dec. 30, 2010 (Dec. 30, 2010),XP031841252, DOI: 10. 1109IC/SE.2010_ 5676818, 4 pages.
Notice of Allowance dated Dec. 16, 2016 for U.S. Appl. No. 13/155,707, 42 pages.
Office Action dated Jan. 30, 2017 for U.S. Appl. No. 14/593,988, 39 pages.
Notice of Allowance dated Oct. 26, 2015 for U.S. Appl. No. 13/155,751, 102 pages.
Final Office Action dated Mar. 17, 2016 for U.S. Appl. No. 13/155,594, 64 pages.
Non-Final Office Action dated May 10, 2016 for U.S. Appl. No. 13/155,707, 74 pages.
Smith, Merrill. "2009 San Diego Symposium on Microgrids. Overview of the U.S. Department of Energy's Research & Development Activities on Microgrid Technologies" US Department of Energy Office of Electricity Delivery and Energy Reliability, Sep. 17, 2009, 21 pages.
Huayllas et al. "Microgrid Systems: Current Status and Challenges" 2010 IEEE/PES Transmission and Distribution, Conference and Exposition: Latin America, Nov. 8-10, 2010, pp. 7-12.
Office Action dated Mar. 22, 2013 for U.S. Appl. No. 13/105,393, 70 pages.
Office Action dated Jul. 18, 2013 for U.S. Appl. No. 13/155,594, 35 pages.
Office Action dated Jun. 21, 2013 for U.S. Appl. No. 13/155,601, 30 pages.
Office Action dated May 3, 2018 for U.S. Appl. No. 15/844,456, 9 pages.

LOAD PHASE BALANCING AT MULTIPLE TIERS OF A MULTI-TIER HIERARCHICAL INTELLIGENT POWER DISTRIBUTION GRID

CROSS-REFERENCE TO RELATED APPLICATION

This application is a continuation of, and claims priority to, U.S. application Ser. No. 13/155,751, filed Jun. 8, 2011, and entitled "LOAD PHASE BALANCING AT MULTIPLE TIERS OF A MULTI-TIER HIERARCHICAL INTELLIGENT POWER DISTRIBUTION GRID," the entirety of which is hereby incorporated herein by reference.

TECHNICAL FIELD

The subject specification generally relates to intelligent power distribution grids, e.g., to load phase balancing at multiple tiers of a multi-tier hierarchical intelligent power distribution grid.

BACKGROUND

Power grids have not undergone significant architectural changes since use of electricity for power was realized more than a century ago. The idea of a "Smart Grid" was introduced in the late 1990s, however, today, power grids still only employ limited intelligence in managing and providing power to consumers. Energy distribution systems are currently at a crossroads, as they confront the significant problem of imbalances of various kinds. Not only is the gap between supply and demand continuing to increase due to global population growth, but there also is a geographic imbalance in energy production and consumption patterns. These imbalances and uncertainties could be exacerbated in the future considering the rapidly increasing energy demands of newly industrialized nations, such as China, India, Brazil, and Russia, as these and other nations will compete for more generating sources to meet expected energy demands. While incorporating a wide variety of renewable (non-fossil fuel) energy sources is part of the solution to the increasing energy demands, it is not likely that incorporating renewable energy sources will be a panacea for the impending energy issues. Thus, it is clear that there also will have to be significant changes in the power distribution network to help meet future energy needs.

To facilitate improving power distribution to help meet future energy needs, improvement in conventional power grids is desired to minimize power loss in transmission of power from point of generation to point of usage, minimize unnecessary heating of power system components, minimize damage and wear on power system components, minimize power fluctuations, and improve communications in the power grid to improve power system performance. One particular challenge in conventional power systems (e.g., three-phase alternating current (AC) power systems) is managing power system imbalances, such as, for example, phase load imbalances. In many regions of the world, power is generated from a power generator, wherein the power is distributed to end-use nodes (e.g., homes) using multiple phases, such as three-phase AC power. When transmitting three-phase power via electrical power transmission lines, there can be transmission lines for each phase of the three-phase AC power. In three-phase AC power, it is desirable for the power for each of the respective phases to be 120° offset from the other phases (e.g., Phase A at 0°, Phase B at −120°, Phase C at −240°), with each phase having the same current or voltage amplitude, wherein power for each phase will be in the form of a sinusoidal wave, since it is AC power.

When three-phase AC power is connected to loads at the end-use nodes, it is desired for the loads to be distributed as evenly as practicable between the phases, so that the power system is balanced. In practice, power systems rarely have perfectly balanced loads, currents, voltages, or impedances in all three phases. Typically, homes and other end-use nodes (e.g., business buildings, sub-transmission components, micro power distribution sources, etc.), which carry respective loads (e.g., appliances, electric or hybrid-electric vehicles, etc.), are connected to one phased power line of the three-phase power lines. Load fluctuations and/or other power fluctuations can affect the balance of a system, which may cause a power system to become more and/or undesirably imbalanced. For example, connecting and disconnecting of appliances, electric or hybrid-electric vehicles, or other loads can impact or change the system balance. As another example, sometimes when connecting homes or other structures to a power grid, such structures are not connected to the distribution transformer or other component (e.g., three-phase power transmission lines) associated therewith, so as to evenly distribute the load across the three phases (e.g., people (e.g., servicemen) connecting homes to the distribution transformer or associated three-phase power lines sometimes connect more of loads to the same phased power line because it is easier to connect to the loads to that particular phased power line), which can result in power system imbalance. Undesirable power system imbalances can result in undesirable voltage fluctuations, power losses, increases in heat for system components which can cause damage or unnecessary wear on those system components, increase in maintenance and repair costs of the power system, etc.

Currently, communications is one area where changes are being made to power grids to create Smart Grids in order to facilitate improved power system performance. Presently, emerging Smart Grid networks are deployed using a variety of communications technologies, including wired (e.g., fiber, microwave, power line carrier (PLC), etc.) as well as public and private wireless networks (e.g., Wi-Fi), using the licensed and unlicensed spectrum. For example, utilities have used unlicensed spectrum for automatic meter reading (AMR) applications, wherein a smart meter, which can be found at locations of both residential and commercial customers, allows electrical consumption information to be identified and transmitted to distribution-level control center (DCC), typically at periodic (e.g., monthly) times. However, conventionally, communication technologies have been underutilized in power grids resulting in continued inefficiencies, including inefficiencies relating to managing and maintaining desired power system balance. Further, the emergence of distributed power generation systems (e.g., power generation systems that include a central power generation system as well as micro power generation sources, such as solar energy systems, wind power generation systems, etc.) to replace or supplement the relatively flat topography of traditional power distribution systems is likely to exacerbate the inefficiencies relating to managing and maintaining desired power system balance.

The above-described deficiencies of today's systems are merely intended to provide an overview of some of the problems of conventional systems, and are not intended to be exhaustive. Other problems with the state of the art and corresponding benefits of some of the various non-limiting embodiments may become further apparent upon review of the following detailed description.

SUMMARY

The following presents a simplified summary of the various embodiments in order to provide a basic understanding of some aspects described herein. This summary is not an extensive overview of the disclosed subject matter. It is intended to neither identify key or critical elements of the disclosed subject matter nor delineate the scope of the subject embodiments. Its sole purpose is to present some concepts of the disclosed subject matter in a simplified form as a prelude to the more detailed description that is presented later.

The disclosed subject matter comprises enhanced power system balance control for a multi-tier hierarchical electrical distribution network (EDN) (e.g., smart distribution grid (SDG)). The multi-tier hierarchical EDN can comprise a specified number of distribution network node controller (DNNC) components employed in various tiers to desirably control power system balance, data communications, and power distribution between respective tiers of the EDN to facilitate efficient power distribution. In an aspect, in each tier, a DNNC component can be associated with a power system balance component (PSBC) that can monitor power system balance, such as load phase balance, associated with multi-phase power distribution for that tier, and detect power system imbalances in that tier. In another aspect, the PSBC can analyze information relating to a detected power system imbalance and can identify (e.g., automatically) a power balance correction action that can rectify or compensate for the power system imbalance, wherein a power balance correction action can comprise, for example, switching (e.g., automatically or dynamically) certain loads (e.g., consumer consumption nodes (CCNs) (e.g., homes or businesses consuming power) connected to that portion of the tier of the EDN from a transmission line of one phase to a transmission line of another phase of the multi-phase power transmission lines to restore balance between phases of the multi-phase power for that portion of the tier, isolate a node or component that is at least partially causing the power system imbalance from other nodes and components in the EDN to facilitate restoring balance between phases of the multi-phase power for that portion of the tier, respectively adjust voltage or current amplitude of the respective transmission lines of the phases of the multi-phase power, send notifications relating to the power system imbalance to desired locations (e.g., CCN, another DNNC component, etc.) or entities (e.g., utility repairman) to provide information regarding the power system imbalance and/or request that a manual power system correction action be performed, and/ or filter out undesired (e.g., harmful) harmonics associated with the multi-phase power. The PSBC can perform (e.g., automatically) the power balance correction action in response to the detected power system imbalance to rectify or compensate for the imbalance. In another aspect, the DNNC component can transmit all or a desired portion of information relating to the power system imbalance (e.g., date and time the imbalance was detected, the power balance correction action that was taken, parameter values relating to the power system imbalance before and after correction, etc.) to another DNNC component, such as a DNNC component in a tier above the DNNC component that is transmitting the information to facilitate efficient power distribution (e.g., make decisions regarding future power allocations), obtain information indicating the effectiveness of a power balance correction action (e.g., to learn which correction actions are most effective, to determine whether a particular type of correction action should be modified due to not being sufficiently effective, etc.), obtain information relating to accounting and billing, etc.

In accordance with various aspects, the disclosed subject matter can comprise a system that includes an analyzer component that is configured to analyze information relating to power conditions associated with multi-phase power being distributed to one or more CCNs to facilitate dynamic identification of at least an imbalance in the multi-phase power when such imbalance occurs, wherein the one or more CCNs are located in a portion of a lower tier in a multi-tier EDN. The system can further include a first power control component that is configured to be associated with the analyzer component, and dynamically control distribution of the multi-phase power in the portion of the lower tier via at least one junction node based at least in part on the analysis of the information relating to power conditions associated with the multi-phase power in the portion of the lower tier, in accordance with at least one predefined control criterion, to at least control an amount of imbalance in the multi-phase power in the portion of the lower tier.

In accordance with various other aspects, the disclosed subject matter can comprise a method that includes the acts of receiving data relating to power conditions associated with multi-phase power being distributed in a portion of a lower level of a multi-level power distribution network (PDN) comprising one or more CCNs; and automatically controlling distribution of at least a portion of the multi-phase power to the one or more CCNs in the lower level based at least in part on the data relating to the power conditions associated with the multi-phase power, in accordance with at least one predefined control criterion, to at least control an amount of power system imbalance in the multi-phase power in the portion of the lower level.

In accordance with still other aspects, the disclosed subject matter can comprise a system that includes means for at least one junction node that is configured to be associated with one or more CCNs located in a lower tier of a multi-tier electrical distribution network EDN, receive at least one control command from a power control component, and execute the at least one control command to facilitate control of distribution of multi-phase power in the lower tier. The system can further include means for at least one switch component that is configured to be associated with the at least one junction node, and switch an electrical connection of at least one CCN of the one or more CCNs from a first phased power transmission line to a second phased power transmission line of a plurality of phased power transmission lines that distribute the multi-phase power to reduce an amount of power system imbalance in the multi-phase power, in response to the at least one control command.

The following description and the annexed drawings set forth in detail certain illustrative aspects of the disclosed subject matter. These aspects are indicative, however, of but a few of the various ways in which the principles of the various embodiments may be employed and the disclosed subject matter is intended to include all such aspects and their equivalents. Other advantages and distinctive features of the disclosed subject matter will become apparent from the following detailed description of the various embodiments when considered in conjunction with the drawings.

DETAILED DESCRIPTION

Figure 1:
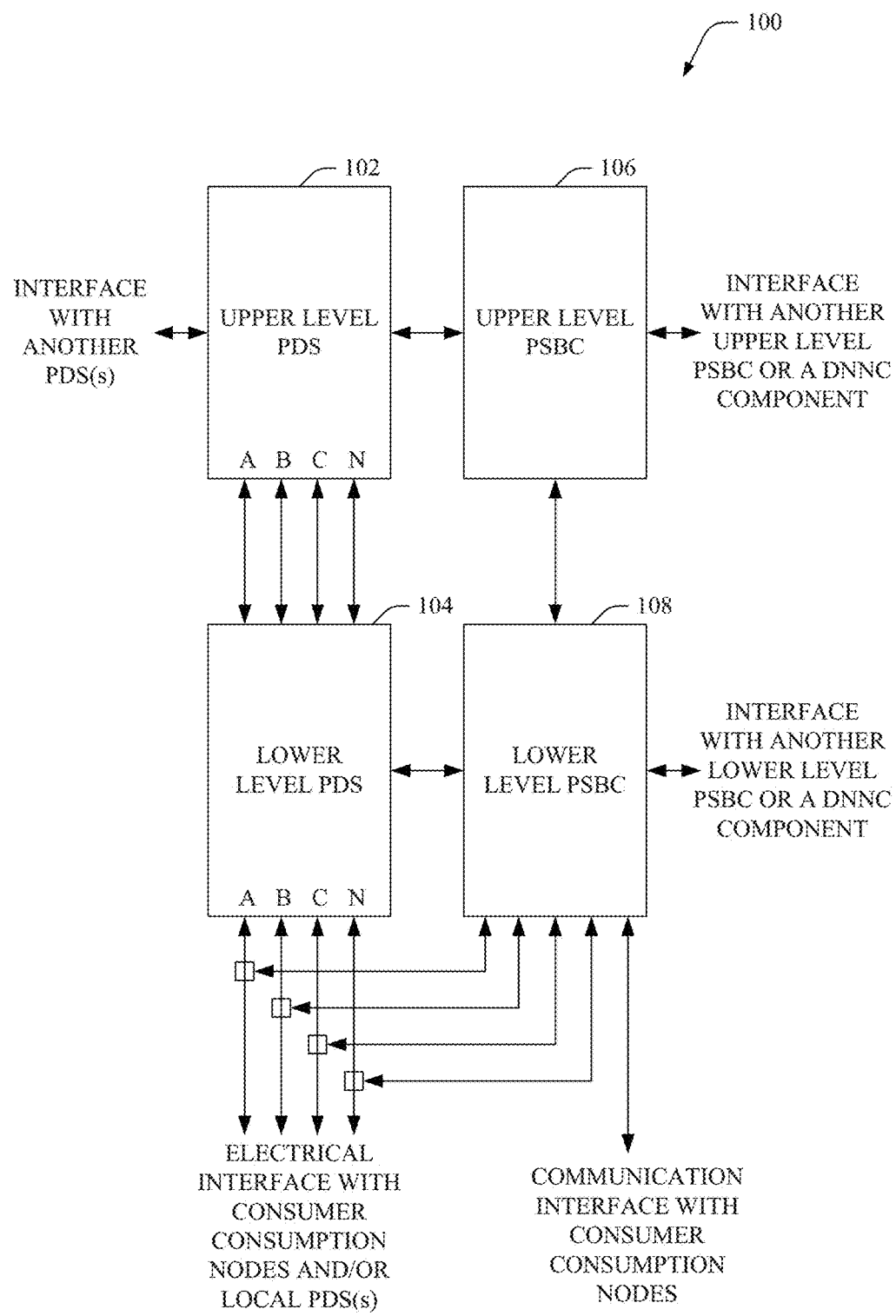
FIG. 1 illustrates a block diagram of an example system comprising a hierarchical control and communication architecture for a multi-tier electrical distribution network (EDN) to facilitate management of power system balance in respective tiers of the multi-tier EDN in accordance with various aspects and embodiments of the disclosed subject matter.

The disclosed subject matter is described with reference to the drawings, wherein like reference numerals are used to refer to like elements throughout. In the following description, for purposes of explanation, numerous specific details are set forth in order to provide a thorough understanding of the various embodiments of the subject disclosure. It may be evident, however, that the disclosed subject matter may be practiced without these specific details. In other instances, well-known structures and devices are shown in block diagram form in order to facilitate describing the various embodiments herein.

As used in this application, the terms "component," "system," "platform," "interface," "node", "source", "agent", and the like, can refer to and/or can include a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

The disclosed subject matter comprises enhanced power system balance control for a multi-tier hierarchical electrical distribution network (EDN) (e.g., smart distribution grid (SDG)). The multi-tier hierarchical EDN can comprise a specified number of distribution network node controller (DNNC) components employed in various tiers to desirably control power system balance, data communications, and power distribution between respective tiers of the EDN to facilitate efficient power distribution. In an aspect, in each tier, there can be a power system balance component (PSBC) that can be associated with the DNNC component of that tier and can monitor power system balance, such as load phase balance, associated with multi-phase power distribution for that tier, and detect power system imbalances in that tier. The PSBC can analyze information relating to a detected power system imbalance and can identify (e.g., automatically) a power balance correction action that can rectify or compensate for the imbalance in that portion of the tier of the multi-tier hierarchical EDN, wherein a power balance correction action can comprise, for example, switching (e.g., automatically or dynamically) certain loads (e.g., consumer consumption nodes (CCNs) (e.g., homes or businesses consuming power) connected to that portion of the tier of the EDN from a transmission line of one phase to a transmission line of another phase of the multi-phase power transmission lines to restore balance between phases of the multi-phase power for that portion of the tier, isolate a node or component that is at least partially causing the power system imbalance from other nodes and components in the EDN to facilitate restoring balance between phases of the multi-phase power for that portion of the tier, respectively adjust voltage or current amplitude of the respective transmission lines of the phases of the multi-phase power, send notifications relating to the power system imbalance to desired locations (e.g., CCN, another DNNC component, etc.) or entities (e.g., utility repairman) to provide information regarding the power system imbalance and/or request that a manual power system correction action be performed, and/or filter out undesired (e.g., harmful) harmonics associated with the multi-phase power. The PSBC can perform (e.g., automatically) the power balance correction action in response to the detected power system imbalance to rectify or compensate for the power system imbalance. In another aspect, the DNNC component can transmit all or a desired portion of information relating to the power system imbalance (e.g., date and time the imbalance was detected, the power balance correction action that was taken, parameter values relating to the power system imbalance before and after correction, etc.) to another DNNC component, such as a DNNC component in a tier above the DNNC component that is transmitting the information to facilitate efficient power distribution (e.g., make decisions regarding future power allocations), obtain information indicating the effectiveness of a power balance correction action (e.g., to learn which correction actions are most effective, to determine whether a particular type of correction action should be modified due to not being sufficiently effective, etc.), obtain information relating to accounting and billing, etc.

Figure 2:
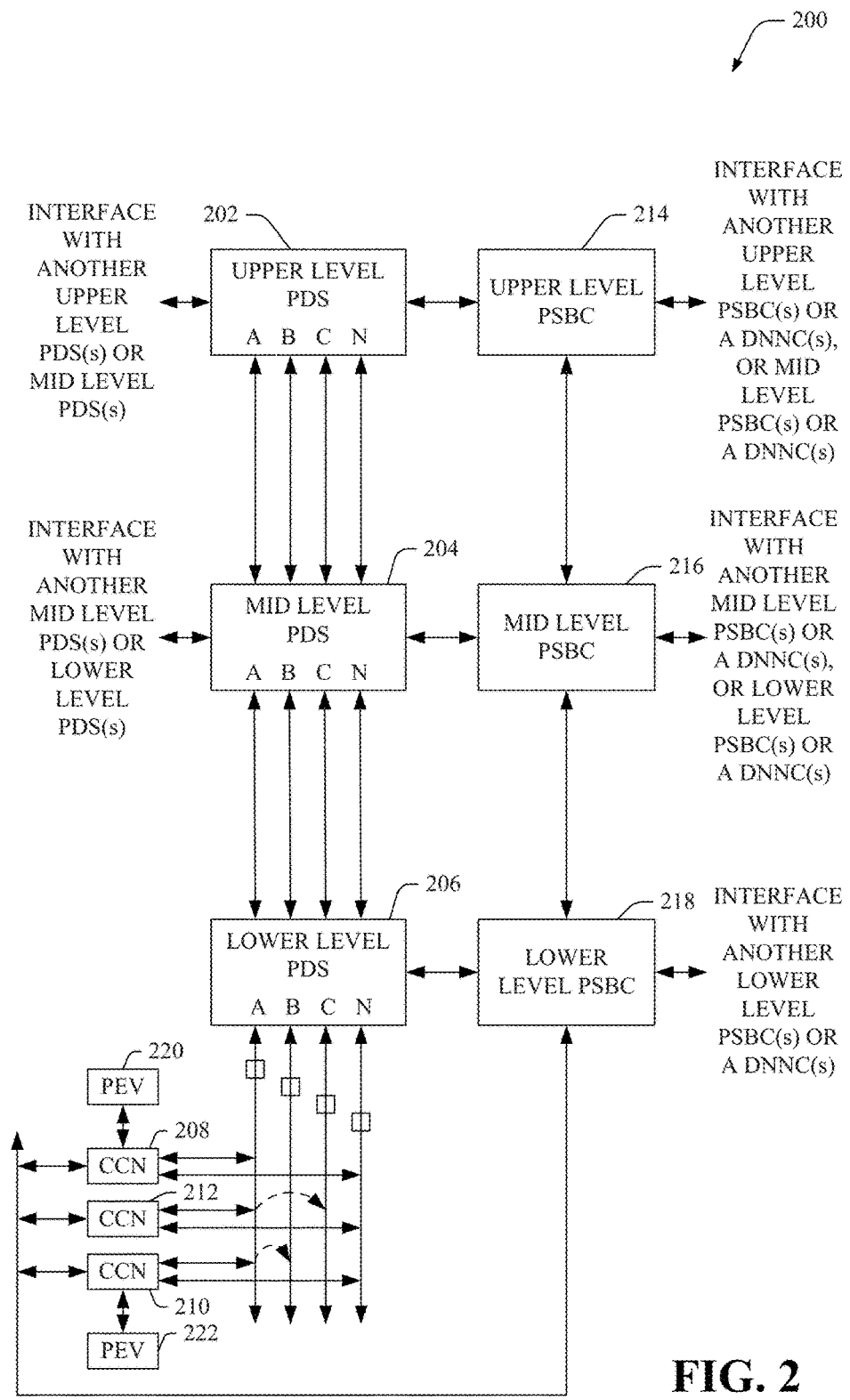
FIG. 2 depicts a block diagram of an example system having a multi-tier (e.g., three-tier) hierarchical control and communication architecture for an EDN in accordance with various aspects and embodiments of the disclosed subject matter.
Figure 7:
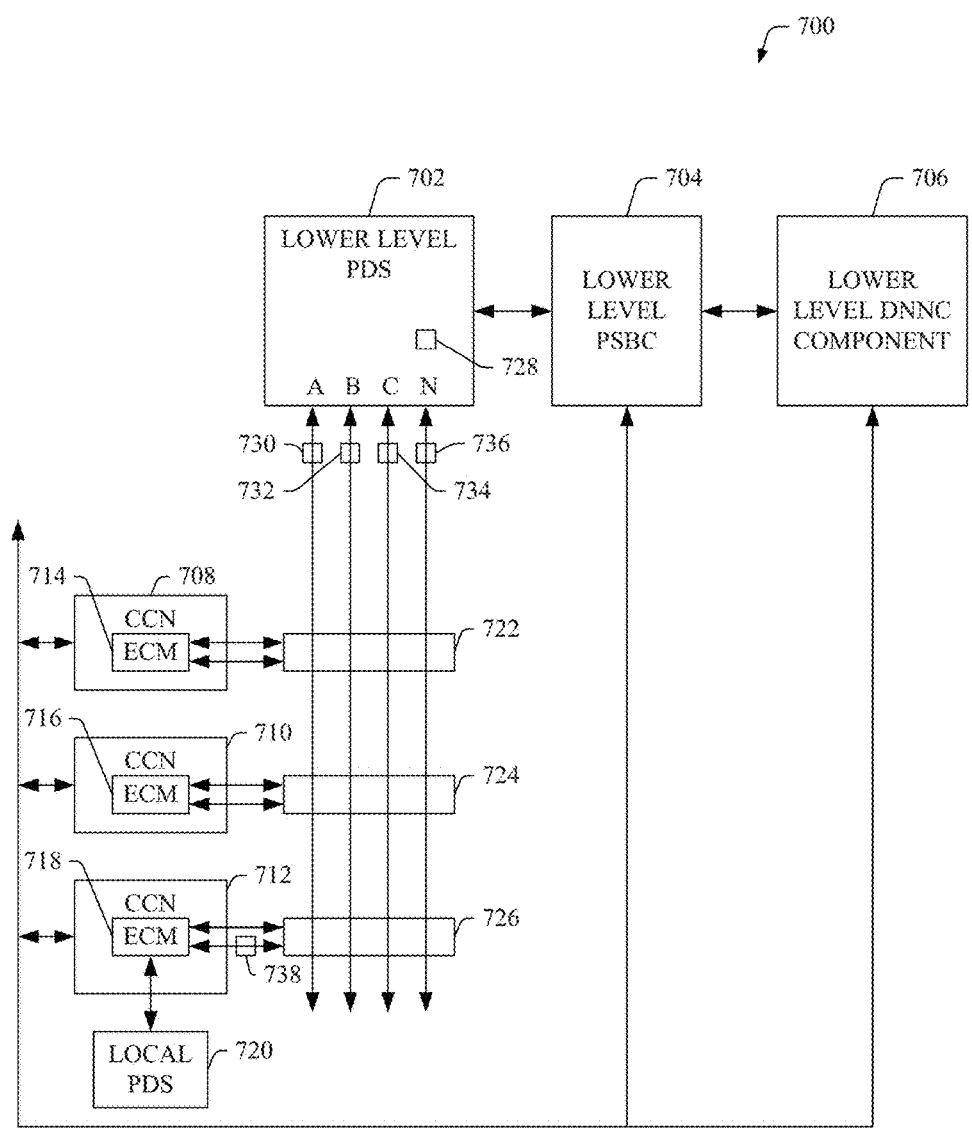
FIG. 7 depicts a block diagram of an example system that can detect power system imbalance and perform a power system correction action(s) to facilitate control of multi-phase power distribution for at least a portion of a lower tier of a multi-tier EDN in accordance with various aspects and embodiments of the disclosed subject matter.

Referring to the drawings, FIG. 1 is a block diagram of an example system 100 comprising a hierarchical control and communication architecture for a multi-tier EDN to facilitate management of power system balance in respective tiers of the multi-tier EDN in accordance with various aspects and embodiments of the disclosed subject matter. The system 100 can provide hierarchical and de-centralized control of and communication (e.g., two-way communication) relating to distribution nodes (e.g., power distribution sources (PDSs)) in the power grid in the EDN (which also can be referred to, for example, as a power distribution network (PDN), a smart distribution grid (SDG), or a power grid). In an aspect, the system 100 can include an upper level PDS 102 (e.g., power generator with a power transformer, power sub-station with a power transformer) that can generate and/or supply electrical power to one or more CCNs (e.g., residential premises, commercial or industrial premises, etc.) (not shown in FIG. 1; e.g., as shown in FIGS. 2 and 7) associated with the upper level PDS 102 in the portion of the EDN encompassed by the upper level PDS 102. The CCNs also can be referred to as end-use nodes, for example. The power provided by the upper level PDS 102 can be multi-phase power, such as, for example, three-phase power comprising Phase A, Phase B and Phase C that can be transmitted via respective power transmission lines (e.g., transmission line A, transmission line B, and transmission line C) to the lower level PDS 104, wherein there also can be a neutral line (N) between the upper level PDS 102 and lower level PDS 104, to facilitate desired multi-phase power distribution.

In another aspect, the system 100 can comprise a lower level PDS 104 (e.g., power distribution transformer) that can be electrically connected to the upper level PDS 102, wherein the lower level PDS 104 can be under the upper level PDS 102 in the hierarchy of the EDN and can be employed to distribute electrical power to the one or more CCNs associated with (e.g., electrically connected to) the lower level PDS 104. The power can be multi-phase power, such as, for example, three-phase power comprising Phase A, Phase B and Phase C that can be transmitted via respective power transmission lines (e.g., transmission line A, transmission line B, and transmission line C), wherein there also can be a neutral line (N) between the lower level PDS 104 and a CCN, to facilitate desired multi-phase power distribution. Typically, the upper level PDS 102 can provide power at a higher voltage level (e.g., greater than 100 kilovolts (kV)) (e.g., after the voltage of the electric power is stepped-up to facilitate efficient transmission) via electrical transmission lines to the lower level PDS 104, and the lower level PDS 104 can convert (e.g., transform, step-down, etc.) the higher voltage level to a desired lower voltage level (e.g., 110 volts (V), 220 V, . . . , 4 kV, . . . , 13 kv, . . . ) suitable for use at the CCNs. For example, the upper level PDS 102 can be a power generation plant that serves a certain geographical area (e.g., city, county, district, or other defined area), and the lower level PDS 104 can be a distribution transformer (e.g., electromagnetic type of distribution transformer) that can be attached to a pole or a pad at or near a portion of the certain geographical area wherein the subset of CCNs associated with the lower PDS 104 are located to distribute the desired power to those associated CCNs. In an aspect, the upper level PDS 102 also can be associated with (e.g., electrically connected to or interfaced with) other upper level PDSs (not shown in FIG. 1 for reasons of brevity and clarity) in the EDN (e.g., in the same tier of the multi-tier EDN) to facilitate transferring power between the upper level PDS s to enable the respective upper level PDSs to meet power needs in their respective portions of the EDN.

Figure 20:
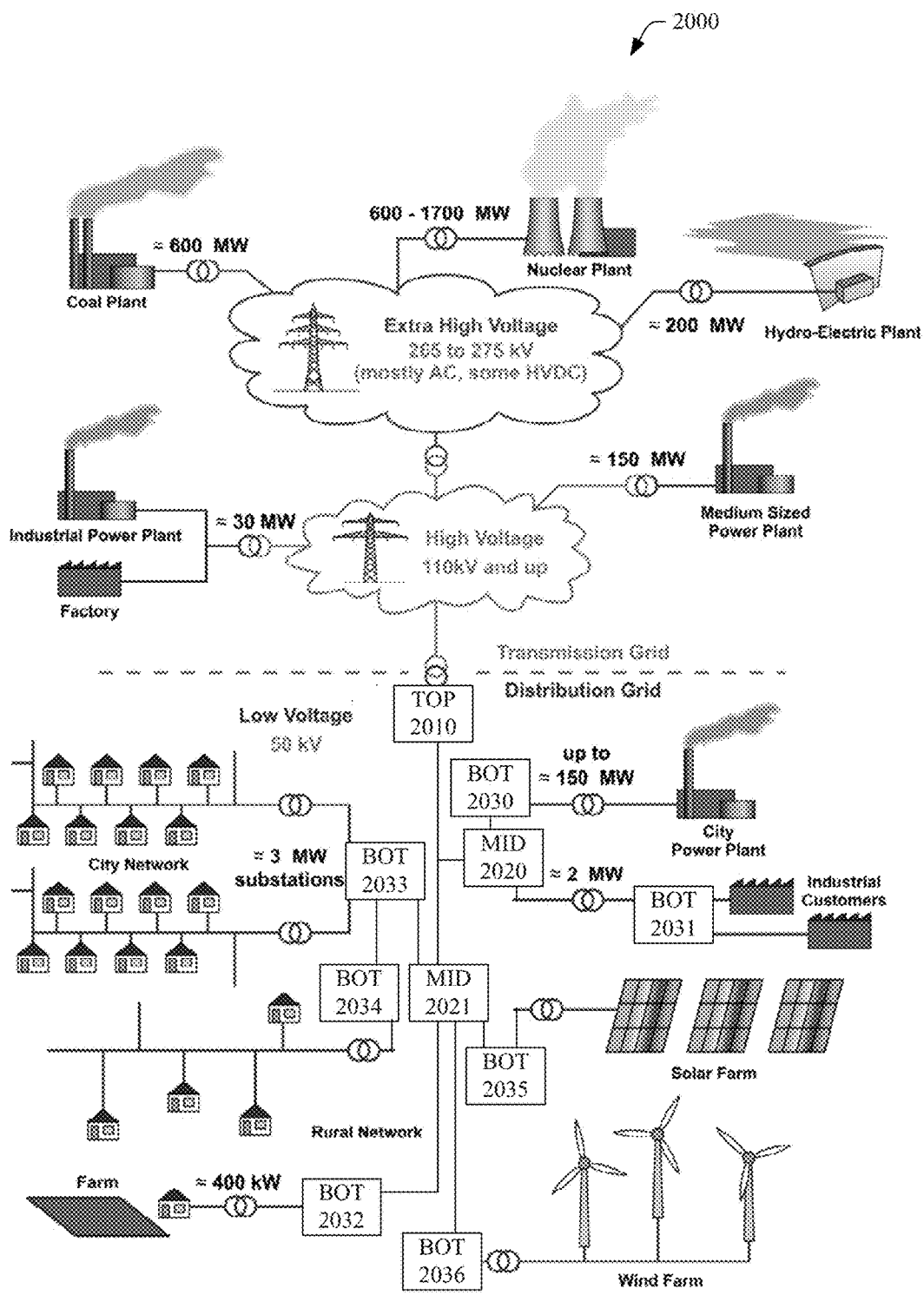
FIG. 20 depicts a diagram of an example electrical grid environment in which the various aspects of the disclosed subject matter can be practiced.

While the system 100 is illustrated herein to show that the lower level PDS 104 receives power from the upper level PDS 102 to supply power to the CCNs, the disclosed subject matter is not so limited, as in accordance with various embodiments, a CCN also can comprise or be associated with (e.g., electrically connected to) a local PDS (also referred to herein as a micro PDS) (e.g., solar power generation system, wind power generation system, geothermal power generation system, hydroelectric power generation system, diesel-type power generation system, stored power (e.g., power stored in charged batteries of an electric or hybrid vehicle), etc.) (not shown in FIG. 1; e.g., as shown in FIGS. 2, 7, and 20) that can produce and/or otherwise provide power for use by the CCN to reduce or even eliminate the need for that CCN to obtain power from the power grid via the lower level PDS 104 and/or can provide power to other CCNs associated with the power grid, such as, for example, CCNs that are associated with the same lower level PDS 104, when the local PDS associated with the CCN generates power in excess of the amount of power used and/or stored by that CCN or when power is otherwise desired (e.g., in emergency situations) by the EDN from the local PDS, as more fully disclosed herein. For instance, the local PDS of the CCN can provide any excess power to another CCN(s) directly or, more typically, via the lower level PDS 104, wherein, for example, routing the power via the lower level PDS 104 can facilitate desired tracking of the amount of power being provided to the power grid by the local PDS and desired control over distribution of power from the local PDS to other CCNs in that portion of the tier or elsewhere in the power grid.

Conventionally, power distribution systems are "top down" systems whereby power is distributed down from a central power generation system to transformers that transform the power and supply it to CCNs with limited communication of information (e.g., information limited to periodic (e.g., monthly) power usage information) from the lower nodes (e.g., CCNs via enhanced consumer meters (ECMs), such as smart meters or other meters employing advanced metering infrastructure (AMI)) in the power grid to the central power generation system. In multi-phase (e.g., three-phase) power distribution systems, there can be imbalances in power distribution due in part to connecting and disconnecting, or switching on and off, of power consumption devices (e.g., appliances, electric or hybrid electric vehicles, etc.) by CCNs in a portion of a power grid associated with a particular lower level PDS; local PDSs going online or offline, or having significant or sudden changes in power generation, in that portion of the power grid; disruption of power transmission lines in that portion of the power grid or elsewhere in the power grid; undesired reconnection of CCNs to power transmission lines in that portion of the power grid after disruption or disconnection (e.g., connecting too many CCNs to one phased transmission line relative to other phased transmission lines); etc. Such power imbalances can result in inefficient power distribution; increased heat, wear and/or damage to components of the power grid; increased heat, wear and/or damage to the consumer appliances or devices; and/or other undesired problems. It is desirable to be able to manage power distribution, including any identified power imbalances, in a more localized way to facilitate more efficient power distribution in a power grid. It also is desirable to have improved communication between lower nodes and upper nodes in the multi-tier EDN to more efficiently manage power distribution. Management of power distribution locally, and communication between lower nodes and upper nodes in the multi-tier EDN, will continue to become increasingly important as more local PDSs are introduced into the EDN and more high power consumption devices, such as electric vehicles and hybrid electric vehicles are connected to the EDN to charge their batteries.

To that end, in accordance with various aspects, the system 100 can provide an enhanced hierarchical power system control and communication infrastructure to facilitate efficient power distribution to CCNs associated with the EDN that overcomes the deficiencies in the conventional technology relating to power distribution. In an aspect, the system 100 can employ a specified number of PSBCs, including upper level PSBC 106 and lower level PSBC 108, that can be respectively associated with (e.g., communicatively and electrically connected to and interfaced with) the upper level PDS 102 and lower level PDS 104 in the multi-tier EDN to facilitate managing power distribution, including managing (e.g., controlling, reducing and/or minimizing) power system imbalances, in their respective tiers of the multi-tier EDN. Employing PSBCs in respective tiers of a multi-level EDN can enable the lower level PSBC 108 to control power distribution in the lower level of the multi-level EDN with reduced or minimal involvement of a PSBC in a higher level, such as the upper level (or a middle level), of the multi-level EDN in controlling the power distribution in the lower level in accordance with the predefined control criteria, as more fully disclosed herein.

In an aspect, the lower level PSBC 108 can monitor power conditions and detect undesired power conditions, such as, for example, power imbalances, in the multi-phase power being distributed to the CCNs in the portion of the lower tier of the multi-tier EDN that is controlled by the lower level PSBC 108. For example, the lower level PSBC 108 can comprise and/or be associated with one or more sensors (e.g., a power sensor, voltage phase balance sensor, current phase balance sensor, load phase balance sensor, heat sensor, fault sensor, harmonic sensor, etc.) (not shown in FIG. 1; as shown in FIG. 7) that can monitor power conditions in each power transmission line (e.g., transmission lines A, B, C) and the neutral line (N) to determine or identify relative voltage levels, relative current levels, relative load levels (e.g., resistive, capacitive and/or inductive load levels), relative power levels, power system faults, harmonic factors or levels, and/or other desired parameter values, in relation to transmission of multi-phase power in the portion of the lower tier of the multi-tier EDN controlled by the PSBC 108. Based at least in part on information obtained from the one or more sensors, the PSBC 108 can detect and identify a relative imbalance in power distribution between the respective phases of the multi-phase power transmission lines. For instance, the PSBC 108 can detect and identify when a parameter value, or relative parameter values of respective phases, relating to power system balance is outside of a predefined power-system-balance threshold value (e.g., higher than a maximum threshold limit, or below a minimum threshold limit) or a predefined set of power-system-balance threshold values (e.g., upper threshold limit and lower threshold limit).

For example, when operating normally, a typical three-phase power system generally will still have a certain tolerable level of power system imbalance. In accordance with the disclosed subject matter, a PSBC (e.g., 106, 108) can detect and identify when there is a power system imbalance in its portion of its tier that is outside of or beyond (e.g., greater than) the certain tolerable level of power system imbalance (e.g., greater than a predefined maximum threshold amount of power system imbalance).

In an aspect, the lower level PSBC 108 can analyze information relating to a detected power system imbalance and can identify (e.g., automatically) one or more power balance correction actions that can, wholly or at least partially, rectify or compensate for the power system imbalance in that portion of the tier of the multi-tier hierarchical EDN controlled by the lower level PSBC 108, based at least in part on predefined control criteria (also referred to herein as predefined power system control criteria). In accordance with various aspects, a power balance correction action can comprise, for example, switching (e.g., automatically or dynamically; or manually (e.g., via automatic notification sent to an utility repair person)) certain loads associated with CCNs connected to that portion of the tier of the EDN from a transmission line of one phase (e.g., Phase A) to a transmission line of another phase (e.g., Phase B) of the multi-phase power transmission lines to restore phase balance between phases of the multi-phase power for that portion of the tier; isolate a node (e.g., CCN, local PDS, etc.) or component that is at least partially causing the power system imbalance from other nodes and components in the EDN to facilitate restoring balance between phases of the multi-phase power for that portion of the tier; respectively adjust voltage or current amplitude of the respective power transmission lines of the phases of the multi-phase power; communicate notifications relating to the power system imbalance to desired locations (e.g., CCN, DNNC component, etc.) or entities (e.g., utility company and/or associated utility repairman) to provide information regarding the power system imbalance and/or request that a manual power system correction action be performed; and/or filter out (e.g., automatically or dynamically) undesired (e.g., harmful) harmonics associated with the multi-phase power. In another aspect, the lower level PSBC 108 can perform (e.g., automatically or dynamically) the one or more power balance correction actions in response to the detected power system imbalance to rectify or compensate for the power system imbalance, which can reduce, minimize, or eliminate the power system imbalance in that portion of the tier of the multi-tier EDN controlled by the lower level PSBC 108.

Similarly, the upper level PSBC 106 can monitor power conditions associated with multi-phase power being distributed via the power transmission lines (e.g., A, B and C) and associated neutral line (N) from the upper level PDS 102 to the lower level PDS 104 and other lower level PDSs (not shown), if any, associated with the upper level PSBC 106. The upper tier of the EDN can employ one or more sensors (not shown in FIG. 1) that can be distributed throughout the upper tier, including the power transmission lines and neutral line between the upper level PDS 102 and lower level PDS 104, to monitor and sense power conditions in that portion of the upper tier controlled by the PSBC 106. Based at least in part on information (e.g., parameter values, flags or indicators indicating a particular parameter value is outside of a predefined threshold parameter value or set of values, etc.) received from the one or more sensors, the upper level PSBC 106 can detect power system imbalances in those power lines, for example, relative to each other. The upper level PSBC 106 can identify (e.g., automatically or dynamically) and/or perform (e.g., automatically or dynamically) one or more power system correction actions, to, wholly or at least partially, rectify or compensate for the detected imbalance in that portion of the tier between the upper level PDS 102 and lower level PDS 104 in the multi-tier hierarchical EDN. In accordance with various aspects, a power balance correction action can comprise, for example, switching (e.g., automatically or dynamically; or manually (e.g., via automatic notification sent to an utility repair person)) certain loads (e.g., associated with the lower level PDS 108 and/or other lower level PDSs (not shown) associated with the upper level PDS 106) from a transmission line of one phase (e.g., Phase A) to a transmission line of another phase (e.g., Phase B) of the multi-phase power transmission lines to facilitate restoring a desired phase balance between phases of the multi-phase power for that portion of the tier controlled by the upper level PSBC 106; isolate a node (e.g., CCN, PDS, etc.) or component that is at least partially causing the power system imbalance from other nodes and components in the EDN to facilitate restoring a desired balance between phases of the multi-phase power for that portion of the tier; respectively adjust voltage or current amplitude of the respective power transmission lines of the phases of the multi-phase power being provided to the lower level PDS 104 and/or other lower level PDSs associated with that portion of the tier controlled by the upper level PSBC 106; communicate notifications relating to the power system imbalance to desired locations (e.g., CCN, a DNNC component, lower level PSBC 108, etc.) or entities (e.g., utility company and/or associated utility repairman) to provide information regarding the power system imbalance and/or request that a manual power system correction action be performed; and/or filter out (e.g., automatically or dynamically) undesired (e.g., harmful) harmonics associated with the multi-phase power.

It is to be appreciated and understood that, in accordance with various embodiments and aspects, the lower level PSBC 108 and/or the upper level PSBC 106 can monitor for and detect power system imbalances relating to power being distributed from the upper level PSBC 106 to the lower level PSBC 108, wherein the upper level PSBC 106 can identify or perform a desired power system correction action(s), or the lower level PSBC 108 can identify and/or perform a desired power system correction action(s) or can send a notification message to the upper level PSBC 106 regarding the power system imbalance so that the upper level PSBC 106 can identify and/or perform the desired power system correction action(s), to facilitate rectifying or compensating for the detected power system imbalance.

In accordance with various aspects, there can be real time or near real time communication between the various nodes (e.g., PSBC, DNNC component, PDS, ECMs, junction node, etc.) of the multi-tier EDN to facilitate real time or at least near real time control of power distribution in the EDN, as more fully disclosed herein. For instance, data can be obtained or sampled at a desired level of granularity (e.g., 1 second, 1 millisecond, or other desired time period to attain the desired level of granularity) by a node, such as a PSBC (e.g., 106, 108) from an associated PDS (e.g., 102, 104), a sensor(s), a CCN, or other associated node. The data can be aggregated and/or processed (e.g., parsed, filtered, compressed, and/or encrypted, etc.), as desired, to obtain a desired subset of data, wherein the subset of data can be communicated in real time or near real time between the lower level PBSC 106 (or associated lower level DNNC) and the upper level PSBC 108 (or associated upper level DNNC). A PBSC (e.g., 106, 108) also can aggregate and/or process the obtained or sampled data to facilitate detecting and identifying power system imbalances, and identifying an appropriate power system correction action to take in response to an identified power system imbalance.

Turning to FIG. 2, depicted is a block diagram of an example system 200 having a multi-tier (e.g., three-tier) hierarchical control and communication architecture for an EDN in accordance with various aspects and embodiments of the disclosed subject matter. The system 200 can be employed to facilitate real time, or at least near real time, control and communication between various nodes at various levels in the hierarchy to facilitate real time, or at least near real time, control of power distribution to CCNs in the EDN. In an aspect, the system 200 can comprise an upper (e.g., top) level PDS 202, middle (mid) or intermediate level PDS 204, and a lower (e.g., lowest) level PDS 206, wherein the upper level PDS 202 (e.g., power generation plant) and lower level PDS 206 (e.g., distribution transformer) each can be the same as or can comprise the same or similar functionality as respective components as more fully disclosed herein. The mid level PDS 204 can be associated with (e.g., electrically connected to) the upper level PDS 202 and lower level PDS 206, and can be, for example, a power sub-station in between the upper level PDS 202 and lower level PDS 206 in the power distribution chain. The mid level PDS 204 can receive higher voltage level electrical power (e.g., multi-phase power, such as three-phase power) from the upper level PDS 202 and can convert the higher voltage level of the electrical power to a middle voltage level that is lower than the higher voltage level, wherein the mid level PDS 204 can transfer the electric power (e.g., multi-phase power, such as three-phase power) having the mid voltage level to one or more lower level PDSs, such as lower level PDS 206, which can convert the mid voltage level of the electric power to a lower voltage level suitable for use by the CCNs, such as CCNs 208, 210 and 212, associated with the lower level PDS(s) (e.g., 206), and the power having the lower voltage level can be distributed to the CCNs, as desired.

In another aspect, the upper level PDS 202 can be associated with (e.g., connected to or interfaced with) an upper level PSBC 214, the mid level PDS 204 can be associated with a mid level PSBC 216, and the lower level PDS 206 can be associated with a lower level PSBC 218. The upper level PSBC 214 and lower level PSBC 218 each can be the same or similar as or can comprise the same or similar functionality as respective components as more fully disclosed herein. The mid level PSBC 216 can comprise the same or similar functionality as the upper level PSBC 214 or lower level PSBC 218, except that the mid level PSBC 216 can be employed to facilitate controlling power distribution, including dynamically managing power system balance, for the mid level PDS 204, for example, to one or more lower level PDSs (e.g., 206) associated with the mid level PDS 204, and can facilitate controlling communication of data between the mid level PSBC 216 and other control nodes associated therewith (e.g., upper level PSBC 214, lower level PSBC 218).

The system 200 can be a multi-level (e.g., three-tier) integrated distribution management system (IDMS), that can comprise, for example, an upper level of the hierarchy of the EDN, comprising the upper level PDS 202 and associated upper level PSBC 214, wherein the upper level of the hierarchy also can be referred to as a smart distribution management system (SDMS); a mid level of the hierarchy of the EDN, comprising the mid level PDS(s) (e.g., 204) and associated mid level PSBC(s) (e.g., 216), wherein the mid level of the hierarchy also can be referred to as a smart mini distribution management system (SmDMS); and the lower level of the hierarchy of the EDN, comprising the lower level PDS(s) (e.g., 206) and associated lower level PSBC(s) (e.g., 218), wherein the lower level of the hierarchy also can be referred to as a smart micro distribution management system (SµDMS). The multi-level hierarchical system can decentralize the intelligence aspects of the system 200 by incorporating intelligence into each level of the hierarchy to facilitate advancing real time, or at least near real time, automation (e.g., relating to sensing, control, protection, etc.) of components associated with the system 200. In accordance with various aspects, the system 200 can manage data collection, archiving, and retrieval to facilitate reducing or minimizing communication latency of data flow between control nodes in various levels of the hierarchy. As more fully disclosed herein, the system 200 can employ two-way communication at each level of the hierarchy, wherein each level of the hierarchy can employ respective communication standards and protocols, as well as respective communication bandwidths. Such communication aspects of the system 200 can facilitate real time, or at least near real time, control of power distribution in the respective tiers of the multi-tier EDN.

It is to be appreciated and understood that, in accordance with various non-limiting embodiments, while the PSBCs and PDSs have respectively been referred to as upper level PSBC, upper level PDS, mid level PSBC, mid level PDS, lower level PSBC, and lower level PDS, as desired, the respective components also can be referred to as a first level PSBC, first level PDS, second level PSBC, second level PDS, third level PSBC, or third level PDS. Further, one or more embodiments also can include a fourth, a fifth, or more levels of respective components (e.g., PSBCs, PDSs, etc.) in the multi-level EDN. Further, the terms "parent" or "senior" can indicate a higher level PSBC and the terms "child" or "junior" can indicate a PSBC (e.g., lower level PSBC) or PDS that is at a lower level in the hierarchy than the higher level (e.g., "parent" or "senior") PSBC or PDS, and the term "tier" can be used as an alternative to the term "level", as desired.

In an aspect, the disclosed subject matter can employ the communication control and power distribution control exercised by the lower level nodes to facilitate maximizing the net power consumption of the CCNs at the lower hierarchy level of the EDN so that there is reduced or minimal involvement of the upper level nodes of the EDN in managing power distribution, including managing power system balance, in supplying power to the CCNs (e.g., 208, 210, 212) associated with a lower level PDS 206 and lower level PSBC 218. The lower level PSBC 218 can at least partially control the power distribution associated with the lower level PDS 206 to the CCNs 208, 210 and 212 with reduced or minimal involvement of the mid level PDS 204 and associated mid level PSBC 216, and upper level PDS 202 and associated upper level PSBC 214, in managing power distribution to the CCNs 208, 210 and 212 associated with a lower level PDS 206 and lower level PSBC 218, in accordance with aspects disclosed herein. In another aspect, the mid level PSBC 216 can at least partially control the power distribution associated with the mid level PDS 204 to the lower level PDSs (e.g., 206) (and thereby the CCNs (e.g., 208, 210, 212) respectively associated therewith), with reduced or minimal involvement of the upper level PDS 202 and associated upper level PSBC 214, in management of power distribution associated with a mid level PDS 204 and mid level PSBC 216, in accordance with aspects disclosed herein.

For example, the lower level PSBC 218 can monitor and detect a power system imbalance (e.g., load phase imbalance) in the multi-phase power being distributed to the CCNs 208, 210 and 212. For instance, as depicted, CCNs 208, 210 and 212 are each connected to the power line of Phase A, which can result in a load phase imbalance, since there are no CCNs connected to the power lines of Phase B and Phase C. In such instance, the PSBC 218, via one or more sensors associated with the power lines and/or lower level PDS 206, can detect that power system imbalance. The PSBC 218 can identify (e.g., automatically or dynamically) a power system correction action to perform in response to the detected power system imbalance. For instance, the PSBC 218 can identify a power system correction action that specifies that CCN 208 is to remain connected to the Phase A power line, CCN 210 can be switched from the Phase A power line to the Phase B power line, and CCN 212 can be switched from the Phase A power line to the Phase C power line, to facilitate desirably balancing the power system (e.g., reducing or minimizing power system imbalance). The PSBC 218 can perform (e.g., automatically or dynamically) the identified power system correction action and can switch CCN 210 from the Phase A power line to the Phase B power line, and switch CCN 212 from the Phase A power line to the Phase C power line. For instance, the PSBC 218 can comprise or be associated with respective junction nodes (not shown) at which CCN 210 and CCN 212 are respectively connected to the power lines associated with the lower level PDS 206. The PSBC 218 can have the junction node associated with CCN 210 switch the CCN 210 from the Phase A power line to the Phase B power line, and can have the junction node associated with CCN 212 switch the CCN 212 from the Phase A power line to the Phase C power line.

As another example, initially, there can be a plurality of CCNs, including CCNs 208, 210 and 212, and other CCNs (not shown), in the lower level of the EDN and connected to respective phased power lines of the lower level PDS 206, such that that portion of the lower level of the multi-level EDN is maintained at a desired power system balance (e.g., within predefined threshold power system balance levels). The CCNs 208, 210 and 212 initially can be connected to the Phase A power line, while other CCNs are connected to the Phase B power line or Phase C power line. If the user associated with CCN 208 connects (e.g., plugs in) a plug-in electric vehicle (PEV) 220 and the user associated with CCN 210 connects a PEV 222 at or near the same time such that the two PEVs are connected to the Phase A power line at the same time for a given period of time, the significant loading on the Phase A power line relative to the other power lines can be such that there can be a load phase imbalance due to the simultaneous connection of the PEVs 220 and 222. The PSBC 218 can detect and identify the load phase imbalance between the Phase A power line and the other power lines. The PSBC 218 can identify a power system correction action to rectify the load phase imbalance, wherein the power system correction action can specify that the CCN 208 is to remain connected to the Phase A power line, but CCN 210 is to be switched from the Phase A power line to the Phase B power line, and/or can specify the switching of one or more other CCNs (not shown) from their respective current phased power lines respectively to another phased power line, to facilitate balancing the load on the phases of the power lines. The PSBC 218 can perform, and/or can transmit a desired command(s) (e.g., instruction) to an associated component (e.g., switch(s) or junction node(s)) to perform, the identified power system correction action to perform the desired switching of respective CCNs between respective phased power lines, as specified in the power system correction action.

Figure 3:
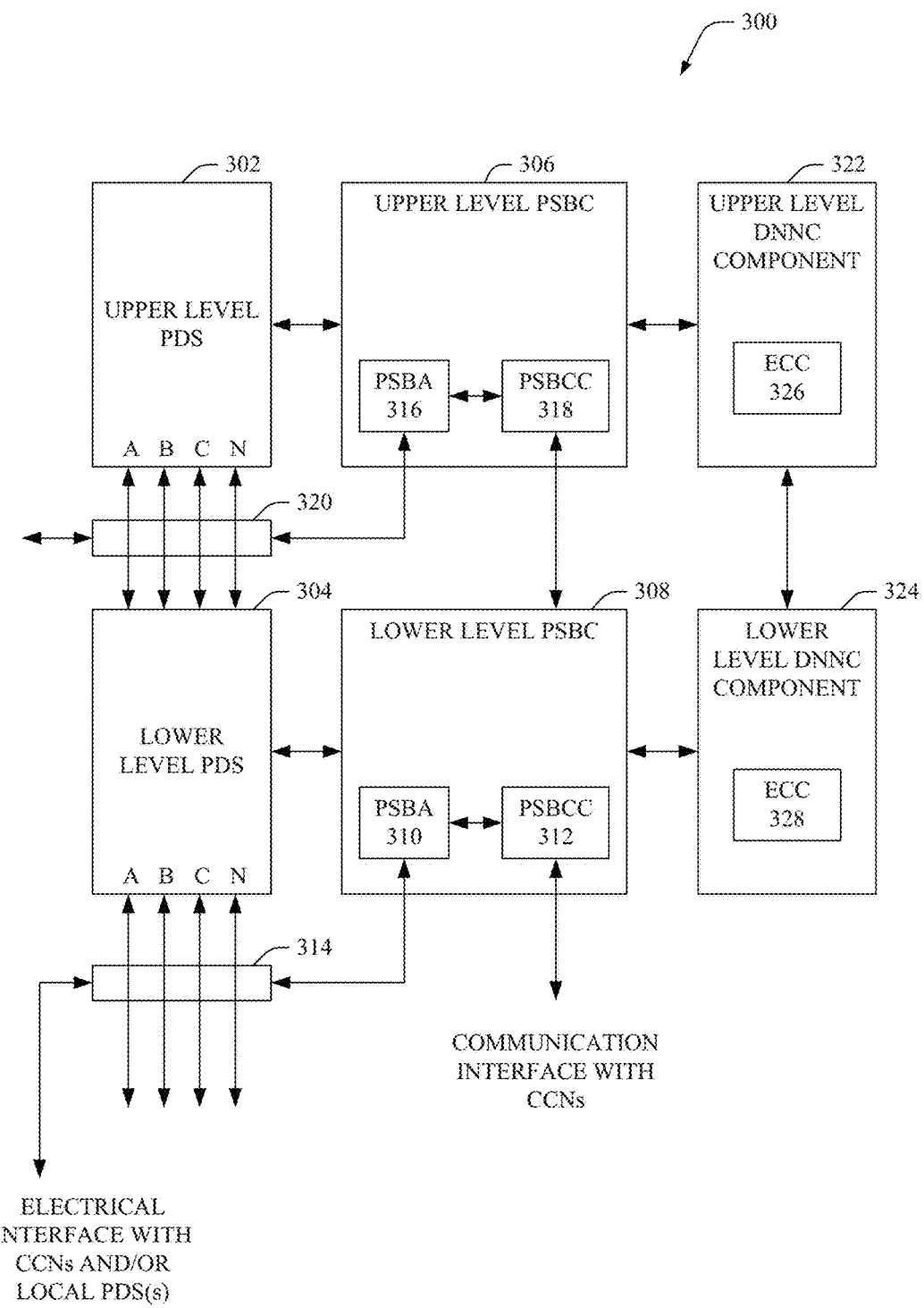
FIG. 3 illustrates a block diagram of an example system that can have a multi-tier hierarchical control and communication architecture for an EDN in accordance with various aspects and embodiments of the disclosed subject matter.

FIG. 3 illustrates a block diagram of an example system 300 that can have a multi-tier hierarchical control and communication architecture for an EDN in accordance with various aspects and embodiments of the disclosed subject matter. The system 300 can include an upper level PDS 302 that can be associated with a lower level PDS 304, an upper level PSBC 306 that can be associated with the upper level PDS 302, and a lower level PSBC 308 that can be associated with the lower level PDS 304. The upper level PDS 302 can provide multi-phase power via transmission lines A, B and C, further employing neutral line (N) to facilitate multi-phase power transmission, to the lower PDS 304. The lower level PDS 304 can provide multi-phase power via transmission lines A, B and C, further employing neutral line (N) to facilitate multi-phase power transmission, to CCNs (not shown in FIG. 3) associated with the lower level PDS 304. The upper level PDS 302, lower level PDS 304, upper level PSBC 306, and lower level PSBC 308, each can be the same or similar as, and/or contain the same or similar functionality as, respective components, as more fully disclosed herein.

Figure 6:
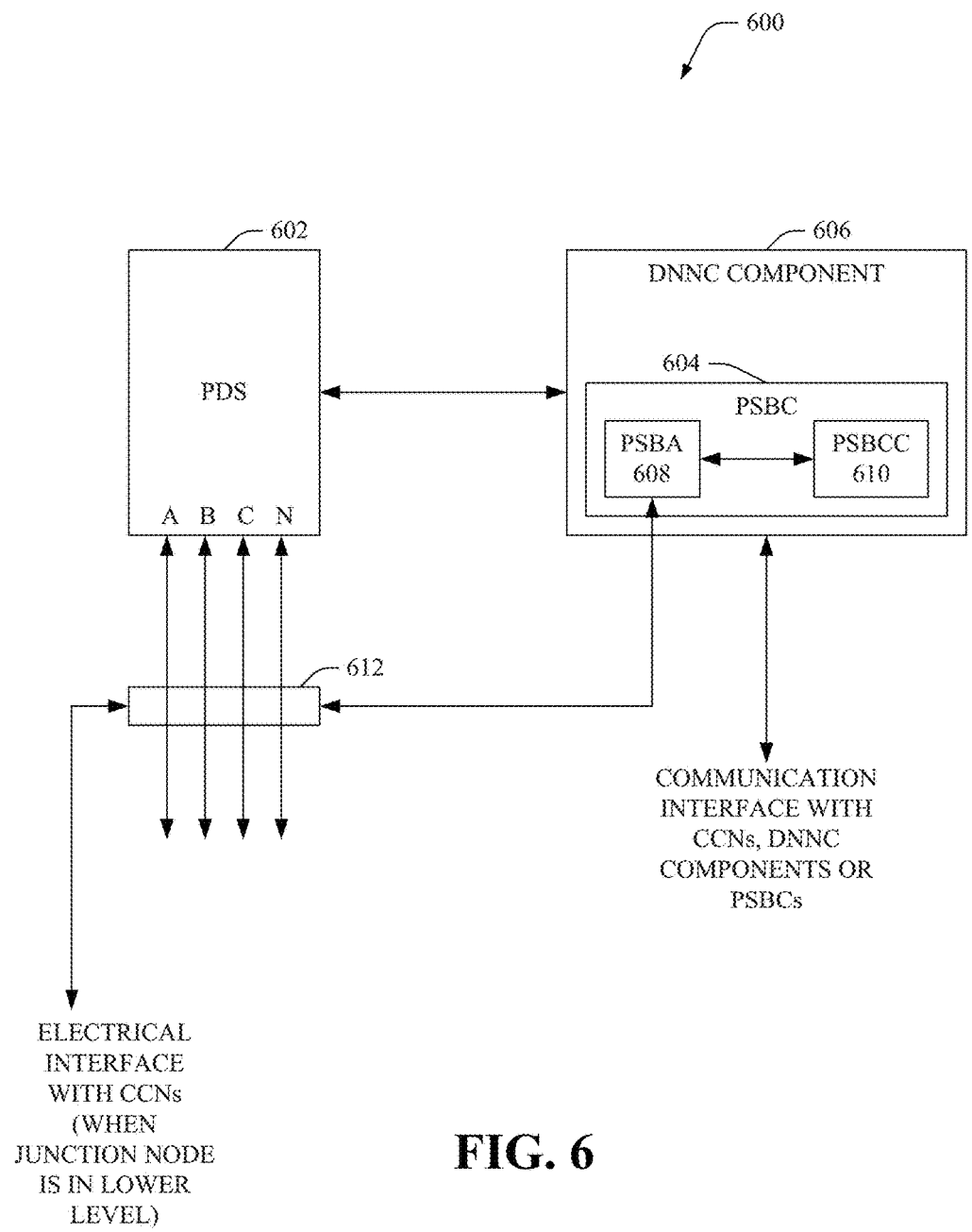
FIG. 6 depicts a block diagram of yet another example system that can facilitate controlling power system balance and other power conditions relating to multi-phase power for multi-phase power in a tier of a multi-tier EDN in accordance with various aspects and embodiments of the disclosed subject matter.

In an aspect, the lower level PSBC 308 can comprise a power system balance agent (PSBA) 310 that can be employed to monitor and/or detect power conditions, including power system imbalances and interference, in the portion of the lower level of the EDN controlled by the lower level PSBC 308. The PSBA 310 can comprise or can be associated with one or more sensors (not shown in FIG. 3; e.g., as shown in FIG. 6) that can be distributed throughout the portion of the lower level of the EDN controlled by the PSBC 308, wherein the one or more sensors can sense, detect, or sample the power conditions in that portion of the lower tier. The PSBA 310 can communicate the power condition related information to a power system balance control component (PSBCC) 312, which is included in the lower level PSBC 308, for further processing. The PSBCC 312 can analyze the information relating to power conditions of that portion of the lower level of the multi-tier EDN. Based at least in part on the data analysis and predefined control criteria (and corresponding predefined control rules), the PSBCC 312 can identify (e.g., dynamically or automatically) whether an undesired power condition, such as a power system imbalance or interference exists, and, if so, can identify (e.g., dynamically or automatically) a desired power system correction action(s) to execute in response to a detected power system imbalance. In such instance when it is desired to implement a power system correction action(s), the PSBCC 312 can generate and communicate one or more commands to the PSBA 310, wherein the PSBA 310 can facilitate implementing (e.g., executing) the desired power system correction action(s) in accordance with one or more commands received from the PSBCC 312, as more fully disclosed herein.

In another aspect, the PSBA 310 can be associated with (e.g., connected to) one or more junction nodes, such as junction node 314 (e.g., junction box), to facilitate distributing power to one or more CCNs (not shown in FIG. 3) connected to the EDN in the lower tier. In still another aspect, a junction node 314 can be configured to access or be connected to Phase A, Phase B or Phase C of the multi-phase power lines, and can include a switch function that can be used to switch (e.g., automatically or dynamically) the electrical connection of a CCN from one phased power line (e.g., Phase A power line) to another phased power line (e.g., Phase B power line), for example, in response to control information (e.g., switch command) received from the lower level PSBC 308 (or alternatively the lower level DNNC component 322), to facilitate controlling the power system balance to reduce or minimize the amount of imbalance in the power system in the portion of the lower tier controlled by the lower level PSBC 308. Additionally or alternatively, the lower level PSBC 308 can transmit other control information to the lower level PDS 304 and/or junction node 314 to facilitate executing another desired power system correction action(s) (e.g., adjusting a voltage level output from the upper level PDS 302 for one or more phases, filtering the power signals, etc.), in accordance with the predefined control criteria.

Similarly, the upper level PSBC 306 can comprise a PSBA 316 that can be employed to monitor and/or detect power conditions, including power system imbalances and interference, in the portion of the upper level of the multi-tier EDN controlled by the upper level PSBC 306. The PSBA 316 can comprise or can be associated with one or more sensors (not shown in FIG. 3) that can be distributed throughout that portion of the upper level of the EDN controlled by the PSBC 306, wherein the one or more sensors can sense, detect, or sample the power conditions in that portion of the upper tier. The PSBA 316 can communicate the power condition related information to a PSBCC 318, which is included in the upper level PSBC 306, for further processing. The PSBCC 318 can analyze the information relating to power conditions of that portion of the upper level of the multi-tier EDN. Based at least in part on the data analysis and predefined control criteria (and corresponding predefined control rules), the PSBCC 318 can identify (e.g., dynamically or automatically) whether an undesired power condition, such as a power system imbalance or interference exists, and, if so, can identify (e.g., dynamically or automatically) a desired power system correction action(s) to execute in response to a detected power system imbalance. In such instance when it is desired to implement a power system correction action(s), the PSBCC 318 can generate and communicate one or more commands to the PSBA 316, wherein the PSBA 316 can facilitate implementing (e.g., executing) the desired power system correction action(s) in accordance with one or more commands received from the PSBCC 318, as more fully disclosed herein.

In yet another aspect, the PSBA 316 can be associated with (e.g., connected to) one or more junction nodes, such as junction node 320, to facilitate distributing power to one or more lower level PDSs, such as lower level PDS 304, located in the lower tier of the multi-tier EDN. In still another aspect, a junction node 320 can be configured to access or be connected to Phase A, Phase B and/or Phase C of the multi-phase power lines, and can include a switch function that can be used to switch (e.g., automatically or dynamically) the electrical connection associated from one phased power line (e.g., Phase A power line) to another phased power line (e.g., Phase B power line), for example, in response to control information (e.g., switch command) received from the upper level PSBC 306 (or additionally or alternatively an upper level DNNC component), to facilitate controlling the power system balance to reduce or minimize the amount of imbalance in the power system in the portion of the upper tier controlled by the upper level PSBC 306. For example, the junction node 320 can have three power lines at its input in an order of Phase A power line, Phase B power line and Phase C power line, wherein, initially, the three power lines at the output of the junction node 320 can be in the same order as the input. In response to a switch command, the junction node can switch the routing of the phased power lines such that the output can be in a different order than the input, such as, for example, an ordering of Phase B power line, Phase A power line and Phase C power line at the output of the junction node 320. Additionally or alternatively, the upper level PSBC 306 can transmit other control information to the upper level PDS 302 and/or junction node 320 to facilitate executing another desired power system correction action(s) (e.g., adjusting a voltage level output from the upper level PDS 302 for one or more phases, filtering the power signals, etc.), in accordance with the predefined control criteria.

In accordance with various aspects, the upper level PDS 302 and upper level PSBC 306 can be associated with (e.g., connected to or interfaced with) an upper level DNNC component 322 that can be employed to monitor conditions (e.g., power conditions, communication conditions, etc.) associated with the upper level PDS 302 and/or node points below the upper level DNNC component 322 in the hierarchy at a desired level of granularity (e.g., monitor each second, each millisecond, or at another desired level of granularity) to facilitate real time, or at least near real time, control of power distribution and communications in the EDN. Based at least in part on the observed conditions, the upper level DNNC component 322 can (e.g., dynamically or automatically) control power distribution and/or perform other actions with regard to the upper level PDS 302 or lower level PDS 304.

In an aspect, the upper level DNNC component 322 can be communicatively connected to a lower level DNNC component 324, which can be associated with (e.g., connected to or interfaced with) the lower level PDS 304 and lower level PSBC 308. The lower level DNNC component 324 can monitor conditions (e.g., power conditions, communication conditions, etc.) associated with the lower level PDS 304 and/or node points (e.g., CCNs, local PDSs, etc.) below the lower level DNNC component 324 in the hierarchy to facilitate controlling power distribution on a more refined level for the portion of the power grid covered by the lower level DNNC component 324, so that power distribution can be dynamically and efficiently controlled. For instance, the lower level DNNC component 324 can monitor conditions in the lower tier of the hierarchy at a desired level of granularity (e.g., monitor each second, each millisecond, or at another desired level of granularity) to facilitate real time, or at least near real time, control of power distribution and communications in the EDN. In accordance with various aspects, the upper level DNNC component 322 also can be communicatively connected to one or more other upper level DNNC components (not shown in FIG. 3 for reasons of brevity and clarity) in the EDN to facilitate communicating data regarding power-related conditions in the EDN between the upper level DNNC components to facilitate efficiently controlling power distribution in the EDN.

In still another aspect, the DNNC components 322 and 324 respectively can include enhanced control component (ECC) 326 and ECC 328, each of which can obtain, aggregate, and process data relating to the conditions of the respective PDS(s) (e.g., 302, 304) managed by them to facilitate controlling power distribution in the respective portions of the grid controlled by them. The ECC 326 and ECC 328 can control communications between the respective DNNC components 322 and 324 and other nodes in the EDN to enable real time or at least near real time communication of data between such nodes in the EDN.

In one aspect, the ECC 328 can monitor conditions (e.g., power conditions, communication conditions, etc.) relating to the portion of the power grid for which the lower level PDS 304 distributes power and the lower level DNNC component 324 controls communication and power distribution, working in conjunction with the lower level PSBC 308. For example, there can be one or more sensors (not shown in FIG. 3; as shown with regard to the sensor component disclosed in relation to FIG. 7) that can be distributed at or near the lower level PDS 304 and/or at other points in the portion of the power grid associated with the lower level PDS 304 and lower level DNNC component 324, wherein the one or more sensors can comprise various types of sensors (e.g., sensor(s), such as a power sensor, voltage phase balance sensor, current phase balance sensor, load phase balance sensor, heat sensor, fault sensor, harmonic sensor, etc., to monitor power conditions (e.g., power levels, power system balance parameters, voltage levels, current levels, heat levels, etc.) and/or faults; sensor(s) to monitor communication conditions (e.g., signal strength, data communication rates, quality of service (QoS), etc.); etc.). The ECC 328 can obtain data from the respective sensors and can process such data to facilitate determinations relating to controlling power distribution associated with the lower level PDS 304 and controlling communications and other control aspects associated with the lower level DNNC component 324. In an embodiment, the ECC 328 (and/or ECC 326) can comprise or can be associated with (e.g., communicatively connected to) a Frequency monitoring Network (FNET) that can be employed as a power system frequency measurement system that can accurately measure power system frequency, voltage and angle in real time (or at least near real time), and can facilitate desired real time (or at least near real time) control of power distribution in the EDN, wherein the FNET can be, for example, a phasor measurement unit (PMU) FNET (PMU/FNET), wherein the PMU can be, for example, a frequency disturbance recorder (FDR).

In an aspect, the ECC 328 can analyze or evaluate the data, filter the data, abstract the data, or otherwise process the data obtained from the sensors, nodes, and/or other data sources to make determinations for local (e.g., lower level) control of the associated portion of the power grid (e.g., power distribution in the portion of the power grid, provide for protection of system devices in the portion of the power grid in response to a detected fault or undesired parameter value, etc.), or to generate a subset of data (e.g., abstract or summary of the obtained or processed data) that can be communicated to the upper level DNNC component 322 for processing to facilitate making determinations for control of that portion of the power grid and/or control of other portions of the power grid controlled by the upper level DNNC component 322.

The collection of data from sensors in the EDN (e.g., lower level of the EDN) at a desired fine level of granularity (e.g., on a second, millisecond, or even more refined granularity) along with the processing (e.g., analyzing) of such data and/or other data, which can generate even more data, can result in a large amount of data (e.g., many gigabytes or terabytes of data) collected at the lower level of the EDN. It is to be appreciated and understood that transmitting all of the data (e.g., collected data, analysis-generated data, other data) from the lower level DNNC 324 to the upper level DNNC 322 can be undesirable for a number of reasons, as some of the data may not be needed by the upper level DNNC 322 since such data can relate to aspects or functions being controlled by the lower level DNNC 324 and not the upper level DNNC 322, and communication of such large amounts of data can or may overload the communication network and impair real time control of power distribution and communications in the EDN, especially when the upper level DNNC 322 is receiving respective large amounts of data from multiple lower level DNNCs (e.g., 324) associated with the portion of the EDN controlled by the upper level DNNC 322, among other reasons.

In accordance with various aspects, the lower level DNNC 324, employing the ECC 328, can select a desired subset of data from the available data (e.g., collected data, analysis-generated data, other data), in accordance with the predefined control criteria, as more fully disclosed herein. For example, the ECC 328 can filter or abstract data obtained from sensors to facilitate reducing the amount of data communicated to the upper level DNNC component 322. For instance, the ECC 328 can monitor a particular power condition (e.g., power level, voltage level, current level, power system balance, harmonic level, interference level, etc.) and can obtain measurements of that power condition for each sample time, which, for example, can be finely granularized to a desired level (e.g., on the order of milliseconds, seconds, minutes, . . . ). It may not be necessary for the upper level DNNC component 322 to have knowledge of all of the parameter values of the particular power condition parameter, but rather only desirable for the upper level DNNC component 322 to have knowledge of certain parameter values (e.g., a maximum power condition parameter value over a specified number of samples, a power condition parameter value that is outside of a predefined threshold acceptable parameter value or set of values, an average or mean parameter value and/or standard deviation over a specified number of samples, etc.). The ECC 328 can evaluate and process the obtained data (e.g., perform calculations on the obtained data, filter out data from the obtained data) to generate a subset of data (e.g., a filtered subset of data that contains a parameter value(s) that is outside of the predefined threshold acceptable parameter value(s); or an abstract or summary of the data that includes an average or a mean of the parameter values obtained over a specified number of samples or period of time), in accordance with predefined control criteria (and corresponding predefined control rules), as more fully disclosed herein. The subset of data can be communicated from the lower level DNNC component 320 to the upper level DNNC component 322 via a desired communication channel (e.g., wireline or wireless communication channel) using a desired communication technology (e.g., DSL, cellular, Wi-Fi, etc.) for processing and evaluation by the ECC 326 to facilitate controlling power distribution over the portion of the grid controlled by the upper level PDS 302, wherein the desired communication channel can be automatically or dynamically selected in accordance with the predefined control criteria, as more fully disclosed herein. The disclosed subject matter can thereby control the amount of data being communicated via communication channels to limit the data to such data that is desired by the upper level DNNC component 322 or other upper level node(s) to control (e.g., reduce) the load on the communication channels and facilitate real time, or at least near real time, data communication between nodes in the EDN.

The ECC 326 can receive the subset of data from the lower level DNNC 324, and can analyze, evaluate, and/or otherwise process that subset of data to facilitate making determinations for controlling the portion of the power grid controlled by the upper level DNNC component 322, including controlling that portion of the power grid associated with the lower level DNNC component 324 and/or other portions of the power grid associated with other lower level DNNC components (not shown) that are under the control of the upper level DNNC component 322. Based at least in part on the processing of the subset of data, the ECC 326 can generate control information (e.g., power-related parameter values, control information or commands for power distribution, etc.), which can be communicated via a desired communication channel to the lower level DNNC component 324, another lower level DNNC component (not shown) associated with the upper level DNNC component 322, or another upper level DNNC component, to facilitate desirably controlling power distribution in the EDN.

As disclosed herein, the system 300 can employ various types of communication channels and technologies (e.g., wireline communication channels, such as digital subscriber line (DSL)-type channels, broadband-type channels, Broadband over Power Lines (BPL), power line carriers (PLC), Power line Digital Subscriber Lines (PDSL), etc.; and wireless communication channels, such as cellular communication channels, Wi-Fi communication channels, Worldwide Interoperability for Microwave Access (WiMax) communication channels, femtocell communication channels, satellite communication channels, wireless metropolitan area network (WMAN) channels, wireless local area network (WLAN) channels, etc.), which can have respective communication conditions, costs, etc., associated therewith. In an aspect, to facilitate desired data communications, the ECC 326 and/or ECC 328 (or a communication component (e.g., enhanced consumer meter (ECM), such as an AMI-type meter or a smart meter) associated with a CCN) can dynamically or automatically select or switch to a specified communication channel or communication technology to facilitate communication of data, for example, between the upper level DNNC component 322 and lower level DNNC component 324, or between the lower level DNNC component 324 and a communication component associated with a CCN, between the upper level DNNC component 322 and another upper level DNNC component, or between a DNNC component and an associated PSBC, based at least in part on the predefined control criteria, which can comprise predefined communication channel selection criteria. In identifying, determining, or selecting a communication channel or communication technology to utilize to communicate a particular set of data, the ECC 326 or ECC 328 can apply the predefined communication channel selection criteria (or corresponding predefined communication channel selection rules), which can relate to, for example, the amount of data to be communicated, the type of data (e.g. current power condition data, abstract or filtered subset of power condition data, fault data, power control data, communication control data, etc.), the priority of the data (e.g., high priority or emergency data, standard priority, low priority, etc.), the respective communication conditions (e.g., quality of service (QoS), data communication rates, communication channel congestion, etc.) of respective communication channels (e.g., wireline communication channel, wireless communication channel), respective costs of communication of the data for the respective communication channels, current availability of respective communication channels, time of day of data communication (e.g., peak-time communication times, off-peak communication times), etc.

For example, data that meets a predefined high level of priority threshold can be transmitted via one type of communication channel or technology over another type of communication channel or technology because the one type of communication channel or technology is more reliable or desirable (e.g., more desirable QoS and/or faster data communication rate) than the other type, even if communication via the one type is more costly than communication via the other type, when the predefined communication channel selection criteria (or corresponding rule(s)) so specifies. As another example, the predefined communication channel selection criteria (or corresponding rule(s)) can specify that data is to be communicated via a wireless communication channel using Wi-Fi so long as the communication conditions for such wireless communication channel at least meet a predefined QoS level and data communication rate, or communicated via another communication channel (e.g., a wireline or other communication channel that meets the predefined QoS level and data communication rate) when that wireless communication channel does not meet the predefined QoS level and data communication rate.

In accordance with various other aspects, as more fully disclosed herein, the ECC 326 and ECC 328, respectively, can compress/decompress data (e.g., the subset of data) being transmitted to/received from the respective DNNC components 322 or 324, or other component (e.g., control or communication component associated with a consumer consumption point), in accordance with a specified compression/decompression algorithm(s) (e.g., lossless compression algorithms, such as Lempel-Ziv (LZ) compression algorithm, LZ-Renau (LZR) compression algorithm, Huffman coding, DEFLATE, etc.; lossy compression algorithms, such as Mu-law Compander, A-law Compander, Modulo-N code, etc.), to facilitate reducing the amount of data bits being communicated thereby easing the communication load on the communication channel(s) between the upper level DNNC component 322 and the lower level DNNC component 324 or other component; encrypt data transmitted or decrypt data received from a DNNC component (e.g., 322 or 324) or other component, in accordance with a specified cryptographic algorithm(s) and protocols (e.g., data encryption standard (DES)-type algorithms, advanced encryption standard (AES)-type algorithms, symmetric key algorithms, etc.), to facilitate securing communicated data; employ desired data redundancy to facilitate recovery of data in case of data corruption; etc.

It is to be appreciated and understood that, while system 300 includes a single lower level DNNC associated with a single lower level PDS, the subject specification is not so limited, as in accordance with various embodiments, there can be one or more lower level DNNC components associated with a single lower level PDS, as desired. For example, one lower level PDS may serve 500 CCNs, wherein it can be desirable to break the group of 500 CCNs into a number of smaller sub-groups (e.g., 10 sub-groups of 50 CCNs each) which can respectively be associated with a corresponding number of lower level DNNC components. In accordance with various embodiments, one of the number of lower level DNNC components can act as a master lower level DNNC component in relation to the other lower level DNNC components, or there can be an additional lower level DNNC component that acts as a master lower level DNNC component, wherein the master lower level DNNC component can be interfaced with the lower level PDS, or the lower level DNNC components can coordinate with each other without a master DNNC component and can interface with the lower level PDS, as desired.

It also is to be appreciated and understood that, while not shown in FIG. 3, a CCN (e.g., 208, 210, 212, as shown in FIG. 2) can comprise an ECM (e.g., smart meter or other meter comprising AMI) (not shown) that can track consumption of power by the CCN (and/or generation of power by a local PDS (not shown) associated with the CCN) and can communicate information related to power usage or generation to the associated lower level DNNC component 324 via a specified communication channel and communication technology (e.g., wireless or wireline communication), in accordance with predefined communication channel selection criteria, to facilitate enabling the lower level DNNC component 324 to desirably control power distribution by the lower level PDS 304, and/or DNNC components higher up in the hierarchy to control power distribution of their respective portions of the EDN. Also, the CCN can comprise an intelligent climate control system (not shown) that can automatically control, or be employed to manually control, the climate conditions of the physical space of the CCN in response to control information received from the consumer or a DNNC (e.g., upper, mid, or lower DNNC received via the lower level DNNC).

Further, in accordance with various other embodiments, there can be one or more middle tiers in between the lower tier and upper tier of the multi-tier EDN, wherein a middle tier can comprise all or a desired portion of the components that are included in the lower or upper tiers. For instance, a middle tier can comprise a PDS(s) (e.g., power sub-station), a PSBC(s), a DNNC component(s), and a junction node(s) to facilitate controlling power distribution between the middle tier and lower tier. The components in the middle tier can comprise the same or similar functionality as respectively named components of the upper and lower tiers.

The disclosed subject matter, by controlling communications and power distribution in a multi-tier EDN in real time (or at least near real time), can desirably control operations of the EDN to achieve desirable demand response through desirable (e.g., optimal) management of the usage of high power appliances, reducing peak demand on the EDN and reducing the need for additional expensive power generation; can provide for integrated real and reactive power management by managing loss reduction in the system and volt/volt-amperes reactive (volt/var) control and recognizing that loss reduction and volt/var control are intertwined with each other, since change of voltage affects both real and reactive flow in AC power systems; can reduce or minimize detected power system imbalances; can manage desirable (e.g., optimal) scheduling of micro power sources (e.g., distribution grids, such as solar power generation systems, wind power generation systems, etc.) and electric or hybrid vehicles (e.g., PEV, plug-in hybrid electric vehicles (PHEV)) or other large power consumption devices or appliances, based at least in part on the status of the EDN, in accordance with the predefined control criteria; can provide adaptive secondary distribution system protection to protect distribution transformers on the low voltage side, and can employ protection devices for the distribution transformers that can coordinate with the high voltage side on the primary side of the distribution system and each of the CCNs (e.g., at the ECM or main breaker) on the load side of the system, to facilitate improved reliability; can manage assets (e.g., PDSs, DNNC components, power lines, sensors, etc.) in accordance with the predefined control criteria to improve the life cycle of the respective assets, for example, by minimizing the transfer of power throughout the EDN and thereby minimize the use of system components to transfer power throughout the EDN to thereby reduce the wear and tear on such system components; etc.

Figure 4:
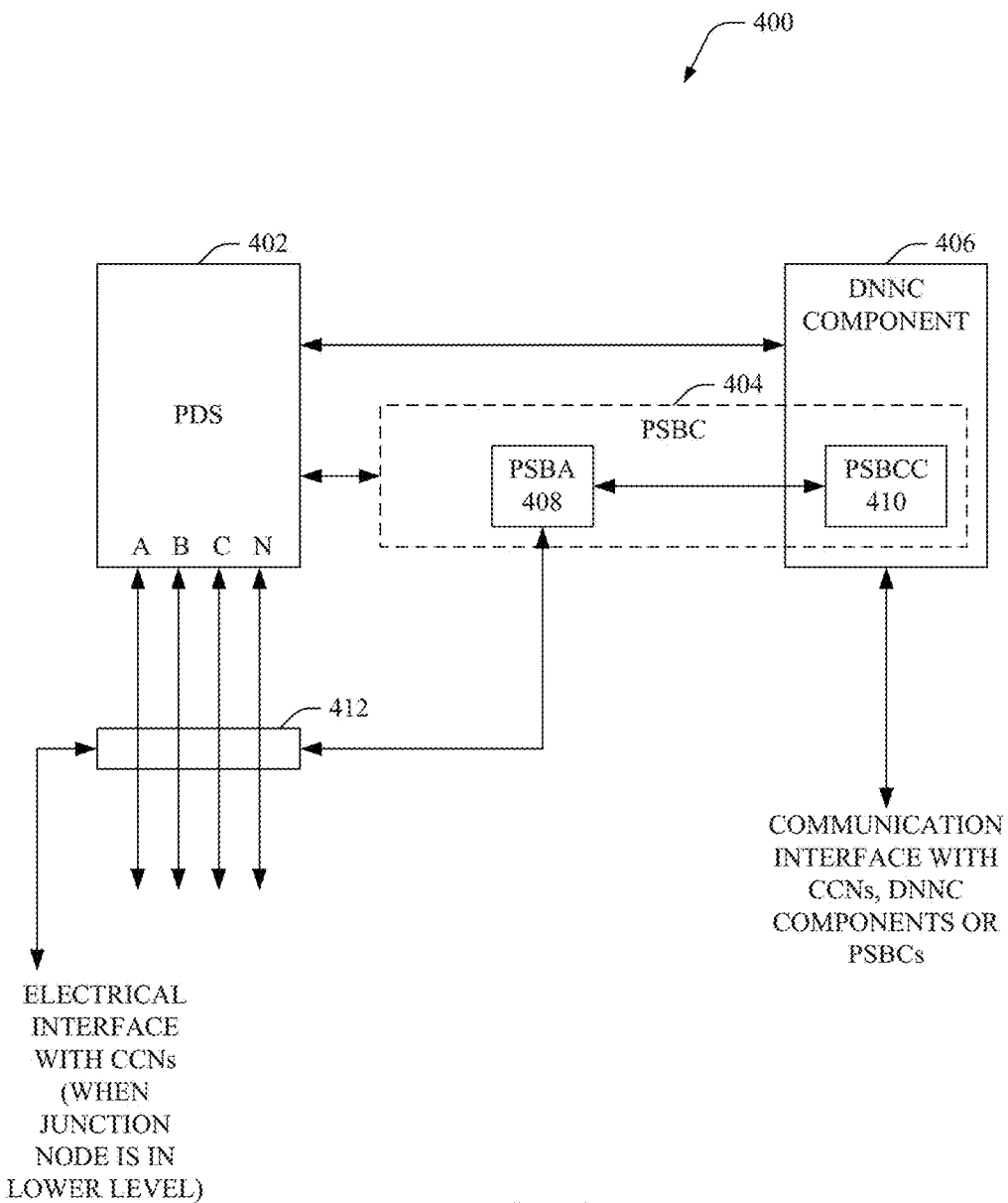
FIG. 4 depicts a block diagram of an example system that can facilitate controlling power system balance and other power conditions relating to multi-phase power in a tier of a multi-tier EDN in accordance with various aspects and embodiments of the disclosed subject matter.

FIG. 4 depicts a block diagram of an example system 400 that can facilitate controlling power system balance and other power conditions relating to multi-phase power for multi-phase power in a tier of a multi-tier EDN in accordance with various aspects and embodiments of the disclosed subject matter. The system 400 can comprise a PDS 402, PSBC 404, DNNC component 406, PSBA 408, PSBCC 410, and junction node 412, wherein each of these components can be the same or similar as, and/or can comprise the same or similar functionality as, respective components, as disclosed herein. In an embodiment, the PSBC 404 can be at least partially integrated into the DNNC component 406 such that the PSBCC 410 can be contained within the DNNC component 406, while the PSBA 408 can reside outside of the DNNC component 406. As a result, as desired, the PSBA 408 can be placed in relatively close proximity to the PDS 402 and/or junction node 412, while the DNNC component 406 and PSBCC 410 can be located relatively more remotely from the PDS 402 and/or junction node 412. This architecture (e.g., partially integrated PSBC) can be employed in one or more different tiers of the multi-tier EDN, as desired.

Figure 5:
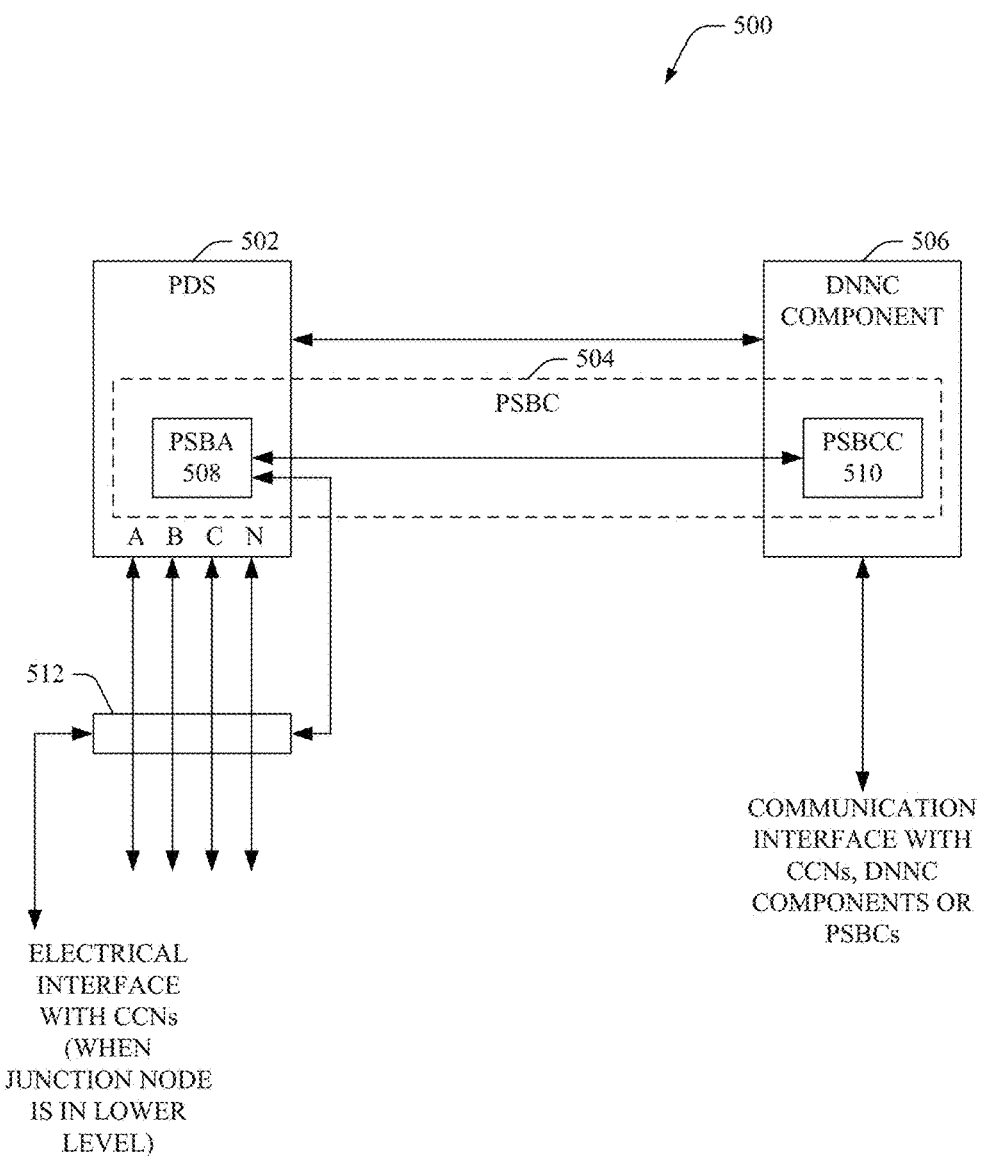
FIG. 5 illustrates a block diagram of another example system that can facilitate controlling power system balance and other power conditions relating to multi-phase power in a tier of a multi-tier EDN in accordance with various aspects and embodiments of the disclosed subject matter.

FIG. 5 depicts a block diagram of another example system 500 that can facilitate controlling power system balance and other power conditions for multi-phase power in a tier of a multi-tier EDN in accordance with various aspects and embodiments of the disclosed subject matter. The system 500 can include a PDS 502, PSBC 504, DNNC component 506, PSBA 508, PSBCC 510, and junction node 512, wherein each of these components can be the same or similar as, and/or can comprise the same or similar functionality as, respective components, as disclosed herein. In an embodiment, the PSBC 504 can be at least partially integrated into both the PDS 502 and DNNC component 506 such that the PSBA 508 can be contained within the PDS 502, and the PSBCC 510 can be contained within the DNNC component 506. As a result, as desired, the PSBA 508 can be located near at least some of the sensors that are monitoring power conditions associated with the PDS 502, while the DNNC component 506 and PSBCC 510 can be located relatively more remotely from the PDS 502. This architecture (e.g., distributed or de-centralized PSBC that is partially integrated in various system components) can be employed in one or more different tiers of the multi-tier EDN, as desired. For example, one tier can employ a PSBC that is a stand-alone component (e.g., see FIG. 3), another tier can employ a PSBC that is partially integrated into another component (e.g., see FIG. 4), and/or still another tier can employ a PSBC that has sub-components distributed among several other components, depending in part on the particular architecture desired for the EDN.

FIG. 6 depicts a block diagram of yet another example system 600 that can facilitate controlling power system balance and other power conditions relating to multi-phase power for multi-phase power in a tier of a multi-tier EDN in accordance with various aspects and embodiments of the disclosed subject matter. The system 600 can comprise a PDS 602, PSBC 604, DNNC component 606, PSBA 608, PSBCC 610, and junction node 612, wherein each of these components can be the same or similar as, and/or can comprise the same or similar functionality as, respective components, as disclosed herein. In an embodiment, the PSBC 604 can be integrated into the DNNC component 606 such that the PSBA 608 and the PSBCC 610 can be contained within the DNNC component 606. This architecture (e.g., integrated PSBC) can be employed, for example, when the DNNC component 606 is placed in relatively close proximity to the PDS 602 and/or junction node 612. This architecture (e.g., integrated PSBC) can be employed in one or more different tiers of the multi-tier EDN, as desired.

FIG. 7 depicts a block diagram of an example system 700 that can detect power system imbalance and perform a power system correction action(s) to facilitate control of multi-phase power distribution for at least a portion of a lower tier of a multi-tier EDN in accordance with various aspects and embodiments of the disclosed subject matter. The system 700 can comprise a lower level PDS 702 that can be associated with a lower level PSBC 704 and lower level DNNC component 706, CCN 708, CCN 710 and CCN 712, wherein each of these respective components can be the same or similar as, and/or can comprise the same or similar functionality as, respective components, as disclosed herein.

In an aspect, the CCNs 708, 710 and 712 respectively can include ECMs 714, 716 and 718, wherein an ECM (e.g., 714, 716, 718) can track consumption of power by the CCN (e.g., 708, 710, 712), and/or generation of power by a local PDS, such as local PDS 720, associated with the CCN (e.g., 718), and can communicate information related to power usage or generation to the associated lower level DNNC component 706 via a specified communication channel and communication technology (e.g., wireless or wireline communication), in accordance with predefined communication channel selection criteria, to facilitate enabling the lower level DNNC component 706 to desirably control power distribution by the lower level PDS 702, and/or DNNC components higher up in the hierarchy to control power distribution of their respective portions of the EDN. An ECM can be a smart meter or other meter comprising AMI, for example. In another aspect, a CCN (e.g., 708, 710, 712) can comprise an intelligent climate control system (not shown), which can be associated with the ECM, and can automatically control, or be employed to manually control, the climate conditions of the physical space of the CCN in response to control information received from the consumer or a DNNC component (e.g., upper, mid, or lower DNNC component), wherein the control information is ultimately received by the CCN via the lower level DNNC component 706).

In another aspect, the respective ECMs 714, 716 and 718 each can be connected to respective junction nodes 722, 724 and 726 (e.g., junction boxes) to facilitate distributing power to the CCNs 708, 710 and 712, and/or, with regard to the local PDS 720, providing power from the local PDS 720 to the EDN via the ECM 718. In still another aspect, each of the junction nodes 722, 724 and 726 can be configured to respectively access or be connected to Phase A, Phase B or Phase C of the multi-phase power lines, and can include a switch function that can be used to switch (e.g., automatically or dynamically) the electrical connection of a CCN from one phased power line (e.g., Phase A power line) to another phased power line (e.g., Phase B power line), for example, in response to control information (e.g., switch command) received from the lower level PSBC 704 (or alternatively the lower level DNNC component 706), to facilitate maintaining or restoring a desired level of power system balance in the portion of the lower tier controlled by the lower level PSBC 704. It is to be appreciated and understood that, while the junction nodes 722, 724 and 726 are depicted as being separate components and being located outside of the PDS 702, the subject disclosure is not so limited, as in accordance with various embodiments, the junctions nodes can be a single junction node comprising sub-junction nodes and/or can be located within the PDS 702 or another desired component.

In yet another aspect, the system 700 can contain a specified number of sensor components, such as sensor components 728, 730, 732, 734, 736 and 738, which can be associated with various components (e.g., connected to various components, and/or proximate to various components such that a sensor component can sense or detect power-related conditions associated with the component) in the portion of the lower tier controlled by the lower level PSBC 704 and lower level DNNC component 706. The sensor components 728, 730, 732, 734, 736 and 738 can be communicatively connected to the lower level PSBC 704 (as depicted) and/or the lower level DNNC component 706, and can communicate power-related information (e.g., power level, power balance parameters, voltage level, current level, heat level, harmonic information, etc.) to the lower level PSBC 704 and/or the lower level DNNC component 706, wherein the lower level PSBC 704 and/or the lower level DNNC component 706 can utilize the power-related information to facilitate monitoring power conditions associated with the portion of the lower tier under their control, detecting problems with power distribution (e.g., power system imbalance, faults, etc.), and identifying and implementing a power system correction action(s) to perform in response to a detected power distribution problem.

In accordance with an example embodiment, the sensor component 728 can be located at or within the lower level PDS 702, sensor component 730 can be associated with the Phase A power line, sensor component 732 can be associated with the Phase B power line, sensor component 734 can be associated with the Phase C power line, sensor component 736 can be associated with the neutral (N) line, and sensor component 738 can be associated with the connection of the CCN 712 to the junction node 726. The sensor component 728 can sense power conditions associated with the lower level PDS 702; the sensor components 730, 732, 734 and 736 can sense respective power conditions associated with the phased power lines and neutral line, respectively; and the sensor component 738 can sense power conditions associated with the electrical power line between the CCN 712 and the junction node 726, wherein sensor component 738 can facilitate monitoring conditions relating to, for example, any power being introduced to the EDN by the local PDS 720. While not shown in FIG. 7, as desired, a sensor component(s) also can be included within a junction node.

In another aspect, the lower level PDS 702 and/or the junction nodes 722, 724 and/or 726 can comprise a filter function that can employ one or more filters (e.g., hardware and/or software type filters) to filter power being distributed to the CCNs 708, 710 and/or 712, for example, in response to control information relating to a power system correction action received from the lower level PSBC 704 (or lower level DNNC component 706). A software type filter, or combination hardware/software type filter, can comprise one or more filter algorithms that can filter a power signal in a desired manner.

It is to be appreciated and understood that, while system 700 relates to a lower tier of a multi-tier EDN, all or at least a portion of the aspects and components of the lower tier can be implemented in and extended to a middle tier or an upper tier that can be included in the multi-tier EDN.

Figure 8:
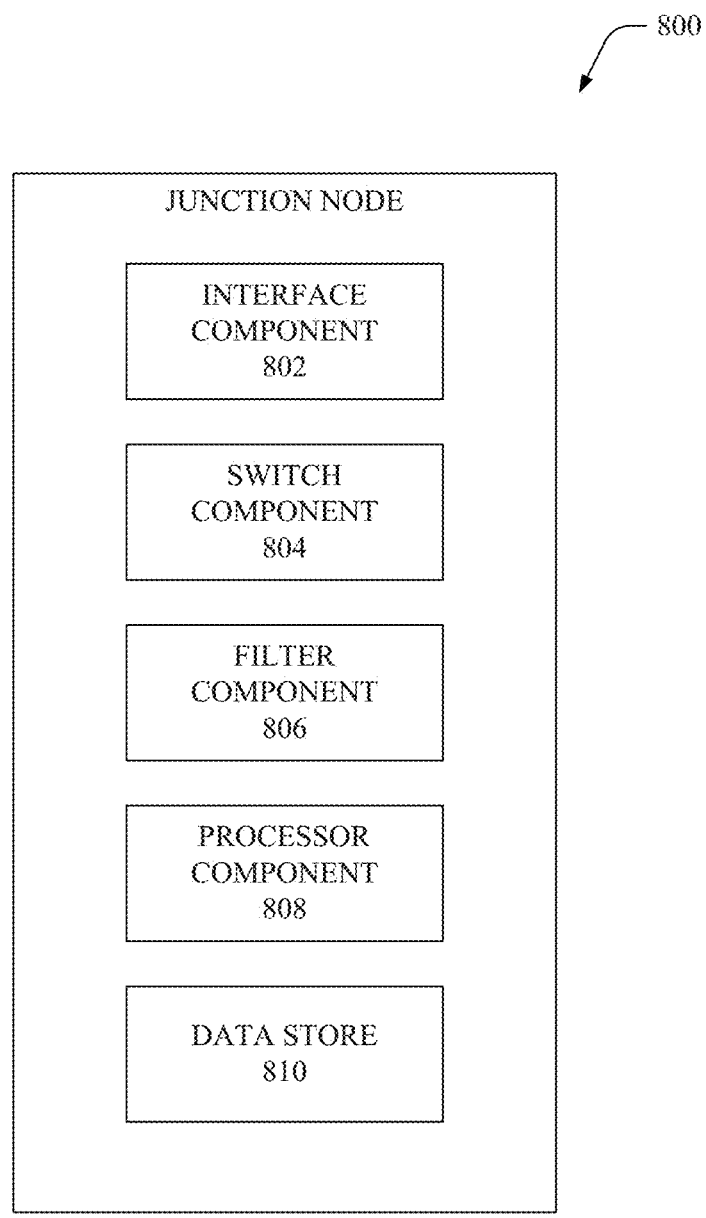
FIG. 8 illustrates a block diagram of an example junction node in accordance with various aspects and embodiments of the disclosed subject matter.

FIG. 8 illustrates a block diagram of an example junction node 800 in accordance with various aspects and embodiments of the disclosed subject matter. The junction node 800 can comprise an interface component 802 that can include and/or provide various adapters, connectors, controls, channels, ports, communication paths, etc., to integrate the interface component 802 into virtually any EDN and enable the junction node 800 to interface with other components (e.g., ECM, PDS, DNNC component, sensor component, etc.) in the EDN, including interfacing with an associated lower level PSBC.

In another aspect, the junction node 800 also can include a switch component 804 that can be associated with the power lines, such as the phased power lines, that distribute the multi-phase power to a CCN(s) (not shown in FIG. 8; e.g., as shown in FIG. 8) associated with the junction node 800. The switch component 804 can switch (e.g., automatically or dynamically) a power line connecting a CCN to the junction node 800 so that such power line is changed from being electrically connected to one phased power line (e.g., Phase A power line) to another phased power line (e.g., Phase B power line), for example, in response to control information (e.g., relating to a power system correction action) received from the PSBC (not shown in FIG. 8; e.g., as shown in FIG. 8).

In still another aspect, the junction node 800 can comprise a filter component 806 that can employ one or more filters (e.g., hardware and/or software type filters, such as a harmonic filter, electromagnetic interference (EMI) filter or radio frequency interference (RFI) filter) to filter a power signal (e.g., filter out all or a portion of undesired harmonics, EMI or RFI). A software type filter, or combination hardware/software type filter, can comprise one or more filter algorithms that can filter a power signal in a desired manner.

In yet another aspect, the junction node 800 also can comprise a processor component 808 that can operate in conjunction with the other components (e.g., interface component 802, switch component 804, filter component 806, etc.) to facilitate performing the various functions of the junction node 800. The processor component 808 can employ one or more processors, microprocessors, or controllers that can process data, such as information relating to power distribution, control information (e.g., relating to a power system correction action), information to facilitate interfacing the junction node 800 with an associated component (e.g., ECM, PDS, PSBC, DNNC component, etc.), information relating to switching a CCN between phased power lines, information relating to filtering of a power signal, information relating to other operations of the junction node 800, and/or other information, etc., to facilitate operation of the junction node 800, as more fully disclosed herein, and control data flow between the junction node 800 and other components (e.g., ECM, PDS, PSBC, DNNC component, etc.) associated with the junction node 800.

The junction node 800 also can include a data store 810 that can store data structures (e.g., user data, metadata), code structure(s) (e.g., modules, objects, hashes, classes, procedures) or instructions, information relating to power distribution, control information (e.g., relating to a power system correction action), information to facilitate interfacing the junction node 800 with an associated component (e.g., ECM, PDS, PSBC, DNNC component, etc.), information relating to switching a CCN between phased power lines, information relating to filtering of a power signal, information relating to other operations of the junction node 800, etc., to facilitate controlling operations associated with the junction node 800. In an aspect, the processor component 808 can be functionally coupled (e.g., through a memory bus) to the data store 810 in order to store and retrieve information desired to operate and/or confer functionality, at least in part, to the components of the junction node 800 (e.g., interface component 802, switch component 804, filter component 806, etc.), and/or substantially any other operational aspects of the junction node 800.

Figure 9:
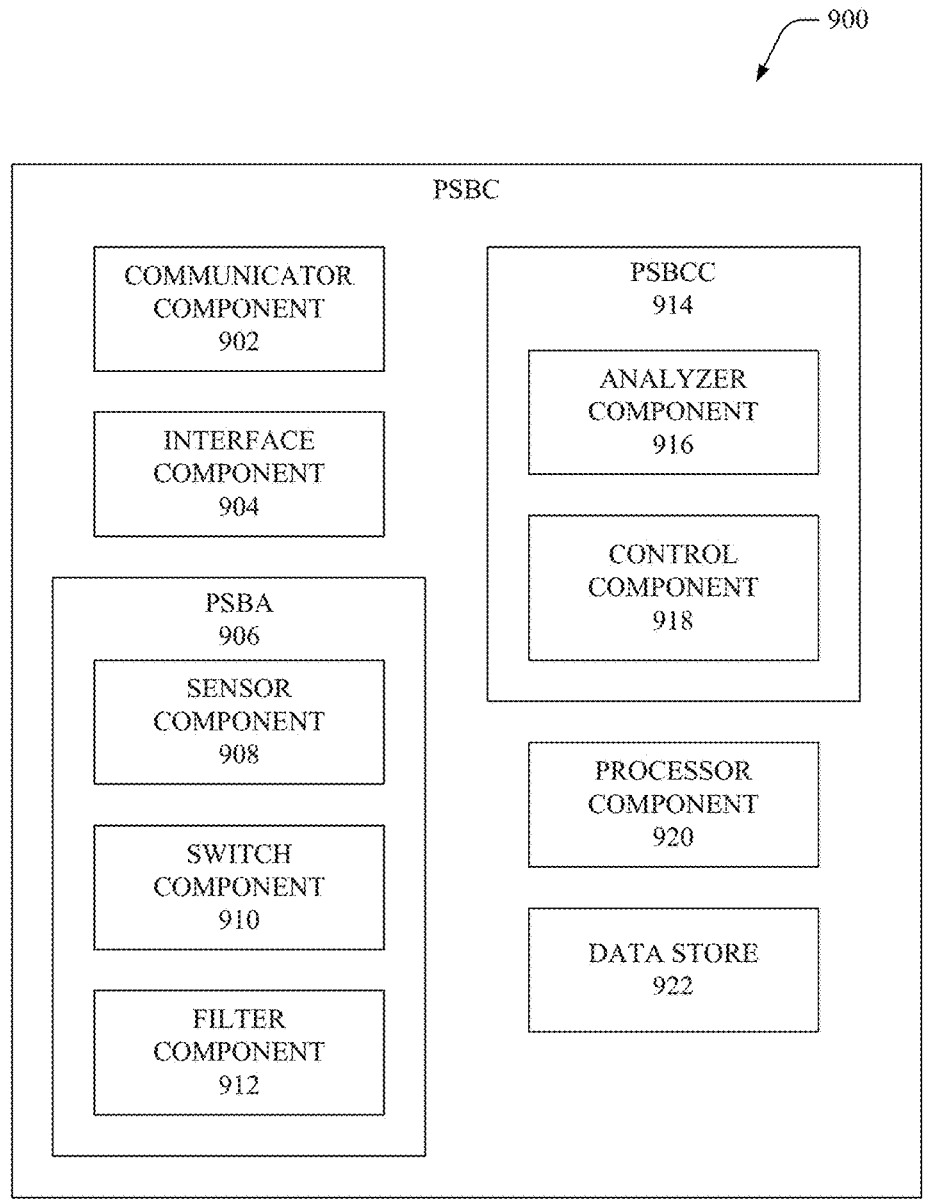
FIG. 9 depicts a block diagram of an example power system balance component (PSBC) in accordance with various aspects and embodiments of the disclosed subject matter.

FIG. 9 depicts a block diagram of an example PSBC 900 in accordance with various aspects and embodiments of the disclosed subject matter. The PSBC 900 can include a communicator component 902 that can enable the PSBC 900 to communicate with other components (e.g., a DNNC component, a junction node, a PDS, sensor component, etc.) via a wireline or wireless communication connection. The communicator component 902 can comprise a communication platform that can comprise electronic components and associated circuitry that can provide for processing and manipulation of a received signal(s) or signal(s) to be transmitted, for example, via a wireline or wireless communication connection. In an aspect, the communicator component 902 can be configured to communicate via a wireline communication connection, such as a DSL connection, a broadband connection, a BPL connection, etc. In accordance with various embodiments, for wireless communication, the communication platform can employ a set of antennas that can receive and transmit signal(s) from and to wireless devices like access points (APs), access terminals, wireless ports and routers, and so forth, that operate in a radio access network. The communication platform of the communicator component 902 also can comprise electronic components and associated circuitry that provide for processing and manipulation of received signal(s) and signal(s) to be transmitted, such as, for example, receivers and transmitters, multiplexer/demultiplexer component, and a modulation/demodulation component.

The PSBC 900 also can contain an interface component 904 (I/F 904) that can include and/or provide various adapters, connectors, controls, channels, ports, communication paths, etc., to integrate the PSBC 900 into virtually any EDN and enable the PSBC 900 to interface with other components, such as a PDS, DNNC component, junction node, sensor component, etc., in the EDN. In addition, I/F 904 can provide various adapters, connectors, controls, channels, ports, communication paths, etc., that can provide for interaction and/or communication with a processor component, and/or any other component associated with the PSBC 900.

In another aspect, the PSBC 900 can comprise a PSBA 906 that can be employed to monitor and/or detect power conditions in the portion of tier of the EDN controlled by the PSBC 900, and can facilitate performance of one or more desired power system correction actions in accordance with one or more commands received from a power system balance control component (PSBCC) 914 of the PSBC 900. The PSBA 906 can include a sensor component 908 that can comprise one or more sensors and/or can receive data, flags, indicators, etc., from one or more sensors, distributed throughout the EDN, or at least the portion of the EDN controlled by or otherwise associated with the PSBC 900, wherein the one or more sensors can be as more fully disclosed herein. The sensor component 908 can monitor power conditions associated with the portion of the EDN controlled by the PSBC 900, and can sense or detect, and/or can receive sensed data relating to, respective types of power condition parameters (e.g., power system balance level, voltage level, current level, heat level, etc.), associated with the portion of the EDN controlled by the PSBC 900.

The PSBA 906 also can include a switch component 910 that can facilitate switching (e.g., dynamically or automatically) of a CCN between phased power lines (e.g., when the PSBC 900 is implemented in a lower tier of the multi-tier EDN) to facilitate adjusting the load balance on the multi-phase power lines, which are distributing power via the PDS associated with the PSBC 900 to the CCNs connected thereto, to facilitate controlling power system balance within a desired predefined level(s). For instance, the switch component 910 can facilitate switching (e.g., perform the switching, or communicate control information to a component (e.g., junction node) to facilitate performing the switching) the phased power line of the multi-phase power lines to which a CCN is connected, as more fully disclosed herein. When the PSBC 900 is employed in a middle or upper tier, the switch component 910 can facilitate switching the routing of the phased power in the multiple power lines so that the multi-phase power at the output (e.g., output of the PSBC 900 or output of an associated junction node) is in a desired phase order, which can be the same or different as the phase order at the input (e.g., input of the PSBC 900 or input of the junction node), as more fully disclosed herein.

In another aspect, the PSBA 906 can contain a filter component 912 that can comprise one or more filters and/or can facilitate managing one or more filters, as more fully disclosed herein, wherein the one or more filters can be employed to filter power signals being distributed from the PDS associated with the PSBC 900, for example, to filter out or reduce undesired harmonics, EMI, or RFI.

In still another aspect, the PSBC 900 can include the PSBCC 914 that can comprise an analyzer component 916 that can analyze information relating to power conditions of that portion of the tier of the EDN controlled by the PSBC 900 to facilitate determining whether there is an undesired power system condition, such as a power system imbalance, undesired harmonics or interference in the power signals, etc. The PSBCC 914 also can contain a control component 918 that can identify a desired power system correction action(s) to respond to a power system imbalance or other undesired power system condition, and can generate and communicate one or more commands (e.g., control commands), which relate to the power system correction action(s), to the PSBA 906, wherein the PSBA 906 can facilitate implementing the desired power system correction action(s) in accordance with the one or more commands, as more fully disclosed herein.

The PSBC 900 also can comprise a processor component 920 that can operate in conjunction with the other components (e.g., communicator component 902, I/F component 904, PSBA 906, PSBCC 914, etc.) of the PSBC 900 to facilitate performing the various functions of the PSBC 900. The processor component 920 can employ one or more processors, microprocessors, or controllers that can process data, such as information relating to power distribution (e.g., power condition related information, information relating to power system correction actions, switching algorithms, filter algorithms, etc.), information relating to data communications, control information, information (e.g., symbols, bits, or chips) for multiplexing/demultiplexing or modulation/demodulation such as implementing direct and inverse fast Fourier transforms, selection of modulation rates, selection of data packet formats, inter-packet times, etc., information relating to other operations of the PSBC 900, and/or other information, etc., to facilitate operation of the PSBC 900, as more fully disclosed herein, and control data flow between the PSBC 900 and other components (e.g., PDS, junction node, DNNC component, etc.) associated with the PSBC 900.

The PSBC 900 also can include a data store 922 that can store data structures (e.g., user data, metadata), code structure(s) (e.g., modules, objects, hashes, classes, procedures) or instructions, information relating to power distribution (e.g., power condition related information, information relating to power system correction actions, switching algorithms, filter algorithms, etc.), information relating to data communications, control information, network or device information like policies and specifications, attachment protocols, code sequences for scrambling, spreading and pilot (e.g., reference signal(s)) transmission, frequency offsets, control node IDs (e.g., communication device IDs), data processing algorithms (e.g., encoding algorithms, compression algorithms, decoding algorithms, decompression algorithms), information relating to other operations of the PSBC 900, etc., to facilitate controlling operations associated with the PSBC 900. In an aspect, the processor component 920 can be functionally coupled (e.g., through a memory bus) to the data store 922 in order to store and retrieve information desired to operate and/or confer functionality, at least in part, to the components of the PSBC 900 (e.g., communicator component 902, I/F component 904, PSBA 906, PSBCC 914, etc.), and/or substantially any other operational aspects of the PSBC 900.

Figure 10:
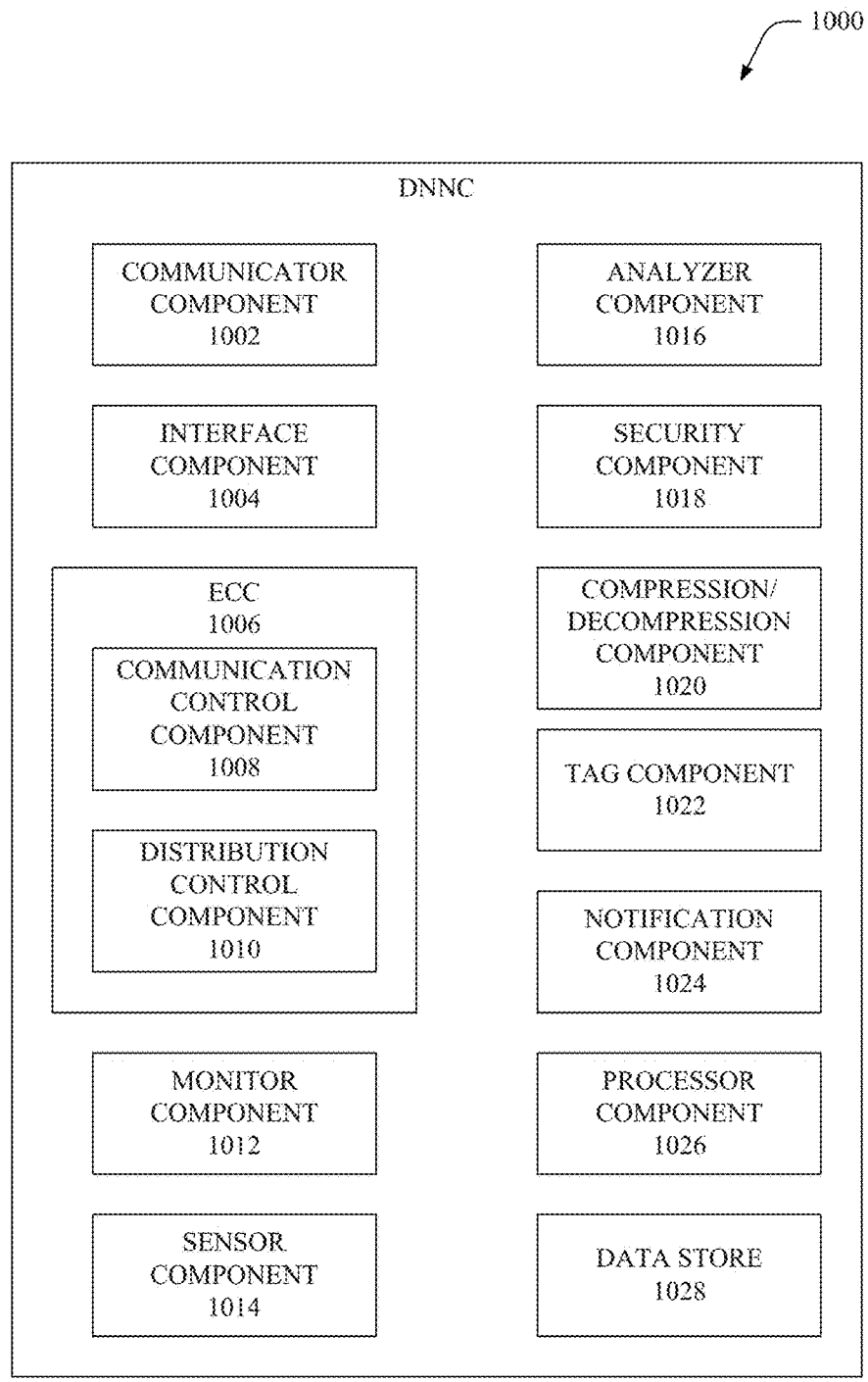
FIG. 10 depict a block diagram of an example distribution network node component (DNNC) component that can control data communications and power distribution in an EDN in accordance with various aspects and embodiments of the disclosed subject matter.

Referring to FIG. 10, depicted is a block diagram of an example DNNC component 1000 that can control data communications and power distribution in an EDN in accordance with various aspects and embodiments of the disclosed subject matter. The DNNC component 1000 can be employed in a desired hierarchy level of a multi-tier IDMS, wherein the exact implementation of the various aspects of the DNNC component 1000 can be based at least in part on the particular hierarchy level in which the DNNC component 1000 is implemented (e.g., the implementation of a DNNC component in one level of the hierarchy can be the same or different than the implementation of a DNNC component at another level of the hierarchy).

In an aspect, the DNNC component 1000 can include a communicator component 1002 that can enable the DNNC component 1000 to communicate with other components (e.g., control or communication nodes, such as other DNNC components, ECMs, etc.) via a wireline or wireless communication connection. The communicator component 1002 can comprise a communication platform that can comprise electronic components and associated circuitry that can provide for processing and manipulation of a received signal(s) or signal(s) to be transmitted, for example, via a wireline or wireless communication connection. In accordance with various embodiments, the DNNC component 1000 can be employed to facilitate wireless communication with other control nodes, and the communication platform can employ a set of antennas that can receive and transmit signal(s) from and to wireless devices like access points (APs), access terminals, wireless ports and routers, and so forth, that operate in a radio access network. The communication platform of the communicator component 1002 also can comprise electronic components and associated circuitry that provide for processing and manipulation of received signal(s) and signal(s) to be transmitted, such as, for example, receivers and transmitters, multiplexer/demultiplexer component, and a modulation/demodulation component. The communicator component 1002 also can be configured to communicate via a wireline communication connection (e.g., DSL or broadband connection, BPL connection, etc.).

The DNNC component 1000 also can comprise an interface component 1004 (also referred to herein as "I/F 1004") that can include and/or provide various adapters, connectors, controls, channels, ports, communication paths, etc., to integrate the DNNC component 1000 into virtually any EDN and enable the DNNC component 1000 to interface with other control nodes in the EDN and interface with an associated PDS. In addition, I/F 1004 can provide various adapters, connectors, controls, channels, ports, communication paths, etc., that can provide for interaction and/or communication with a processor component, and/or any other component (e.g., sensors) associated with the DNNC component 1000.

In accordance with various other aspects, the DNNC component 1000 can contain an ECC 1006 that can control communications and power distribution, as more fully disclosed herein. The ECC 1006 can include a communication control component 1008 that can be employed to (e.g., automatically and dynamically) control the collection and communication of data between the DNNC component 1000 and other control nodes, and (e.g., automatically and dynamically) control selection of communication channels and technology for use in communicating data to other control nodes, as more fully disclosed herein. The ECC 1006 also can comprise a distribution control component 1010 that can (e.g., automatically and dynamically) control distribution of power for the portion of the power grid controlled by the DNNC component 1000 based at least in part on the availability of power for distribution, demands for power by the CCNs associated with the DNNC component 1000, and the predefined control criteria. The predefined control criteria can comprise predefined power distribution criteria (and corresponding predefined power distribution rules) can relate to, for example, maximization of net consumption of power at the lower level of the hierarchy, minimization of requesting or demanding power be transferred from a higher level in the hierarchy to the lower level, minimization of the imbalance in the multi-phase power, minimization of harmonic level in the multi-phase power, minimization of interference in the multi-phase power, number of tiers in the multi-tier EDN, type of load (e.g., resistive load, resistive-capacitive load, resistive-inductive load) connected to the multi-phase power, respective number of power control components or node controller components in respective tiers of the multi-tier EDN, maximum amount of power that can be received by the PDS at a given time, maximum amount of power that can be distributed at a given time by the PDS, maximum operating temperature of the PDS, power distribution control information or rules received from a higher level (e.g., higher level DNNC), available local power from local power sources in the lower level, expected or predicted future power demands in the lower tier, consumer agreements relating to power distribution for CCNs in the lower level, etc.

In still another aspect, the DNNC component 1000 can contain a monitor component 1012 that can monitor power conditions relating to the associated PDS and/or other power sources (e.g., local PDSs) connected to the portion of the power grid under the control of the DNNC component 1000 to facilitate rendering decisions for controlling the distribution of power by the PDS. The monitor component 1012 also can monitor communication conditions associated with the DNNC component 1000 to facilitate selection of a desired communication channel and/or technology in accordance with the predefined communication channel selection criteria.

In yet another aspect, the DNNC component 1000 can include a sensor component 1014 that can that can comprise one or more sensors and/or can receive data, flags, indicators, etc., from one or more sensors, distributed throughout the EDN, or at least the portion of the EDN controlled by or otherwise associated with the DNNC component 1000. The sensors can comprise, for example, sensors that can sense power-related conditions (e.g., sensors that measure the amount of power being distributed, power balance sensors, voltage level sensors, current level sensors, harmonic level sensors, fault sensors, heat sensors, anti-tamper sensors, etc.) and sensors that can sense communication-related conditions (e.g., sensors that can be used to measure signal strength, sensors that can be used to identify QoS or data communication rates of a communication channel, sensors that can detect faults, sensors that can detect availability of a communication channel, anti-tamper sensors, etc.). The sensors can be located on or near the associated PDS or on or near the DNNC component 1000, on or near power lines associated with the PDS, on or near communication lines or channels associated with the DNNC component 1000, etc. The sensors can include or can be associated with devices that can be employed to protect the EDN from faults or other identified problems in the EDN, wherein such devices can be, for example, a fault current limiter (FCL) that can limit the amount of fault current when a fault occurs in the associated portion of the EDN, or fault current controllers (FCC) that also can control the amount of fault current in response to a detected fault.

In an aspect, the DNNC component 1000 can comprise an analyzer component 1016 that can parse, analyze, and/or evaluate information, such as information relating to power distribution and/or communication conditions, to facilitate rendering decisions, performing calculations, determining or identifying parameters relating to power distribution or communications, and performing other functions, to facilitate controlling power distribution for the portion of the power grid associated with the DNNC component 1000 and controlling communications associated with the DNNC component 1000. The information can comprise, for example, data relating to power distribution, data relating to communications associated with the DNNC component 1000, data obtained from sensors, metadata associated with the data, tag information (e.g., tag name or word that can be used to associate a piece of data with another piece of data, a component (e.g., CCN, PDS, PSBC, junction node, DNNC component, sensor, etc.), a device (e.g., PEV, PHEV, appliance, etc.), a location, etc.), etc.

In still another aspect, the DNNC component 1000 can employ a security component 1018 that can employ desired security protocols and standards to facilitate authenticating users or components associated with the EDN, encrypting data to be transmitted and decrypting received data (e.g., received encrypted data), and detecting or identifying breaches of security in the power grid (e.g., attempts to tamper with a PDS, junction node, DNNC component 1000, or other component; unauthorized attempt to access data associated with the DNNC component 1000, etc.), as more fully disclosed herein.

In an aspect, the DNNC component 1000 can include a compression/decompression component 1020 that can compress data to reduce the amount of data being transmitted from the DNNC component 1000 to another component (e.g., another DNNC component, a CCN, a PDS, a PSBC, etc.) or stored in the data store 1028 of the DNNC component 1000, in accordance with a desired compression/decompression algorithm, as more fully disclosed herein. The compression/decompression component 1020 also can decompress data, such as received data or data retrieved from the data store 1028, to obtain all or at least a desired portion of the original data, in accordance with the desired compression/decompression algorithm.

In yet another aspect, the DNNC component 1000 can comprise a tag component 1022 that can tag a piece of data to associate the piece of data with another piece of data, a component (e.g., CCN, PDS, DNNC component, PSBC, junction node, ECM, sensor, etc.), a device (e.g., PEV, PHEV, appliance, etc.), a location, etc., wherein a mapping of the association with the tag can be stored in the data store 1028 and/or provided to another component associated with the DNNC component 1000. The tag component 1022 also can be employed to identify tags and associated data in received pieces of data to facilitate desired processing of the data (e.g., identify a tag associated with an PEV or PHEV and/or associated owner of the vehicle to facilitate proper billing of the owner for charging the electric vehicle at a distribution point of the EDN that is outside of the owner's CCN).

In accordance with an aspect, the DNNC component 1000 can contain a notification component 1024 that can generate a notification, indicator, or flag relating to power distribution, such as a fault indicator or flag to indicate a fault or other problem at a specified point in the EDN or with regard to a component or power-related parameter, a notification regarding power conditions, etc., or relating to communication conditions, such as a fault indicator or flag to indicate a fault or other problem relating to communications at a specified point in the EDN or with regard to a component or communication-related parameter, a notification regarding communication conditions, etc. The DNNC component 1000, employing the communicator component 1002, can communicate the generated notification, flag, or indicator, or a message comprising information relating to the generated notification, flag, or indicator to a desired control node (e.g., a DNNC component associated with the DNNC component 1000, a CCN, PSBC, junction node, ECM, etc.) for evaluation and/or processing.

The DNNC component 1000 also can comprise a processor component 1026 that can operate in conjunction with the other components (e.g., communicator component 1002, I/F component 1004, ECC 1006, etc.) of the DNNC component 1000 to facilitate performing the various functions of the DNNC component 1000. The processor component 1026 can employ one or more processors, microprocessors, or controllers that can process data, such as information relating to power distribution and data communications, information (e.g., symbols, bits, or chips) for multiplexing/demultiplexing or modulation/demodulation such as implementing direct and inverse fast Fourier transforms, selection of modulation rates, selection of data packet formats, inter-packet times, etc., information relating to other operations of the DNNC component 1000, and/or other information, etc., to facilitate operation of the DNNC component 1000, as more fully disclosed herein, and control data flow between the DNNC component 1000 and other components (e.g., PDS, PSBC, junction node, another DNNC component, ECM, etc.) associated with the DNNC component 1000.

The DNNC component 1000 also can include a data store 1028 that can store data structures (e.g., user data, metadata), code structure(s) (e.g., modules, objects, hashes, classes, procedures) or instructions, information relating to power distribution and data communications, network or device information like policies and specifications, attachment protocols, code sequences for scrambling, spreading and pilot (e.g., reference signal(s)) transmission, frequency offsets, control node IDs (e.g., communication device IDs), encoding algorithms, compression algorithms, decoding algorithms, decompression algorithms, information relating to other operations of the DNNC component 1000, etc., to facilitate controlling operations associated with the DNNC component 1000. In an aspect, the processor component 1026 can be functionally coupled (e.g., through a memory bus) to the data store 1028 in order to store and retrieve information desired to operate and/or confer functionality, at least in part, to the components of the DNNC component 1000 (e.g., communicator component 1002, I/F component 1004, ECC 1006, etc.), and/or substantially any other operational aspects of the DNNC component 1000.

Figure 11:
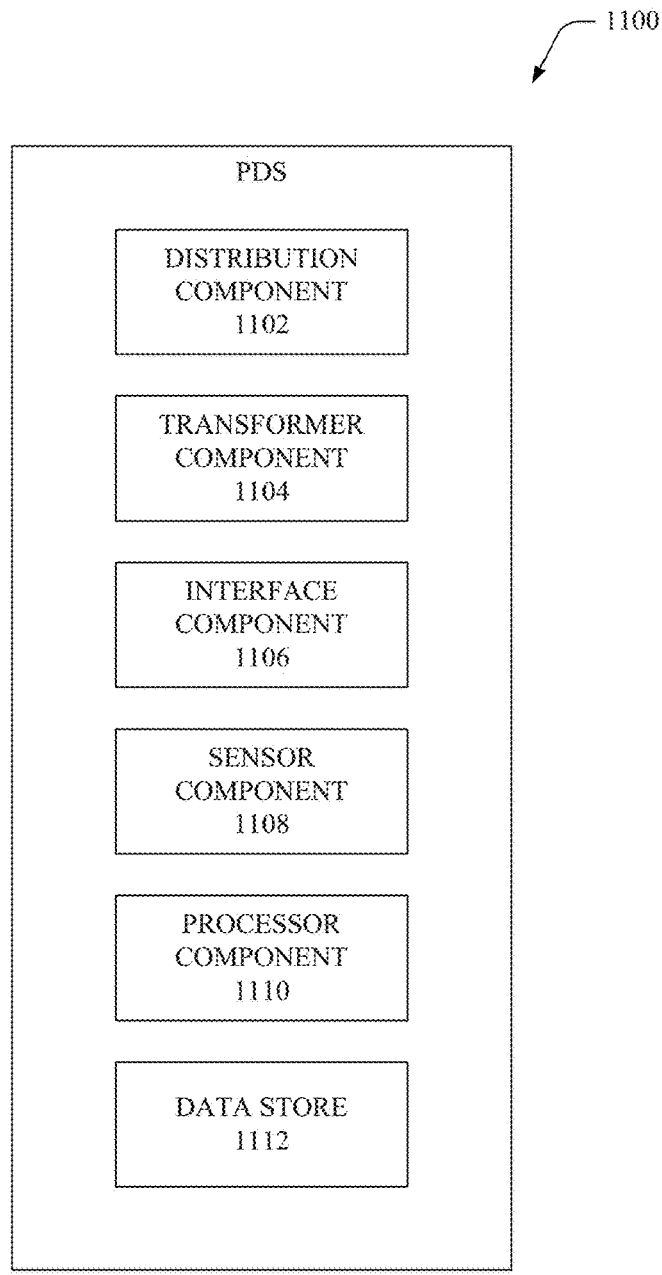
FIG. 11 illustrates a block diagram of an example power distribution source (PDS) in accordance with various aspects of the disclosed subject matter.

FIG. 11 illustrates a block diagram of an example PDS 1100 in accordance with various aspects of the disclosed subject matter. In an aspect, the PDS 1100 can include a distribution component 1102 that can be employed to generate and/or distribute power to a PDS(s) or CCN(s) associated with the PDS 1100. In accordance with various embodiments, the PDS 1100 can be a power generation plant that generates and distributes power to one or more PDSs that are lower in the hierarchy, or a mid level PDS or low level PDS that distributes power received from a PDS that is higher up in the hierarchy in the EDN.

In another aspect, the PDS 1100 can contain a transformer component 1104 that can be used to convert voltage from a lower voltage level to a higher voltage level, or from a higher voltage level to a lower voltage level, depending on where the electric power is being distributed. For example, if the PDS 1100 is an upper level PDS, such as a power generation plant, the PDS 1100, using the transformer component 1104, can convert the generated power voltage level to a higher voltage level to facilitate efficient transmission of the power to another PDS lower in the hierarchy and closer to the end point (e.g., CCN). As another example, the PDS 1100 can be a lower level PDS that receives power having a higher voltage level from a PDS higher up in the hierarchy in the EDN, and the transformer component 1104 can transform the higher voltage power to power having a lower voltage level that is suitable for the next destination (e.g., CCN) of the power.

In still another aspect, the PDS 1100 can comprise an interface component 1106 (I/F 1106) that can that can include and/or provide various adapters, connectors, controls, channels, ports, communication paths, etc., to integrate the PDS 1100 into virtually any EDN and enable the PDS 1100 to interface with other distribution nodes (e.g., PDSs) and control nodes (e.g., DNNC component), or consumer nodes (e.g., CCNs) in the EDN. In addition, I/F 1106 can provide various adapters, connectors, controls, channels, ports, communication paths, etc., that can provide for interaction and/or communication with a processor component (e.g., 1108), and/or any other component (e.g., sensor(s)) associated with the PDS 1100.

In yet another aspect, the PDS 1100 can include a sensor component 1108 that can comprise one or more sensors that can be distributed at specified locations on, at or near the PDS 1100. The respective sensors can comprise, for example, sensors that can sense power-related conditions (e.g., sensor that measures the amount of power being distributed, power balance sensor, voltage level sensor, current level sensor, harmonic sensor, fault sensor, heat sensor, anti-tamper sensor, etc.) and sensors that can sense communication-related conditions relating to communications between the PDS 1100 and an associated DNNC, PSBC, or another PDS. The sensors can be located, for example, on or near the PDS 1100, on or near power lines associated with the PDS 1100, etc. The sensor component 1108 can generate signals, messages, notifications, flags, indicators, etc., that can be transmitted from the sensor component 1108 to the associated PSBC, associated DNNC component, or other desired component for further processing, as more fully disclosed herein.

The PDS 1100 also can comprise a processor component 1110 that can operate in conjunction with the other components (e.g., distribution component 1102, transformer component 1104, I/F component 1106, sensor component 1108, etc.) to facilitate performing the various functions of the PDS 1100. The processor component 1110 can employ one or more processors, microprocessors, or controllers that can process data, such as information relating to power distribution, information to facilitate interfacing the PDS 1100 with an associated PSBC, DNNC component or junction node, information relating to or obtained from sensors, information relating to other operations of the PDS 1100, and/or other information, etc., to facilitate operation of the PDS 1100, as more fully disclosed herein, and control data flow between the PDS 1100 and other components (e.g., another PDS, a DNNC component, a PSBC, a junction node, an ECM, etc.) associated with the PDS 1100.

The PDS 1100 also can include a data store 1112 that can store data structures (e.g., user data, metadata), code structure(s) (e.g., modules, objects, hashes, classes, procedures) or instructions, information relating to power distribution, information to facilitate interfacing the PDS 1100 with an associated component (e.g., PSBC, DNNC component, junction node, etc.), information relating to or obtained from sensors, information relating to other operations of the PDS 1100, etc., to facilitate controlling operations associated with the PDS 1100. In an aspect, the processor component 1110 can be functionally coupled (e.g., through a memory bus) to the data store 1112 in order to store and retrieve information desired to operate and/or confer functionality, at least in part, to the components of the PDS 1100 (e.g., distribution component 1102, transformer component 1104, I/F component 1106, sensor component 1108, etc.), and/or substantially any other operational aspects of the PDS 1100.

Figure 12:
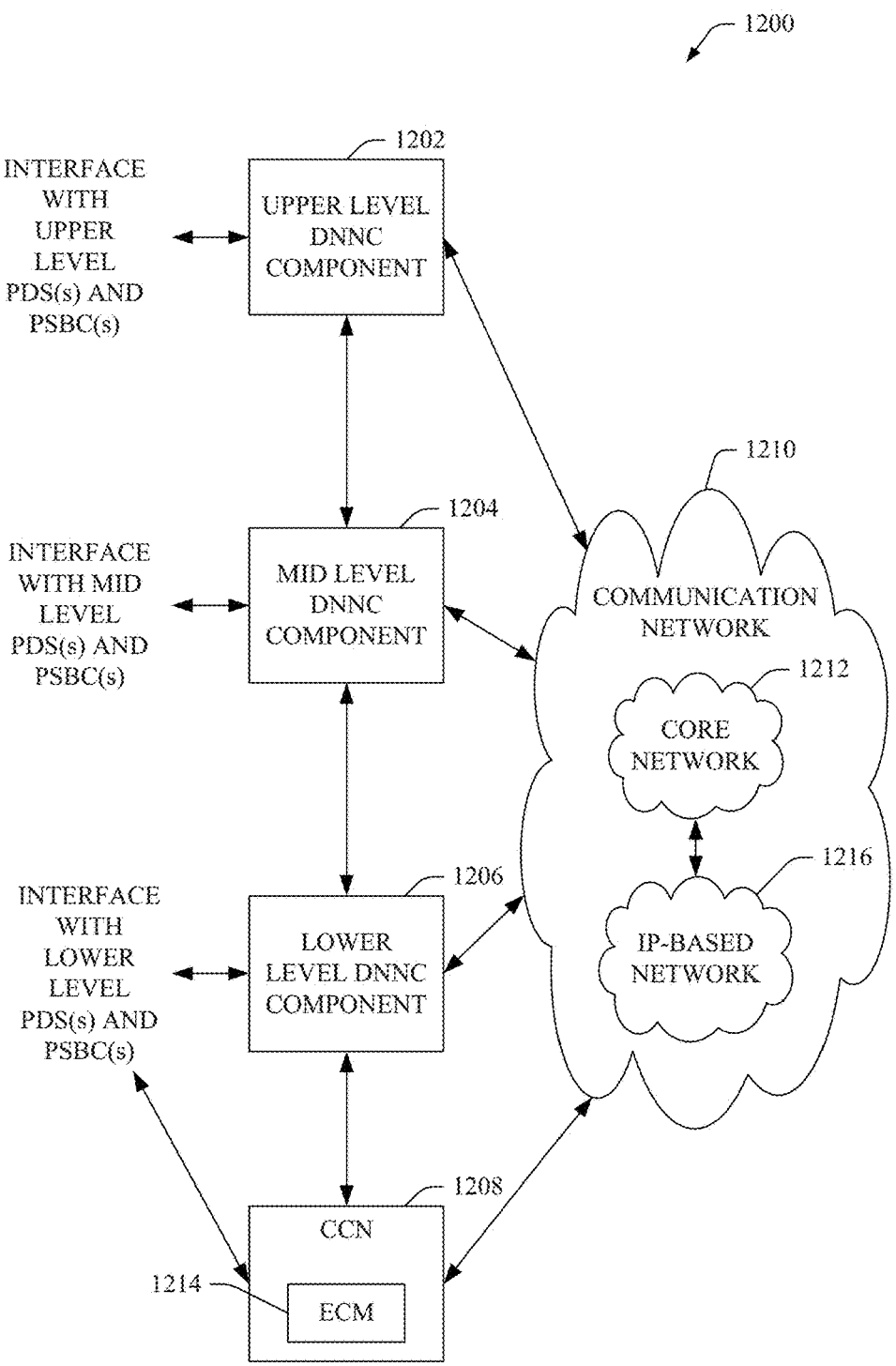
FIG. 12 depicts a block diagram of an example system that can employ wired or wireless communication to facilitate controlling power distribution in accordance with various aspects and embodiments of the disclosed subject matter.

FIG. 12 depicts a block diagram of an example system 1200 that can employ wireline or wireless communication to facilitate controlling power distribution in accordance with various aspects and embodiments of the disclosed subject matter. The system 1200 can include an upper level DNNC component 1202, a mid level DNNC component 1204, a lower level DNNC component 1206, and a CCN 1208, wherein each of these components can be the same or similar as, or can comprise the same or similar functionality as respective components (e.g., respectively named components), as disclosed herein. The upper level DNNC component 1202, mid level DNNC component 1204, and lower level DNNC component 1206 can be respectively interfaced with an upper level PDS and/or upper level PSBC, a mid level PDS and/or mid level PSBC, and a lower level PDS and/or lower level PSBC, which are not shown for reasons of brevity and clarity.

In an aspect, the upper level DNNC component 1202, mid level DNNC component 1204, and lower level DNNC component 1206 each can be associated with (e.g., connected to) a communication network 1210 that can facilitate wireline and wireless communication between the upper level DNNC component 1202, mid level DNNC component 1204, lower level DNNC component 1206, and CCN 1208, associated with the communication network 1210. In accordance with various aspects and embodiments, the communication network 1210 can comprise a core network 1212 (e.g., mobile core network) that can be employed to facilitate communication by control nodes (e.g., DNNC components, ECM 1214) associated (e.g., wirelessly connected) with the core network 1212 and other control nodes associated with the communication network 1210. The core network 1212 can be associated with APs (e.g., macro or cellular AP, femto AP, pico AP) (not shown) to facilitate wireless communication of voice and data associated with control nodes, associated with the communication network 1210. The core network 1212 can facilitate routing voice and data communications between control nodes or other communication devices (e.g., computer, mobile phone (e.g., cellular phone, smart phone), personal digital assistant (PDA), electronic notepad, electronic netbook, electronic gaming device, another type of electronic device with communication capabilities, servers (e.g., email server, multimedia server, audio server, video server, news server, financial or stock information server), etc.) via the core network 1212 or via an IP-based network 1216 (e.g., Internet, intranet, etc.) associated with (e.g., included in or connected to) the communication network 1210. The core network 1212 also can allocate resources to the control nodes in the communication network 1210, convert or enforce protocols, establish and enforce QoS for the control nodes or other devices, provide applications or services in the network, translate signals, and/or perform other desired functions to facilitate system interoperability and communication in the wireless communication network. The core network 1212 further can include desired components, such as routers, nodes (e.g., serving general-packet-radio-service (GPRS) support node (SGSN), gateway GPRS support node (GGSN), etc.), switches, interfaces, controllers, etc., that can facilitate communication of data between control nodes or devices associated with the communication network 1210. The communication network 1210 also can include the IP-based network 1216, which can be associated with the core network 1212 and can facilitate communications by control nodes or devices associated with the communication network 1210 at least in part via communication of data packets (e.g., IP-based data packets) between control nodes or devices that are associated with the communication network 1210 using a wireline or wireless communication connection in accordance with specified IP protocols. In still another aspect, in addition to or as an alternative to, the control nodes being able to communicate with each other via the communication network 1210, the control nodes can communicate with each other via communication technology(ies) (e.g., BPL, PLC, PDSL, etc.) associated with the transmission power lines to which the PDSs of the respective hierarchy levels and the CCN 1208 are connected.

In accordance with an embodiment of the disclosed subject matter, a design platform (not shown), for example, comprising an application programming interface(s) (API) (not shown), can be employed to enable application developers to develop additional controls that can be employed to facilitate controlling data communication and power distribution in the EDN. For instance, an API can be utilized to create one or more desired custom controls that can be employed to facilitate data communication control or power distribution control for a particular level in the multi-tier hierarchy of the IDMS, wherein the custom control(s) created using an API can be made available for implementation in the EDN via a desired format, such as a saved or downloadable file, CD-ROM, DVD-ROM, memory stick (e.g., flash memory stick), floppy disk, etc.

In accordance with another embodiment of the disclosed subject matter, one or more components (e.g., DNNC component, PSBC, ECM, etc.) in the communication network environment can utilize artificial intelligence (AI) techniques or methods to infer (e.g., reason and draw a conclusion based at least in part on a set of metrics, arguments, or known outcomes in controlled scenarios) an automated response to perform in response to an inference(s); a type of power system correction action(s) to be performed (e.g., to restore a desired power system balance, in response to a detected power system imbalance); whether a power system imbalance is expected to occur during a given period of time (e.g., at a future time); a type of filter and/or filter parameter to be employed to filter a power signal; an amount or a type of data that is to be included in a data communication between DNNC components; a control parameter value relating to power distribution or data communications; a communication channel or technology to utilize to communicate data between DNNC components; etc. Artificial intelligence techniques typically can apply advanced mathematical algorithms—e.g., decision trees, neural networks, regression analysis, principal component analysis (PCA) for feature and pattern extraction, cluster analysis, genetic algorithm, and reinforced learning—to historic and/or current data associated with the systems and methods disclosed herein to facilitate rendering an inference(s) related to the systems and methods disclosed herein.

In particular, the one or more components in the communication network environment can employ one of numerous methodologies for learning from data and then drawing inferences from the models so constructed, e.g., Hidden Markov Models (HMMs) and related prototypical dependency models. General probabilistic graphical models, such as Dempster-Shafer networks and Bayesian networks like those created by structure search using a Bayesian model score or approximation can also be utilized. In addition, linear classifiers, such as support vector machines (SVMs), non-linear classifiers like methods referred to as "neural network" methodologies, fuzzy logic methodologies can also be employed. Moreover, game theoretic models (e.g., game trees, game matrices, pure and mixed strategies, utility algorithms, Nash equilibria, evolutionary game theory, etc.) and other approaches that perform data fusion, etc., can be exploited in accordance with implementing various automated aspects described herein. The foregoing techniques or methods can be applied to analysis of the historic and/or current data associated with systems and methods disclosed herein to facilitate making inferences or determinations related to systems and methods disclosed herein.

In accordance with various aspects and embodiments, the subject specification can be utilized in wireless, wireline, and converged (e.g., wireless and wireline) communication networks. For example, the disclosed subject matter can be employed in wireless networks, with such networks including, for example, 2G type networks, 3G type networks, 4G type networks, LTE, Universal Mobile Telecommunications Systems (UMTS), Code Division Multiple Access (CDMA) type systems, Wideband CDMA (WCDMA) type systems, etc.

The aforementioned systems and/or devices have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component providing aggregate functionality. The components may also interact with one or more other components not specifically described herein for the sake of brevity, but known by those of skill in the art.

In view of the example systems and/or devices described herein, example methodologies that can be implemented in accordance with the disclosed subject matter can be better appreciated with reference to flowcharts in FIGS. 13-17. For purposes of simplicity of explanation, example methodologies disclosed herein are presented and described as a series of acts; however, it is to be understood and appreciated that the claimed subject matter is not limited by the order of acts, as some acts may occur in different orders and/or concurrently with other acts from that shown and described herein. For example, a method disclosed herein could alternatively be represented as a series of interrelated states or events, such as in a state diagram. Moreover, interaction diagram(s) may represent methodologies in accordance with the disclosed subject matter when disparate entities enact disparate portions of the methodologies. Furthermore, not all illustrated acts may be required to implement a method in accordance with the subject specification. It should be further appreciated that the methodologies disclosed throughout the subject specification are capable of being stored on an article of manufacture to facilitate transporting and transferring such methodologies to computers for execution by a processor or for storage in a memory.

Figure 13:
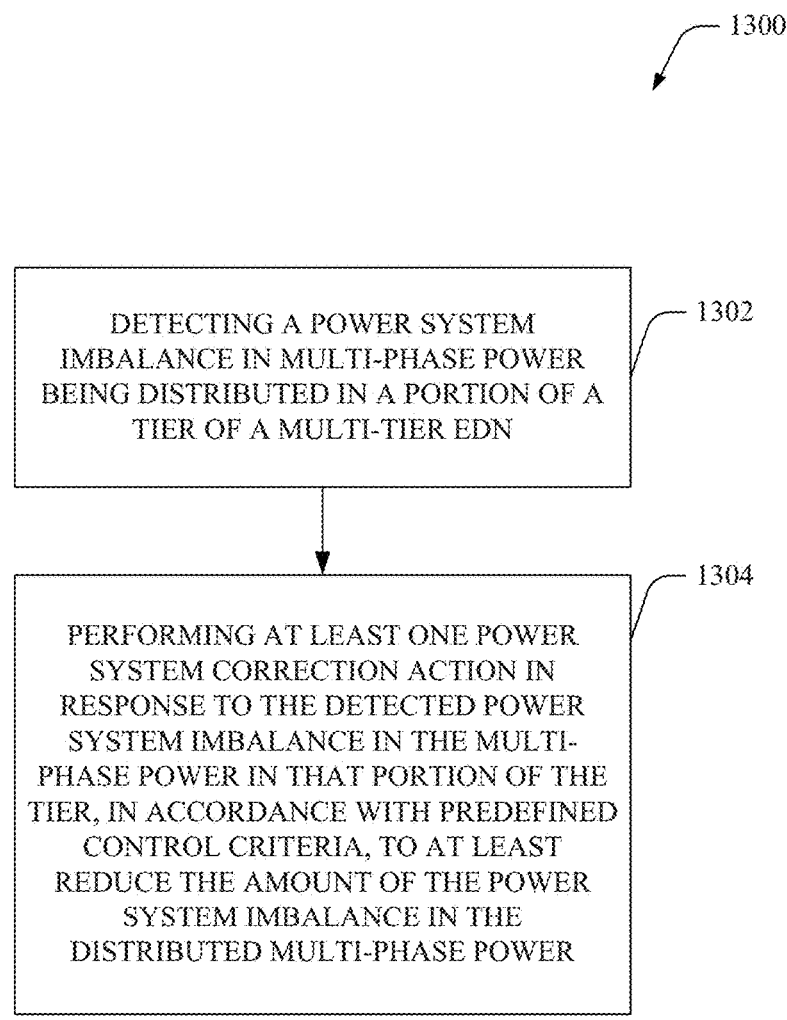
FIG. 13 illustrates a diagram of a flowchart of an example method that can control power system balance for multi-phase power in a portion of a tier of a multi-tier EDN in accordance with various aspects and embodiments of the disclosed subject matter.

FIG. 13 illustrates a diagram of a flowchart of an example method 1300 that can control power system balance for multi-phase power in a portion of a tier of a multi-tier EDN in accordance with various aspects and embodiments of the disclosed subject matter. At 1302, a power system imbalance can be detected in multi-phase power being distributed in a portion of a tier of a multi-tier EDN. Control of power distribution, and data communications relating thereto, in the multi-tier EDN can be de-centralized such that respective portions of a tier, and respective tiers, of the multi-tier EDN can be segmented and respectively controlled by respective control nodes (e.g., PSBC, DNNC component). Power conditions of multi-phase power being distributed in a portion of a tier (e.g., lower tier, middle tier, upper tier) of the multi-tier EDN can be monitored by the control node that controls power distribution for that portion of the tier. The control node can detect a power system imbalance in the multi-phase power being distributed in the portion of the tier, wherein the power system imbalance can be one or more of the power system imbalances, as more fully disclosed herein.

At 1304, at least one power system correction action can be performed (e.g., executed dynamically or automatically) in response to the detected power system imbalance in the multi-phase power in that portion of the tier, in accordance with the predefined control criteria, to at least reduce the amount of the power system imbalance in the distributed multi-phase power. The control node can identify the at least one power system correction action to be employed to rectify the detected power system imbalance based at least in part on the predefined control criteria. The at least one power system correction action can comprise one or more of the power system correction actions as are more fully disclosed herein, for example.

Figure 14:
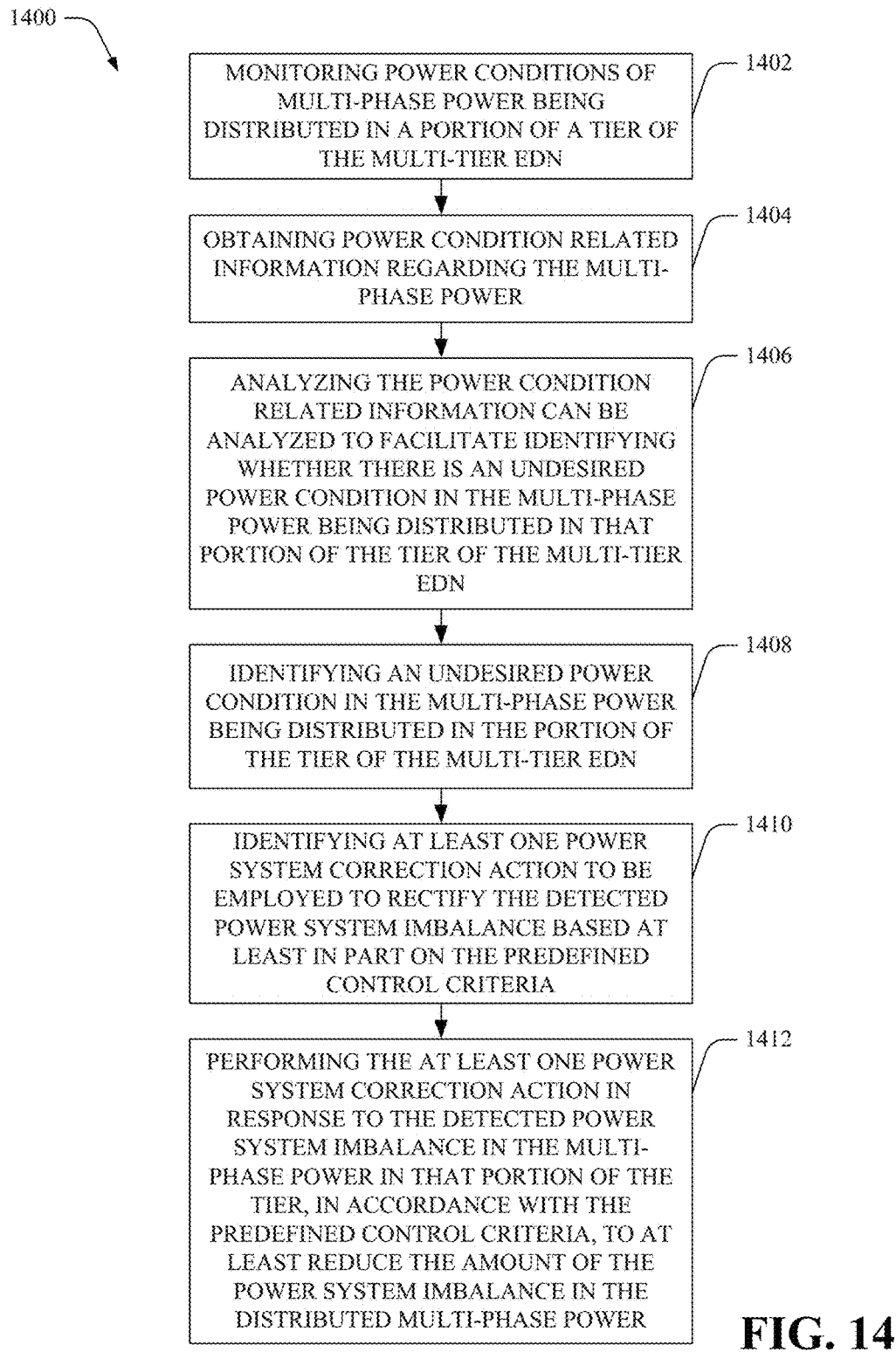
FIG. 14 depicts a diagram of a flowchart of an example method that can control power system balance for multi-phase power in a portion of a tier of a multi-tier EDN in accordance with various aspects and embodiments of the disclosed subject matter.

FIG. 14 depicts a diagram of a flowchart of an example method 1400 that can control power system balance for multi-phase power in a portion of a tier of a multi-tier EDN in accordance with various aspects and embodiments of the disclosed subject matter. At 1402, power conditions of multi-phase power being distributed in a portion of a tier of the multi-tier EDN can be monitored. Respective control nodes (e.g., PSBC, DNNC component) can be employed to monitor and control power distribution in respective portions of respective tiers in the multi-tier EDN. Power conditions of multi-phase power being distributed in a portion of a tier (e.g., lower tier, middle tier, upper tier) of the multi-tier EDN can be monitored by the control node that controls power distribution for that portion of the tier.

At 1404, power condition related information regarding the multi-phase power can be obtained. In an aspect, the control node can comprise or be associated with one or more sensors, as more fully disclosed herein, that can sense or obtain information regarding various parameters or aspects relating to the power conditions of the multi-phase power being distributed for that portion of the tier. The power condition related information can be obtained or sampled at a desired level of granularity (e.g., each minute, each second, each millisecond, or at another desired periodic interval) to facilitate real time, or at least near real time, control of power distribution for that portion of the tier.

At 1406, the power condition related information can be analyzed to facilitate identifying whether there is an undesired power condition (e.g., power system imbalance, undesired harmonics or interference) in the multi-phase power being distributed in that portion of the tier of the multi-tier EDN. In an aspect, as part of the analysis, the control node can apply one or more predefined power system balance rules to the power condition related information or other information derived therefrom to facilitate determining whether an undesired power condition exists, wherein the one or more predefined power system balance rules can be formed and implemented to correspond with the predefined control criteria.

At 1408, an undesired power condition can be identified (e.g., detected) in the multi-phase power being distributed in the portion of the tier of the multi-tier EDN. For instance, as part of the analysis of the power condition related information, and/or information derived therefrom, an undesired power condition can be identified in the multi-phase power, for example, when the analysis results of the application of the one or more power system balance rules indicates that an undesired power condition exists in the multi-phase power. For example, the analysis results can indicate that the amount of power system imbalance is greater than a predefined maximum threshold amount of power system imbalance that can be allowed in distributing the multi-phase power in that portion of the tier, or that a harmonic level is greater than a predefined maximum threshold harmonic level that can be allowed in the multi-phase power, or that an interference level is greater than a predefined maximum threshold interference level that can be allowed in the multi-phase power.

At 1410, at least one power system correction action can be identified (e.g., dynamically or automatically) to be employed to rectify the detected power system imbalance based at least in part on the predefined control criteria. The one or more power system balance rules also can be applied to the power condition related information, and/or information derived therefrom, to facilitate identifying the at least one power system correction action. The at least one power system correction action can comprise, for example, one or more of the power system correction actions as are more fully disclosed herein. At 1412, the at least one power system correction action can be performed (e.g., executed dynamically or automatically) in response to the detected power system imbalance in the multi-phase power in that portion of the tier, in accordance with the predefined control criteria, to at least reduce the amount of the power system imbalance in the distributed multi-phase power.

Figure 15:
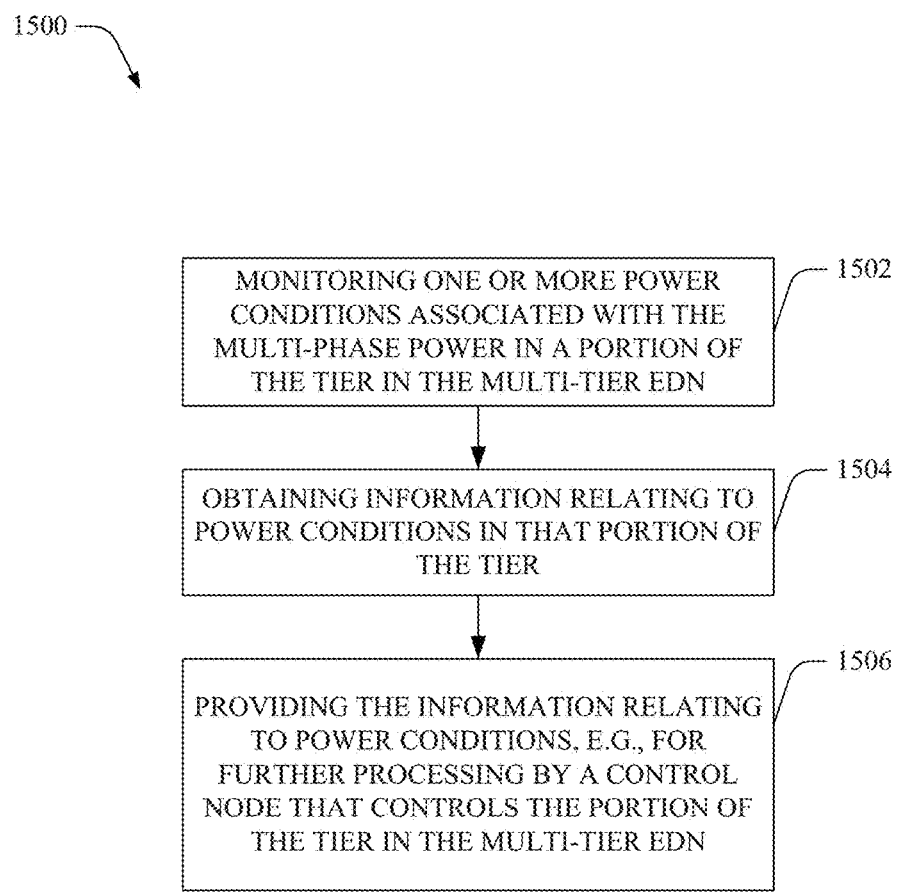
FIG. 15 illustrates a diagram of a flowchart of an example method that can facilitate controlling power conditions associated with multi-phase power being distributed in a portion of a tier in a multi-tier EDN in accordance with various aspects and embodiments of the disclosed subject matter.

FIG. 15 illustrates a diagram of a flowchart of an example method 1500 that can facilitate controlling power conditions associated with multi-phase power being distributed in a portion of a tier in a multi-tier EDN in accordance with various aspects and embodiments of the disclosed subject matter. The method 1500 can be implemented by a sensor component, for example. At 1502, one or more power conditions associated with the multi-phase power can be monitored in a portion of the tier in the multi-tier EDN. In an aspect, one or more sensors can be distributed to desired locations in at least a portion of a tier (e.g., lower tier, middle tier, upper tier) in the multi-tier EDN. The one or more sensors can be employed to monitor power conditions in that portion of the tier.

At 1504, information relating to power conditions in that portion of the tier can be obtained. For instance, the one or more sensors can detect, receive, sample, or otherwise obtain information relating to power conditions in that portion of the tier. The information can be obtained or sampled continuously or substantially continuously, or periodically, as desired. For example, a sensor can obtain an information sample for a particular parameter relating to power conditions of the multi-phase power at desired periodic time intervals (e.g., every minute, every second, every millisecond, or at another desired time interval that is longer or shorter than the aforementioned time intervals) to attain a desired level of granularity for the power condition related data. At 1506, the information relating to power conditions can be provided (e.g., transmitted), for example, for further processing by a control node (e.g., PSBC, DNNC component) that controls the portion of the tier in the multi-tier EDN. For instance, the one or more sensors can transmit the obtained power condition related data to the control node, for example, at desired periodic time intervals (e.g., every minute, every second, every millisecond, or at another desired time interval that is longer or shorter than the aforementioned time intervals), which can be the same as or different than the time interval employed for obtaining the data.

Figure 16:
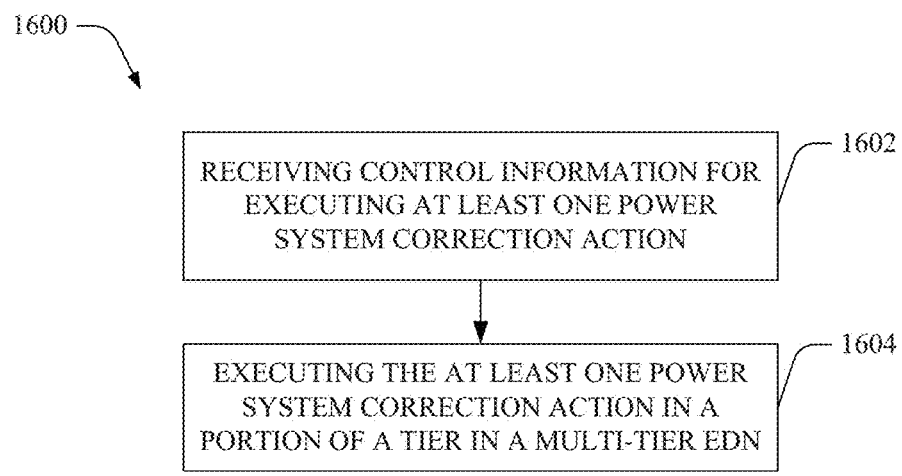
FIG. 16 presents a diagram of a flowchart of an example method that can facilitate executing a power system correction action to control multi-phase power being distributed in a portion of a tier in a multi-tier EDN in accordance with various aspects and embodiments of the disclosed subject matter.

FIG. 16 presents a diagram of a flowchart of an example method 1600 that can facilitate executing a power system correction action to control multi-phase power being distributed in a portion of a tier in a multi-tier EDN in accordance with various aspects and embodiments of the disclosed subject matter. In an aspect, the method 1600 can be implemented, for example, by a junction node (e.g., comprising a switch component or filter component). At 1602, control information for executing at least one power system correction action can be received. For instance, a component, such as a junction node, can receive the control information transmitted from a control node. At 1604, the at least one power system correction action can be executed. The component (e.g., junction node) can execute or perform the at least one power system correction action based at least in part on the control information, wherein such power system correction action(s) can comprise one or more such actions, as more fully disclosed herein. The at least one power system correction action can facilitate controlling the distribution of the multi-phase power in the portion of the tier of the multi-tier EDN such that the power conditions (e.g., power balance of the multi-phase power) are within desired limits (e.g., at or below a predefined maximum threshold amount of power system imbalance).

Figure 17:
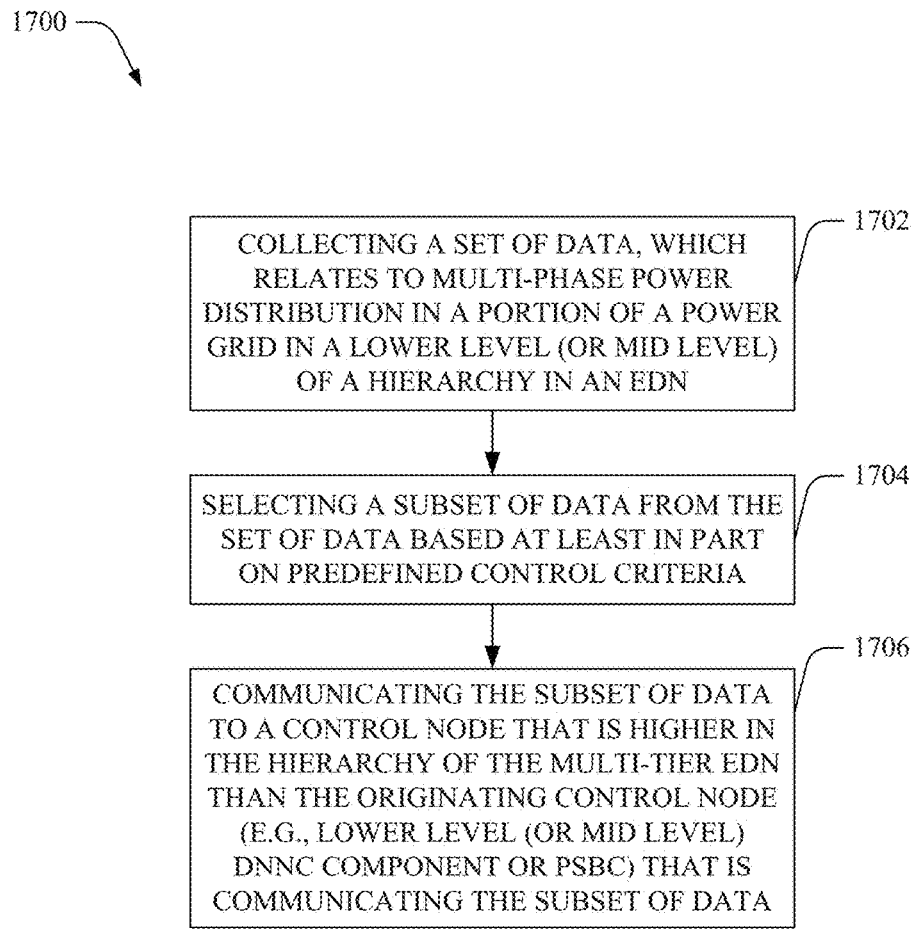
FIG. 17 illustrates a diagram of a flowchart of an example method that can facilitate communicating a desired subset of data, which relates to multi-phase power distribution, between control nodes in respective different tiers in a multi-tier EDN to facilitate controlling power distribution in EDN in accordance with various aspects and embodiments of the disclosed subject matter.

FIG. 17 illustrates a flowchart of an example method 1700 that can facilitate communicating a desired subset of data, which relates to multi-phase power distribution, between control nodes in respective different tiers in a multi-tier EDN to facilitate controlling power distribution in EDN in accordance with various aspects and embodiments of the disclosed subject matter. At 1702, a set of data, which relates to multi-phase power distribution in a portion of a power grid in a lower level (or mid level) of a hierarchy in an EDN, can be collected. For example, a lower level control node (e.g., PSBC, DNNC component) can obtain, collect and/or aggregate a set of data relating to power distribution for the portion of the power grid in the lower level of the hierarchy of the multi-tier EDN, wherein the set of data can comprise data obtained by the lower level control node from one or more associated components, such as an associated PDS(s), a CCN(s) or ECM(s), a sensor(s), a junction node(s), etc., in the portion of the lower tier controlled by the lower level control node, wherein the collected data can comprise results of data analysis, evaluation or calculations performed by the lower level control node, data obtained from the associated components, etc. The data can include, for example, data relating to power conditions, such as power system balance, voltage levels, current levels, harmonic levels or effects, interference levels, etc., for the multi-phase power being distributed in the portion of the lower level controlled by the lower level control node.

At 1704, a subset of data can be selected from the set of data based at least in part on predefined control criteria. The predefined control criteria can comprise predefined data selection criteria that can relate to, for example, the destination control node (e.g., mid level DNNC component, upper level DNNC component, mid level PSBC, upper level PSBC) of the subset of data, type of data (e.g., type of parameter, type of indicator, etc.) or amount of data desired by the destination control node, priority of data, data available in the set of data, respective hierarchy levels of the originating and destination control nodes, current communication conditions, etc. In accordance with the predefined data selection criteria (and application of corresponding predefined data selection rules), a subset of data, which can comprise all or a desired lesser portion of the set of data, can be selected for communication to the control node that is higher (e.g., at the next higher tier or level) in the hierarchy than the originating control node (e.g., lower level (or mid level) DNNC component or PSBC) that is sending the subset of data.

At 1706, the subset of data can be communicated to a control node that is higher in the hierarchy of the multi-tier EDN than the originating control node (e.g., lower level (or mid level) DNNC component or PSBC) that is communicating the subset of data. For example, if the originating control node is a lower level control node, it can transmit the subset of data to the control node (e.g., mid level control node or upper level control node) that is higher (e.g., at the next highest level) in the hierarchy than the originating control node; or if the originating control node is a mid level control node, it can transmit the subset of data to the control node (e.g., higher-up mid level control node or upper level control node) that is higher (e.g., at the next highest level) in the hierarchy than the originating control node. The control node that receives the subset of data can process (e.g., decompress, decrypt, collect, analyze, etc.) the subset of data in accordance with the predefined control criteria.

Figure 18:
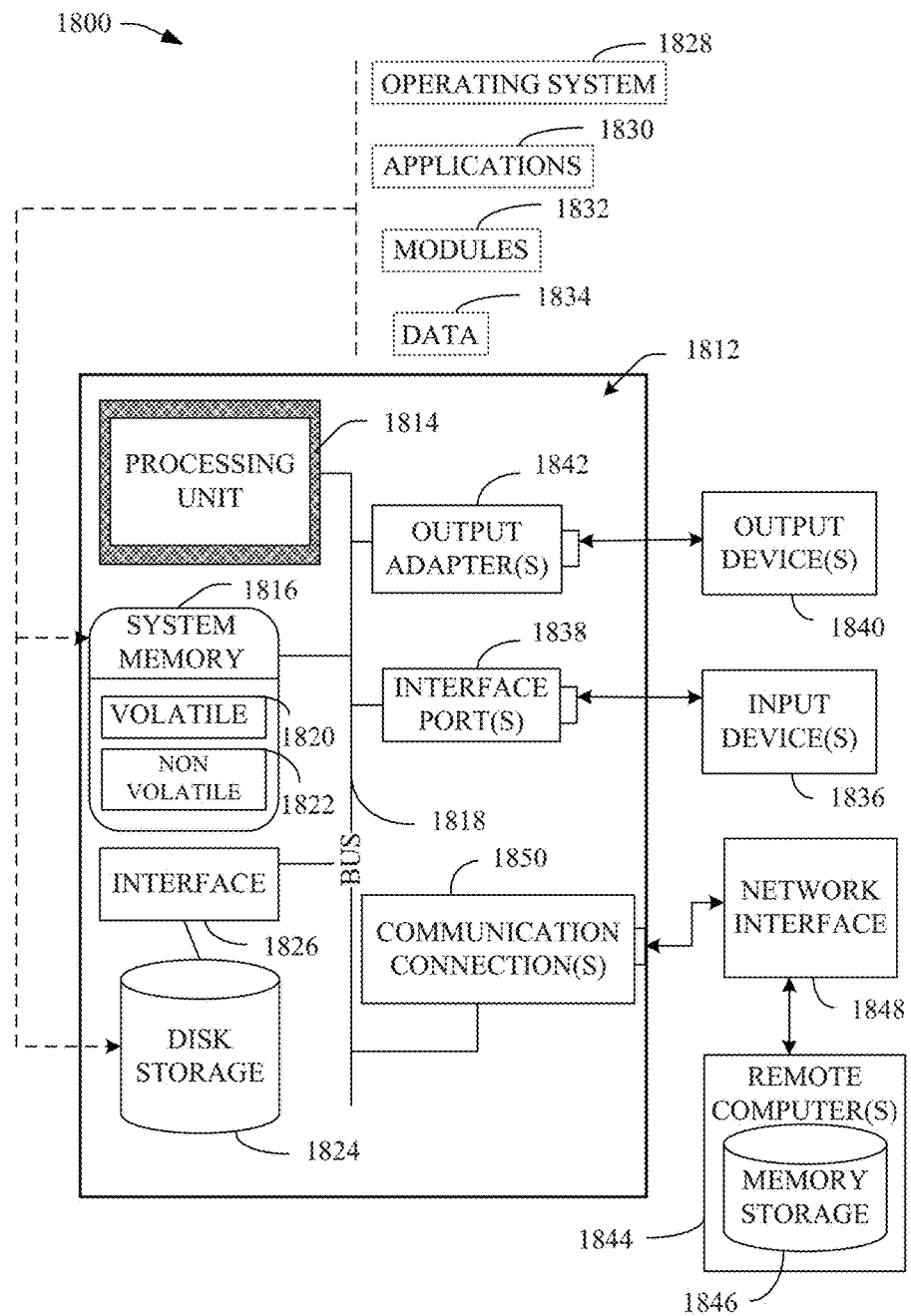
FIG. 18 is a schematic block diagram illustrating a suitable operating environment.
Figure 19:
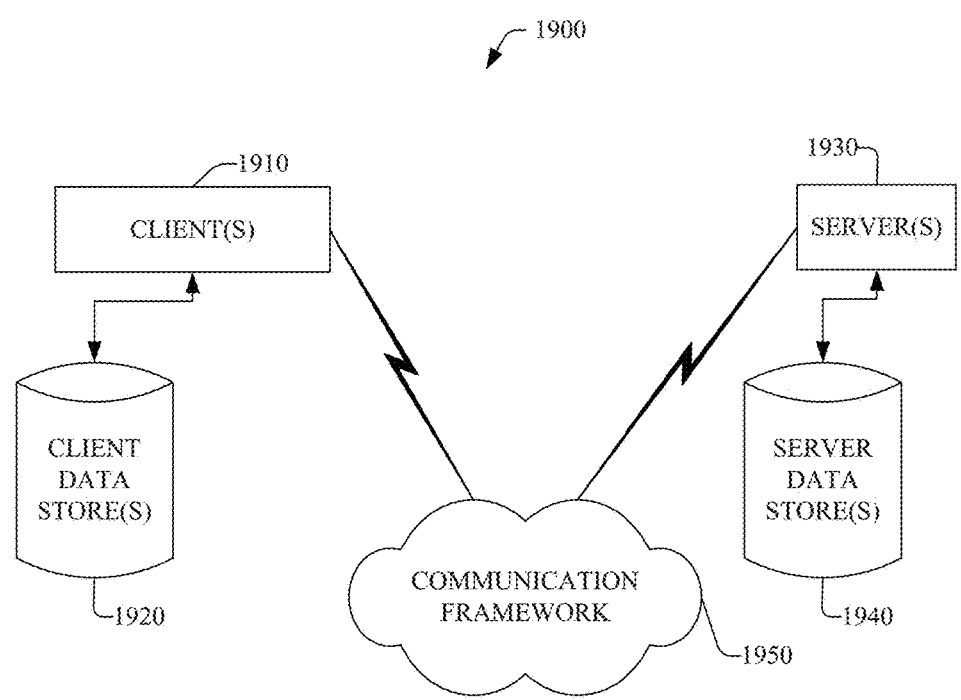
FIG. 19 is a schematic block diagram of a sample-computing environment.

In order to provide a context for the various aspects of the disclosed subject matter, FIGS. 18 and 19 as well as the following discussion are intended to provide a brief, general description of a suitable environment in which the various aspects of the disclosed subject matter may be implemented. While the subject matter has been described above in the general context of computer-executable instructions of a computer program that runs on a computer and/or computers, those skilled in the art will recognize that the disclosed subject matter also may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multiprocessor computer systems, mini-computing devices, mainframe computers, as well as personal computers, hand-held computing devices (e.g., personal digital assistant (PDA), phone, watch), microprocessor-based or programmable consumer or industrial electronics, and the like. The illustrated aspects may also be practiced in distributed computing environments where tasks are performed by remote processing devices that are linked through a communications network. However, some, if not all aspects of the disclosed subject matter can be practiced on stand-alone computers. In a distributed computing environment, program modules may be located in both local and remote memory storage devices.

With reference to FIG. 18, a suitable environment 1800 for implementing various aspects of the disclosed subject matter includes a computer 1812. The computer 1812 includes a processing unit 1814, a system memory 1816, and a system bus 1818. The system bus 1818 couples system components including, but not limited to, the system memory 1816 to the processing unit 1814. The processing unit 1814 can be any of various available processors. Dual microprocessors and other multiprocessor architectures also can be employed as the processing unit 1814.

The system bus 1818 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 1816 includes volatile memory 1820 and nonvolatile memory 1822. The basic input/output system (BIOS), containing the basic routines to transfer information between elements within the computer 1812, such as during start-up, is stored in nonvolatile memory 1822. By way of illustration, and not limitation, nonvolatile memory 1822 can include read only memory (ROM), programmable ROM (PROM), electrically programmable ROM (EPROM), electrically erasable programmable ROM (EEPROM), or flash memory. Volatile memory 1820 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1812 also includes removable/non-removable, volatile/non-volatile computer storage media. FIG. 18 illustrates, for example, a disk storage 1824. Disk storage 1824 includes, but is not limited to, devices like a magnetic disk drive, floppy disk drive, tape drive, Jaz drive, Zip drive, LS-100 drive, flash memory card, or memory stick. In addition, disk storage 1824 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1824 to the system bus 1818, a removable or non-removable interface is typically used, such as interface 1826.

It is to be appreciated that FIG. 18 describes software that acts as an intermediary between users and the basic computer resources described in the suitable operating environment 1800. Such software includes an operating system 1828. Operating system 1828, which can be stored on disk storage 1824, acts to control and allocate resources of the computer system 1812. System applications 1830 take advantage of the management of resources by operating system 1828 through program modules 1832 and program data 1834 stored either in system memory 1816 or on disk storage 1824. It is to be appreciated that the claimed subject matter can be implemented with various operating systems or combinations of operating systems.

A user enters commands or information into the computer 1812 through input device(s) 1836. Input devices 1836 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1814 through the system bus 1818 via interface port(s) 1838. Interface port(s) 1838 include, for example, a serial port, a parallel port, a game port, and a universal serial bus (USB). Output device(s) 1840 use some of the same type of ports as input device(s) 1836. Thus, for example, a USB port may be used to provide input to computer 1812, and to output information from computer 1812 to an output device 1840. Output adapter 1842 is provided to illustrate that there are some output devices 1840 like monitors, speakers, and printers, among other output devices 1840, which require special adapters. The output adapters 1842 include, by way of illustration and not limitation, video and sound cards that provide a means of connection between the output device 1840 and the system bus 1818. It should be noted that other devices and/or systems of devices provide both input and output capabilities such as remote computer(s) 1844.

Computer 1812 can operate in a networked environment using logical connections to one or more remote computers, such as remote computer(s) 1844. The remote computer(s) 1844 can be a personal computer, a server, a router, a network PC, a workstation, a microprocessor based appliance, a peer device or other common network node and the like, and typically includes many or all of the elements described relative to computer 1812. For purposes of brevity, only a memory storage device 1846 is illustrated with remote computer(s) 1844. Remote computer(s) 1844 is logically connected to computer 1812 through a network interface 1848 and then physically connected via communication connection 1850. Network interface 1848 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1850 refers to the hardware/software employed to connect the network interface 1848 to the bus 1818. While communication connection 1850 is shown for illustrative clarity inside computer 1812, it can also be external to computer 1812. The hardware/software necessary for connection to the network interface 1848 includes, for exemplary purposes only, internal and external technologies such as, modems including regular telephone grade modems, cable modems and DSL modems, ISDN adapters, and Ethernet cards.

FIG. 19 is a schematic block diagram of a sample-computing environment 1900 with which the subject specification can interact. The system 1900 includes one or more client(s) 1910. The client(s) 1910 can be hardware and/or software (e.g., threads, processes, computing devices). The system 1900 also includes one or more server(s) 1930. Thus, system 1900 can correspond to a two-tier client server model or a multi-tier model (e.g., client, middle tier server, data server), amongst other models. The server(s) 1930 can also be hardware and/or software (e.g., threads, processes, computing devices). The servers 1930 can house threads to perform transformations by employing the disclosed subject matter, for example. One possible communication between a client 1910 and a server 1930 may be in the form of a data packet transmitted between two or more computer processes.

The system 1900 includes a communication framework 1950 that can be employed to facilitate communications between the client(s) 1910 and the server(s) 1930. The client(s) 1910 are operatively connected to one or more client data store(s) 1920 that can be employed to store information local to the client(s) 1910. Similarly, the server(s) 1930 are operatively connected to one or more server data store(s) 1940 that can be employed to store information local to the servers 1930.

FIG. 20 depicts a diagram of an example electrical grid environment 2000 in which the various aspects of the disclosed subject matter can be practiced. It is to be appreciated that this figure and the associated disclosure is presented as a non-limiting example to facilitate a general comprehension of one or more aspects of the disclosed subject matter in connection with hypothetical electrical grid assets. Further, while sample values and assets are illustrated for context, these same sample values and assets are non-limiting and should not be viewed as defining any narrowing of scope. Generally, the assets of FIG. 20 can be assigned to a transmission grid portion (upper portion of figure) or a distribution grid portion (lower portion of figure) as is typical in many electrical power grids worldwide. Transmission systems often are associated with very high AC voltages or even DC transmission of power. Transmission systems are generally presented in the context of delivering high power to regional distribution networks managed by a distribution grid entity.

The conventional electrical distribution grid, as disclosed herein, generally has a flat control structure with control being centralized in a distribution control center (DCC). In contrast, as illustrated in FIG. 20, a non-flat control topography can be employed in accord with the subject matter disclosed herein. In this non-limiting example, three tiers of electrical distribution control system components are illustrated. A top-level (e.g., upper level) control node 2010 (also referred to as TOP 2010) (e.g., comprising a top-level DNNC component and top-level PSBC) can be communicatively coupled to junior level control nodes (e.g., 2020 to 2036), which can comprise junior level DNNC components and junior level PSBCs. In FIG. 20, the interconnections illustrate a basic tree structure topology.

In an aspect, two mid-level control nodes 2020 (also referred to as MID 2020) and 2021 (also referred to as MID 2021) can be logically placed between the bottom-level (e.g., lower level) control node and the top-level control node 2010. Further, the several bottom-level control nodes, such as bottom-level control nodes 2030 through 2036 (also referred to as BOT 2030 through BOT 2036), can be associated with various edge assets. For example, bottom-level control node 2030 can be associated with a city power plant and bottom-level control node 2031 can be associated with a small group of industrial customers. Bottom-level control node 2030 and 2031 can be logically connected to top-level control node 2010 by way of mid-level control node 2020. As such, data and rules can be bubbled up (e.g., communicated upward in the hierarchy) or pushed down (e.g., communicated downward in the hierarchy) by way of this communication path. The bidirectional communication and closed loop control at each level (e.g., top, mid, and bottom) can facilitate improved electrical distribution grid performance. For example, where additional power is needed by the industrial customers associated with bottom-level control node 2031, control signals from mid-level control node 2020 can source more power from city power plant by way of bottom-level control node 2030 without directly involving the top-level control node 2010 or draining energy from the illustrated solar farm or wind farm.

Similarly, mid-level control node 2021 can be associated with bottom-level control node 2032 through 2036. Bottom-level control node 2033, for example, can be logically associated with a plurality of transformers service a portion of a city network. Further, for example, bottom-level control node 2034 can be associated with a single transformer as part of a rural network. Moreover, at bottom-level control node 2032, for example, the control node can be associated with a single consumer, such as the farm. The control nodes also can be associated with distributed power generation, for example bottom-level control node 2035 associated with a solar farm and bottom-level control node 2036 associated with a wind farm. As such, bidirectional communication between top-level control node 2010 and bottom-level control node 2032 through 2036 can be by way of mid-level control node 2021. As such, rules propagated for mid-level control node 2020 and associate child control nodes can be different from rules propagated for mid-level control node 2021 and associated child control nodes. Further, independent closed loop control can be affected, for example, at bottom-level control node 2034 and the associated rural customers without impacting bottom-level control node 2033 and the associated city network.

It is to be appreciated and understood that components (e.g., DNNC component, PDS, PSBC, junction node, sensor component, ECC, ECM, etc.), as described with regard to a particular system or method, can include the same or similar functionality as respective components (e.g., respectively named components or similarly named components) as described with regard to other systems or methods disclosed herein.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor also can be implemented as a combination of computing processing units.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, etc.) to provide secure, reliable, fast wireless connectivity. A Wi-Fi network can be used to connect computers to each other, to the Internet, and to wireline networks (which use IEEE 802.3 or Ethernet). Wi-Fi networks typically operate in the unlicensed 2.4 and 5 GHz radio bands, at an 11 Mbps (802.11b) or a 54 Mbps (802.11a) data rate, for example, or with products that contain both bands (dual band), so the networks can provide real-world performance similar to the basic "10BaseT" wireline Ethernet networks used in many offices.

In the subject specification, terms such as "data store," "data storage," "database," and substantially any other information storage component relevant to operation and functionality of a component, refer to "memory components," or entities embodied in a "memory" or components comprising the memory. For example, information relevant to operation of various components described in the disclosed subject matter, and that can be stored in a memory, can comprise, but is not limited to comprising, subscriber information; cell configuration (e.g., devices served by an AP) or service policies and specifications; privacy policies; and so forth. It will be appreciated that the memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), phase change memory (PCM), flash memory, or nonvolatile RAM (e.g., ferroelectric RAM (FeRAM)). Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Various aspects or features described herein may be implemented as a method, apparatus, or article of manufacture using standard programming and/or engineering techniques. The term "article of manufacture" as used herein is intended to encompass a computer program accessible from any computer-readable device, carrier, or media.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory (e.g., card, stick, key drive . . . ) or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

What has been described above includes examples of systems and methods that provide advantages of the disclosed subject matter. It is, of course, not possible to describe every conceivable combination of components or methodologies for purposes of describing the claimed subject matter, but one of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A system, comprising:
   a processor; and
   a memory that stores executable components, wherein the processor executes or facilitates execution of the executable components, comprising:
   an analyzer component configured to perform an analysis of information relating to power conditions associated with multi-phase power being distributed to one or more consumer consumption nodes (CCNs) to facilitate at least identification of a phase imbalance in the multi-phase power between at least a first phase associated with a first power transmission line and a second phase associated with a second power transmission line that distribute respective portions of the multi-phase power to the one or more CCNs, in response to occurrence of the phase imbalance, wherein the one or more CCNs are located in a tier in a multi-tier electrical distribution network (EDN) that is lower than at least one other tier of the multi-tier EDN; and
   a first power control component configured to identify the phase imbalance and control distribution of the multi-phase power in the tier via at least one junction node based at least in part on the analysis of at least a portion of the information,
   wherein, in response to a determination that an amount of the phase imbalance in the tier exceeds a defined threshold amount of phase imbalance, the first power control component is configured to at least switch an electrical connection of a CCN of the one or more CCNs from the first power transmission line associated with the first phase to the second transmission line associated with the second phase to reduce the amount of the phase imbalance in the multi-phase power in the tier below the defined threshold amount of phase imbalance, in accordance with at least one defined control criterion that relates to a reduction of the phase imbalance in the multi-phase power in the tier.

2. The system of claim 1, wherein the first power control component is further configured to collect the information, which relates to the tier, from at least one CCN of the one or more CCNs, a first power distribution node, the at least one junction node, or at least one sensor, in the tier, wherein the analyzer component is further configured to analyze the information resulting in analysis information, and wherein the first power control component is further configured to control the distribution of the multi-phase power to the one or more CCNs based at least in part on the collected information and the analysis information.

3. The system of claim 2, wherein the first power control component is further configured to identify that the amount of the phase imbalance in the multi-phase power being distributed in the tier exceeds the defined threshold amount of phase imbalance based at least in part on at least one of the information or the analysis information.

4. The system of claim 1, wherein the first power control component is further configured to identify at least one power system correction action to be executed to reduce the amount of the phase imbalance in the multi-phase power in the tier to cause the amount of the phase imbalance in the multi-phase power to be below the defined threshold amount of phase imbalance.

5. The system of claim 4, wherein the at least one power system correction action is at least one of:
   a switch of at least a portion of a load associated with at least one CCN of the one or more CCNs from the first power transmission line associated with the first phase of the multi-phase power to the second power transmission line associated with the second phase of the multi-phase power to reduce or minimize the amount of the phase imbalance in the multi-phase power in the tier;
   an isolation or disconnection of a node or component that is at least partially causing the phase imbalance in the multi-phase rower in the tier in the multi-tier EDN to reduce or minimize the amount of the phase imbalance in the multi-phase power in the tier;
   a respective adjustment of at least one of voltage amplitude or current amplitude of at least one of a set of power transmission lines that carry respective phases of the multi-phase power, wherein the set of power transmission lines comprises the first power transmission line and the second power transmission line;
   a transmission of at least one notification relating to the phase imbalance in the multi-phase power to at least one specified destination node or at least one entity to provide at least a portion of the information that relates to the phase imbalance in the multi-phase power; or
   a transmission of a request that a manual power system correction action be performed.

6. The system of claim 1, wherein the first power control component is further configured to obtain correction-action-related data that relates to a power system correction action comprising the switching of the electrical connection of the CCN from the first power transmission line to the second transmission line to facilitate determining whether the power system correction action satisfies a defined level of effectiveness relating to reducing the amount of the phase imbalance in the multi-phase power in the tier.

7. The system of claim 6, wherein the first power control component is further configured to determine whether the power system correction action is to be modified in response to determining whether the power system correction action satisfies the defined level of effectiveness.

8. The system of claim 1, wherein the multi-tier EDN comprises three tiers including the tier, a middle tier higher than the tier, and a top tier higher than the middle tier, wherein the tier comprises the first power control component and a first power distribution node associated with the first power control component, the middle tier comprises a second power control component and a second power distribution node associated with the second power control component, and the top tier comprises a third power control component and a third power distribution node that is associated with the third power control component.

9. The system of claim 8, wherein the first power control component is further configured to control at least the amount of the phase imbalance in the multi-phase power in the tier to reduce or minimize utilizing at least one of the second power control component in the middle tier or the third power control component in the top tier to control the amount of the phase imbalance in the multi-phase power in the tier; and wherein the second power control component is further configured to control at least a second amount of the phase imbalance in the multi-phase power in a portion of the middle tier controlled by the second power control component to reduce or minimize utilizing the third power control component in the top tier to control the second amount of the phase imbalance in the multi-phase power in the portion of the middle tier.

10. The system of claim 8, wherein the first power distribution node is a distribution transformer, the second power distribution node is a power sub-station, and the third power distribution node is a power generation plant that generates power for distribution throughout at least a portion of the EDN, including the distribution of the multi-phase power to the middle tier and the tier.

11. The system of claim 1, wherein the executable components further comprise:
at least one junction node configured to facilitate the distribution of the multi-phase power to the one or more CCNs, switch a CCN from the first power transmission line to the second power transmission line, or filter the multi-phase power being distributed to the one or more CCNs, based at least in part on control information received from the first power control component, wherein the at least one junction node and the one or more CCNs are located in the tier.

12. The system of claim 1, further comprising:
a sensor component comprising one or more sensors that are configurable to be distributed at various points in the EDN, wherein at least a portion of the one or more sensors are located in the tier and communicatively connected to the first power control component to provide information relating to at least a portion of the power conditions in the tier to the first power control component to enable at least control of the amount of the phase imbalance in the multi-phase power in the portion of the tier.

13. A method, comprising:
receiving, by a system comprising a processor, data relating to power conditions associated with multi-phase power being distributed in a lower level of a multi-level power distribution network (PDN), wherein the lower level is lower than at least one other level of the multi-level PDN, the multi-level PDN comprising one or more consumer consumption nodes (CCNs); and
controlling, by the system, distribution of at least a portion of the multi-phase power to the one or more CCNs in the lower level, based at least in part on the data relating to the power conditions associated with the multi-phase power, to control a level of power system imbalance in the multi-phase power between at least a first phase of the multi-phase power associated with a first power line and a second phase of the multi-phase power associated with a second power line in the lower level, in accordance with at least one defined control criterion that relates to the power system imbalance in the multi-phase power,
wherein the controlling the level of power system imbalance comprises, in response to determining that the level of the power system imbalance in the lower level breaches a defined threshold level of power system imbalance, switching an electrical connection of a CCN of the one or more CCNs from the first power line associated with the first phase to the second power line associated with the second phase in the lower level to mitigate the level of the power system imbalance in the multi-phase power in the lower level in order not to breach the defined threshold level of power system imbalance, in accordance with the at least one defined control criterion.

14. The method of claim 13, further comprising:
analyzing, by the system, the data relating to the power conditions associated with the multi-phase power;
determining, by the system, the level of the power system imbalance in the multi-phase power being distributed in the lower level based at least in part on the analyzing the data relating to the power conditions associated with the multi-phase power, wherein the level of the power system imbalance is determined to breach the defined threshold level of power system imbalance;
generating, by the system, at least one control command for executing at least one power system correction action in response to the determining that the level of the power system imbalance in the multi-phase power breaches the defined threshold level of power system imbalance, in accordance with the at least one defined control criterion, to at least mitigate the level of the power system imbalance in the multi-phase power; and
transmitting, by the system, the at least one control command to at least one junction node in the lower level to control executing the at least one power system correction action.

15. The method of claim 13, further comprising:
receiving, by the system, a set of data, wherein the set of data comprises at least one of the data relating to the power conditions or other data relating to communication conditions, associated with the lower level;
filtering, by the system, the set of data to generate a subset of data that comprises a portion of the set of data that is less than all data contained in the set of data, in accordance with the at least one defined control criterion; and
communicating, by the system, the subset of data to the at least one of a power control component or a network node controller component via a selected communication channel, to facilitate controlling at least the distribution of the multi-phase power to the one or more CCNs in the lower level of the multi-level PDN based at least in part on the subset of data, wherein at least one of the power control component or the network node controller component is located in at least one of a middle level of a hierarchy of the multi-level PDN above the lower level, or a top level of the hierarchy of the multi-level PDN above the middle level.

16. The method of claim 13, further comprising:
monitoring, by the system, the power conditions associated with the multi-phase power in the lower level;
obtaining, by the system, at least a portion of the data relating to the power conditions in the lower level; and
transmitting, by the system, at least the portion of the data relating to the power conditions to a power control component that facilitates the distribution of at least the portion of the multi-phase power to the one or more CCNs in the lower level.

17. The method of claim 13, wherein the multi-level PDN comprises:
the lower level that comprises one or more lower-level power control components, one or more lower-level power distribution sources, one or more lower-level junction nodes, and the one or more CCNs; and
an upper level that is associated with the lower level and is higher in a hierarchy of the multi-level PDN than the lower level, wherein the upper level comprises one or more upper-level power control components, one or more upper-level power distribution sources, and one or more upper-level junction nodes.

18. The method of claim 17, wherein the multi-level PDN further comprises a middle level that is associated with the lower level and the upper level, wherein the middle level is below the upper level and above the lower level in the hierarchy of the multi-level PDN, and wherein the middle level comprises one or more middle-level power control components, one or more middle-level power distribution sources, and one or more middle-level junction nodes.

19. The method of claim 13, wherein the at least one defined control criterion comprises at least one of the at least one defined power distribution criterion, at least one defined communication channel selection criterion, or at least one defined data selection criterion,
wherein the at least one defined power distribution criterion relates to at least one of a maximization of a net consumption of the multi-phase power at the lower level, a minimization of requests or demands for the multi-phase power to be transferred from a higher level in a hierarchy of the multi-level PDN to the lower level, a minimization of the level of the power system imbalance in the multi-phase power, a minimization of a harmonic level in the multi-phase power, a minimization of an interference in the multi-phase power, a type of load connected to the multi-phase power, a number of levels in the multi-level PDN, a respective number of power control components or node controller components in respective levels of the multi-level PDN, a maximum amount of the multi-phase power that is receivable by a power distribution source (PDS) at a given time, a maximum amount of the multi-phase power that is distributable at the given time by the PDS, a maximum operating temperature of the PDS, power distribution control information or rules received from the higher level in the multi-level PDN, available local power from local power distribution sources in the lower level, expected or predicted future power demands in the lower level, or consumer agreements relating to the distribution of the multi-phase power for the one or more CCNs in the lower level,
wherein the at least one defined communication channel selection criterion relates to at least one of an amount of first data to be communicated, a type of the first data to be communicated, a first priority level of the first data to be communicated, respective communication conditions of respective communication channels, respective costs of communication of the first data for the respective communication channels, current availability of the respective communication channels, or a time of day of data communication, wherein the first data comprises at least one of the data relating to the power conditions or other data relating to communication conditions, and
wherein the at least one defined data selection criterion relates to at least one of a destination point of second data of the data, a type of the second data available for selection, an amount of the second data specified to be receivable by the destination point, a second priority level of the second data, third data that is available in the second data, respective hierarchy levels of a network node controller component and at least one other network node controller component, or the communication conditions at a given time, wherein the second data comprises at least one of the data relating to the power conditions or the other data relating to the communication conditions.

20. The method of claim 13, further comprising:
analyzing, by the system, the data relating to the power conditions associated with the multi-phase power;
detecting, by the system, a power condition problem comprising at least one of a harmonic level that is above a defined threshold harmonic level or an interference level that is above a defined threshold interference level, associated with the multi-phase power being distributed in the portion of the lower level, based at least in part on the analyzing the data relating to the power conditions associated with the multi-phase power;
generating, by the system, at least one control command for executing at least one power system correction action in response to the detecting the power condition problem in the multi-phase power, in accordance with the at least one defined control criterion, to at least reduce or minimize at least one of the harmonic level or the interference level associated with the multi-phase power, wherein the interference level relates to an electromagnetic interference (EMI) or a radio frequency interference (RFI); and
transmitting, by the system, the at least one control command to at least one junction node in the portion of the lower level to facilitate controlling executing the at least one power system correction action.

21. A system, comprising:
a processor; and
a memory that stores executable components, wherein the processor executes or facilitates execution of the executable components, comprising:
at least one junction node configured to be associated with one or more consumer consumption nodes (CCNs) located in a tier of a multi-tier electrical distribution network (EDN), receive at least one control command from a power control component, and execute the at least one control command to control distribution of multi-phase power in the tier, wherein the at least one junction node is associated with a set of power transmission lines comprising a first power transmission line and a second transmission line that facilitate the distribution of the multi-phase power in the portion of the tier; and at least one switch component configured to be associated with the at least one junction node, and switch a connection of at least one CCN of the one or more CCNs from the first power transmission line of a first phase of the multi-phase power to the second power transmission line of a second phase of the multi-phase power that distribute at least a portion of the multi-phase power to reduce an amount of power system imbalance between the first phase and the second phase in the multi-phase power, resulting in a defined threshold amount of phase imbalance no longer being exceeded, in response to the at least one control command comprising information relating to at least one power system correction action, wherein the at least one control command is determined in response to determining that the amount of the power system imbalance exceeds the defined threshold amount of power system imbalance based at least in part on data relating to the power system imbalance between the first phase and the second phase in the multi-phase power, in accordance with at least one defined control criterion that relates to the reducing of the amount of the power system imbalance in the multi-phase power.

22. The system of claim 21, further comprising:
a filter component configured to filter the multi-phase power to reduce at least one of a harmonic level or an interference level in the multi-phase power.

* * * * *